US 7,725,558 B2

(12) United States Patent
Dickenson

(10) Patent No.: US 7,725,558 B2
(45) Date of Patent: May 25, 2010

(54) DISTRIBUTIVE ACCESS CONTROLLER

(76) Inventor: David Dickenson, 94 Primrose Crescent, Brampton, Ontario (CA) L6Z IE3

( * ) Notice: Subject to any disclaimer, the term of this patent is extended or adjusted under 35 U.S.C. 154(b) by 795 days.

(21) Appl. No.: 10/333,816

(22) PCT Filed: Jul. 26, 2001

(86) PCT No.: PCT/CA01/01089

§ 371 (c)(1),
(2), (4) Date: Jun. 18, 2003

(87) PCT Pub. No.: WO02/08870

PCT Pub. Date: Jan. 31, 2002

(65) Prior Publication Data

US 2004/0025052 A1   Feb. 5, 2004

Related U.S. Application Data

(60) Provisional application No. 60/220,860, filed on Jul. 26, 2000.

(51) Int. Cl.
*G06F 15/167* (2006.01)
(52) U.S. Cl. .............. 709/215; 709/229; 711/202; 711/153; 358/118; 358/122
(58) Field of Classification Search ................. 709/215, 709/229; 711/202, 153; 358/118, 122
See application file for complete search history.

(56) References Cited

U.S. PATENT DOCUMENTS 4,638,356 A * 1/1987 Frezza ........................ 380/200

| | | | | |
|---|---|---|---|---|
| 5,657,470 A * | 8/1997 | Fisherman et al. | .......... | 711/153 |
| 5,805,591 A * | 9/1998 | Naboulsi et al. | .......... | 370/395.6 |
| 5,935,205 A * | 8/1999 | Murayama et al. | .......... | 709/216 |
| 6,052,781 A | 4/2000 | Weber | | |
| 6,118,782 A * | 9/2000 | Dixon et al. | ................. | 370/389 |
| 6,195,703 B1 * | 2/2001 | Blumenau et al. | ........... | 709/238 |
| 6,219,786 B1 * | 4/2001 | Cunningham et al. | ....... | 713/152 |
| 6,438,595 B1 * | 8/2002 | Blumenau et al. | ........... | 709/226 |
| 6,574,667 B1 * | 6/2003 | Blumenau et al. | ........... | 709/229 |
| 6,650,646 B1 * | 11/2003 | Galway et al. | .............. | 370/397 |

(Continued)

FOREIGN PATENT DOCUMENTS

EP       0827065       3/1998

OTHER PUBLICATIONS

"Getting Started with Check Point FireWall-1" version 4.0, published by Check Point Software Technologies, Ltd., Sep. 1998.*

*Primary Examiner*—Saleh Najjar
*Assistant Examiner*—Thuong T Nguyen

(57) ABSTRACT

A device for securely controlling communications among or within computers, computer systems, or computer networks, comprising: (a) a primary access port to which an "owner" computer program, computer, computer system, or computer network is connectable to access shared computer resources; (b) a secondary access port to which a non-owner computer program, computer, computer system, or computer network is connectable to access the shared computer resources; (c) a transfer port to which a shared computer resource is connectable to provide controlled access to that computer resource from computer programs, computers, computer systems, or computer networks connected to the access ports; and (d) a separate physical communication path to and from each access port and each transfer port, where access permissions and restrictions for each communication path are set by the owner of the device through the primary access port.

12 Claims, 29 Drawing Sheets

U.S. PATENT DOCUMENTS

| | | | |
|---|---|---|---|
| 6,785,728 B1 * | 8/2004 | Schneider et al. | 709/229 |
| 6,988,130 B2 * | 1/2006 | Blumenau et al. | 709/213 |
| 7,047,424 B2 * | 5/2006 | Bendinelli et al. | 726/22 |
| 7,051,182 B2 * | 5/2006 | Blumenau et al. | 711/202 |
| 2002/0034189 A1 * | 3/2002 | Haddock et al. | 370/423 |

* cited by examiner

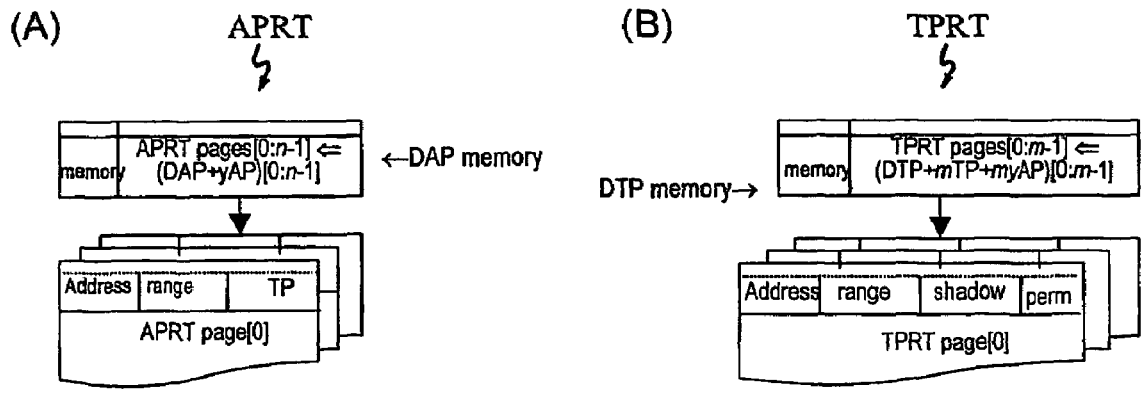

FIG. 23

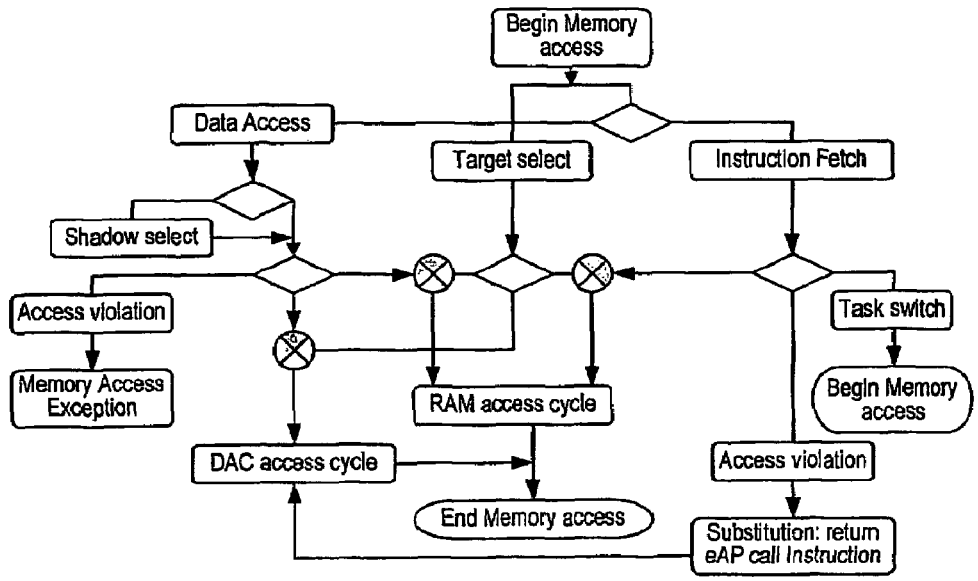

The item depicted here —⊗← is used throughout these flowcharts to indicate the convergence of concurrent processes. The incoming line (no arrowhead) is the enabling input from one process, the incoming arrow indicates input from the other process that will become the outcome if enabled, and the outgoing arrow indicates the enabled outcome (transparent quadrant) or an alternate process (opaque quadrant) if the enable input is negative.

FIG. 24

The item ▭ is used throughout these flowcharts to indicate point of merging between concurrent processes. The attached arrow in indicates the direction of the merge and the text indicates the purpose of the merge.

DISTRIBUTIVE ACCESS CONTROLLER

TECHNICAL FIELD

This invention relates to devices for controlling access to resources shared by multiple computer systems, or multiple programs within a computer system, so as to allow secure sharing of common resources among those systems or programs. This invention also relates to the use of those access control devices as controlled portals through which different computer systems or programs communicate and share information securely.

BACKGROUND

Traditionally, in a system of computers, storage units have been created such that each storage unit interfaces with a single controlling system that has full control over that storage unit. Prior to networking operating systems, protection of shared information was possible only by the presence of built-in password protection capabilities within individual application software. Passwords have since been shown to be only marginally effective and, even then, marginally effective against only casually, curious individuals; passwords have been shown to be totally ineffective by themselves against theft, damage or loss of information on such systems.

U.S. Pat. No. 5,434,562 to Reardon suggested a method of protecting storage unit(s) on such systems by use of access control switches to apply limited access privileges, and by which multiple users can share the storage unit(s), one user at a time. However, the invention Reardon proposed applies only to singular systems having multiple, non-concurrent users.

U.S. Pat. No. 6,052,781 to Weber further proposed a method by which an individual computer system, also with non-concurrent users, can protect individualized storage. The invention Weber proposed "virtualized" the system to represent individually any number of personalized configurations available to users, identifiable by password. However, as mentioned above, the use of passwords has provided little real protection to date.

Today, networking is the primary means by which computer systems share information storage. Unfortunately, network methodology was never designed with security in mind. This is the primary reason for the poor performance of network security systems in attempts to prevent unauthorized access by knowledgeable "hackers". The advent of networking operating systems allowed data sharing with other systems connected to the network, using software methods to facilitate and control the type of access allowed to the storage units. However, software-sharing methods must necessarily be implemented using a "client-server" architecture. This client-server model necessitates a means for clients to directly access the server (via requests), which the server then services by performing actions in its environment on the clients' behalf. These requests can be tailored to generate instability in the server's environment, which the client may later exploit. This is the primary means by which most forms of network-based intrusions are perpetrated. Network-based intrusions are insidious because would-be perpetrators can perform acts as if locally present, but remain protected by the anonymity they can achieve and the physical distance over which they can act.

Thus, a new means of controlled access to shared resources needs to be designed to solve this fundamental flaw of networking. The new method should not only restrict access, but it should provide "transparent" access to the information to which the client is allowed—that is, within the boundaries of the overall restricted access, access to the permitted information should be direct and unrestricted and not require a server as an intermediary. Transparent access implies that clients need not, and cannot, know that the server or other clients exists and, as such, clients must not be able to issue direct requests to servers. Transparency eliminates the possibility of remote access control of the server and the need to make the server's critical systems accessible to the client. The new method should be able to apply incontrovertible location identity to all involved and make local presence at the appropriate location a prerequisite for any attempt at subversion within a given private network.

It is obvious that the individual systems described by Reardon and Weber could be outfitted with networking operating systems to operate on a network. However, the resulting network could not negate remote access control, anonymity, or identity obfuscation, and the resulting access to the "protected" storage would be neither transparent nor restrictive to selected users. This is because the very nature of computers and the "cyber world", as it exists today, resists the requirements for security. The networking software itself defeats the physical protection that the above inventions once attempted to impart to the storage medium. Now, the different users need only access to the network in order to gain the access to that which they were once denied by those patented physical mechanisms, without needing to contend with the protective mechanisms that they provide. Therefore, those systems would still be subject to exploitation and to the flaws in programs and operating systems.

European Patent No. EP0827065A2 proposed a non-networked means of sharing storage between two architecturally different computer systems via a special storage device controller. No method of restricting access was discussed or provided. The purpose ascribed to that invention—namely, allowing computer systems having different data formats to share storage and allowing the mainframe to backup the shared storage—is unrelated to security. The function of the storage device controller in that invention is merely to convert data addresses from different computer systems so as to permit access to the shared storage and to permit the mainframe to backup that storage.

European Patent No. EP0367702A2 presented an invention to facilitate access to shared storage by multiple processors in a multiprocessor environment. The method discussed would strictly prohibit transparent sharing and access control since the "owner" processor must process requests posted to it by "requestor" processors. In fact, the method described is almost totally encapsulated by networked systems; thus, the objections to networking made above in respect of security and transparency would apply to this patented invention as well.

Finally, U.S. Pat. No. 5,935,205 to Murayama et al. presented an invention involving a network-like arrangement of computers sharing storage units via a specialized storage controller and computer coupling adapters. Access control to any shared storage unit is in the form of identification and password authentication and is mediated by the resident storage controller on the system to which the storage unit was directly attached. However, the desired features of transparent access and inaccessible access control to guarantee security have not been provided. In addition, the authentication method used to control access can easily be defeated, and individual elements of the system could be reconfigured to pose as any other element to gain illegal access.

Recently, development of the fiberchannel switch network and its use within storage area networks (SAN) has been touted as the ideal secure data network. While the fiberchannel storage bus does allow multiple devices to share the same storage systems, it does not however provide the necessary transparent access rights control. This means that any system that can gain access to the bus can act as an imposter and, by switching identities, can discover all other elements that populate the bus. In addition, the SAN must be used in conjunction with a standard network. Since the security of such networks is the current concern, it provides the means by which a remote attacker can bypass any safety measures in the SAN by attacking the system that has valid access to the data in question. Furthermore, most SAN implementations utilize the client-server model of data access and sharing, providing yet another means for attackers to exploit software-related risks on the servers and clients.

Thus, there still exists a need for a non-standard networked means of sharing storage units or other resources that is secure and presents no danger to any attached host system. Standard network access control methods have been shown to be ineffective in many cases, and allowing any type of access over such networks promotes vulnerabilities to attacks from remote systems. The industry has responded inappropriately to the shortcomings of software methods of access control, creating more and more layers of elaborate software controls, none of which have yet fulfilled the task of securing shared information from unauthorized access. The solutions themselves add to the list of vulnerabilities in a system.

On a related issue, the nature of standard networks and the client-server model give rise to similar problems in respect of the secured sharing of information between systems. The advent of networking systems helped to remove the burden of communicating or transmitting information, but networks were originally devised to share information between privileged, trusted individuals and thus required few safeguards to protect the information or its storage and manipulation systems. This shortfall has been made painfully obvious since the birth of the Internet, which now allows any information system to be instantly accessible. by any other system from any location in the world. Mischievous and malicious individuals alike can now cause serious damage to systems operation as well as loss or thievery of information.

Often, the type of access violation stems from the manner in which computers and programs network or share information. The attacker has an interface to a program or computer that sends input to another program to request (a query) that it makes some information available for sharing (typical of the classic client-server model). The query or sequence of queries maligns the server's processing of queries, or processing of information related to processing the queries. Now the attacker can make certain subsequent queries which force (trick) the server to send information that it should and would not normally send to the client, or modify information or processing of information for the server or other clients. This is obviously a problem of lack of transparency in data sharing. The fulfillment of requests and the subsequent release of, or access to such information is the subject of daily hacking news reports.

Still, security solutions overlook this basic flaw and instead target the symptoms. Security methods such as encryption, public-key infrastructure, digital certifications, authentication, and firewalls have been devised with the intent of limiting unauthorized activities or render stolen information practically useless to thieves. These methods have thus far proven to be only partly effective, requiring relentless updating and revisions just to keep up with the resourcefulness of intruders. It is becoming obvious that software solutions will never provide a cure because software itself can be manipulated and exploited remotely with no risk to the interloper. Other hardware/software combinations have also had limited success because, even when functioning as designed, they provide loopholes which allow imposters access to any information or activity normally expected of the individual being impersonated. Most importantly, security solutions that target information storage and sharing themselves operate on the flawed client-server architecture, making them susceptible to its inherent risks.

SUMMARY OF INVENTION

This invention defines a broad class of physical devices collectively called "distributive access controllers" (each one, a "DAC"), which can be applied as conjunctive devices or as an integrated part of any kind of information storage unit or computer system or other resource requiring protection. Applied as such, these DACs allow secure sharing of common storage/resource(s) by transforming logically partitioned systems into physically partitioned systems with more secure electronic connectivity, and by removing the control of access permissions beyond the reach of attached systems. These DACs provide multiple access ports to the shared resource(s) while governing the type of access allowed at each access port. Typically, each DAC provides a primary "access port" to which a capable owner connects to gain full control of the shared resource(s), and at least one other secondary access port to which any other user or system connects to gain restricted access to the shared resource(s). Those shared resource(s) in turn are connected to one or more "transfer ports" provided by the DAC, and access between any given access port and transfer port is governed by the DAC's hardware and may be changed only via the DAC's installed switches. These DACs enhance access control from attached systems by utilizing their physical point of attachment, namely each of the access ports, as an unmodifiable identity (ID) element. This mode of action generates a more trustworthy environment by removing the possibility that an attached system could act as an impostor and gain access to attached resources to which it has not been given rights. The owner of the attached storage units and the DAC can be certain that no attached system (whether local or remote) can override the DAC's access permissions.

Systems can share information and information storage in a non-standard networked manner, with broad access restrictions provided by the DAC. The DAC can be applied to any storage unit(s) or other resource(s) and operates at the level of a communication bus. It provides multiple access paths to the storage unit(s) or resource(s), monitors information access requests, and allows only the pre-determined access path and access permission to be applied to a given access port. The sharers may now share the same resources (and thus the same information) with different access permissions without the need to request the information from a server. It affords the "clients" with the assurance that information it receives does not come from another unintended "client", and it assures the "server" that "clients" cannot override their specified access permissions.

Since this level of access control supersedes the "server's" control and is not subject to "client" access or control, the DAC can provided failsafe security. DACs can be interconnected to support sharing of larger storage clusters by higher numbers of concurrent attachments by connecting any DAC access port to a transfer port of another DAC, or by connecting any access port attachment to two similar or dissimilar DAC devices.

Secure storage using the DAC allows each access port attachment to have private storage that cannot be illegally accessed by other attachments on the DAC, and for such systems to place or retrieve shared information from specifically designated storage units. In terms of networking, this means that a "server" can control what information is shared with which "client" without the possibility of the "client" requesting and possible gaining access to restricted information through a malformed request. As far as the "client" is concerned, all the information that it can ever obtain from the "server" is already in its "own" system. The "server's" administrator alone determines what to share with the "client" and when to make it accessible. If the "server" places the information in a shared storage unit that the client can only read, then the client cannot even modify its "own" information stores. When one considers that the target of many intrusions is to gain access to restricted information, or to modify or damage controlled information (such as a web page), it becomes obvious that DACs can be used to prevent these events.

This target-oriented validation enables the target to properly complete its source identity validation, while ensuring that a compromised source cannot exceed its bounds and gain illegal access to systems on the network.

DACs can also be used as controlled portals for the secure communication and sharing of information between systems. Because access to such devices are not controlled by the systems which use them, and access is made transparently with respect to other attached systems, they are impervious to software methods of subversion. Their judicious usage would naturally confer proof against intrusion from external systems if used as a communication channel. This communication channel is composed of DACS, several implied a-priori rules that replace the client-server model of networking, and functional "agents". The key enabling component is the use of the DAC along with digital storage units to provide a physical checkpoint barrier at which all information can be subjected to scrutiny. Because the DAC allows multiple systems to transparently share storage units, and applies categorical restrictions to accessing the storage unit, even certain types of impersonation attempts (a means of invasion) can be detected and actively inhibited. The DAC-based communications channels allows restructuring of the client/server model into a private anonymous-server network model. This model is based on the principle that "client" systems are essentially incomplete systems that cannot independently access or process the necessary information, and thus need the support of the network to be complete. In addition, "server" systems are really just a collection of functions that clients can use to give them the semblance of being complete.

BRIEF DESCRIPTON OF DRAWINGS

FIG. 23(A) is a diagram showing the implementation of a "AP Request Translator" lookup table defining the AP-attachments assigned to the current access port and their associated data set selectors.

FIG. 23(B) is a diagram showing the implementation of a "TP Request Translator" lookup table containing the data ranges of a transfer port assigned to the current AP-attachment, their associated access permissions, and the shadow offset if defined.

FIG. 24 is a flowchart illustrating all processes/functions of the hardware of a RAM oriented DAC and their contribution to the validation and processing of all memory accesses.

FIG. 35(B) is a schematic diagram showing detailed data paths for active systems on a first DAC of that hybrid network. FIG. 35(C) is a schematic diagram showing detailed data paths for active systems on a second DAC of that hybrid network. FIG. 35(D) is a schematic diagram showing detailed data paths for active systems on the central DAC of that hybrid network.

Figure 36:
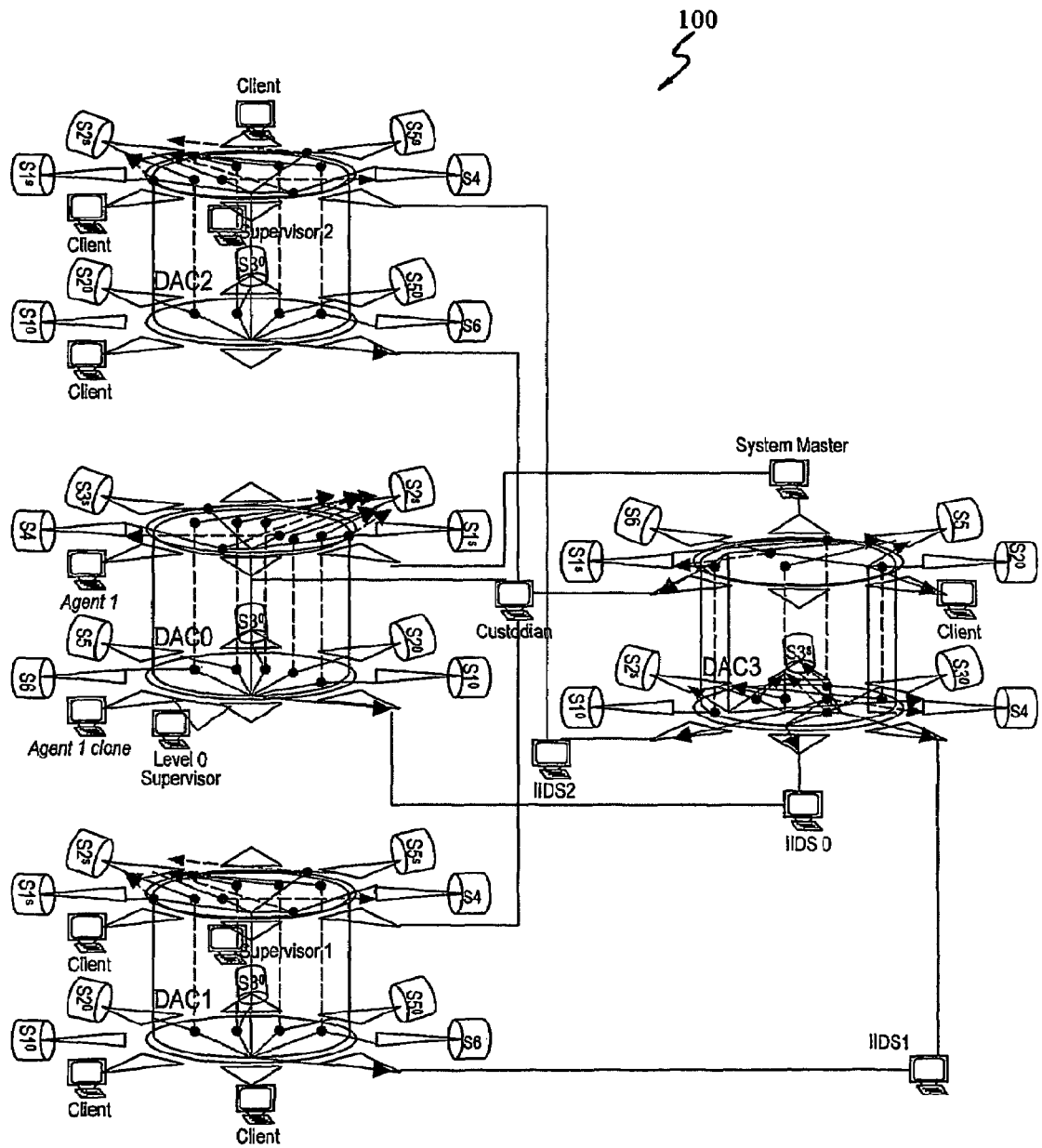

FIG. 36 is a schematic diagram showing the backbone of a hybrid DACS network showing system data paths of an "Internal Intrusion Detection System" ("IIDS").

Figure 37:
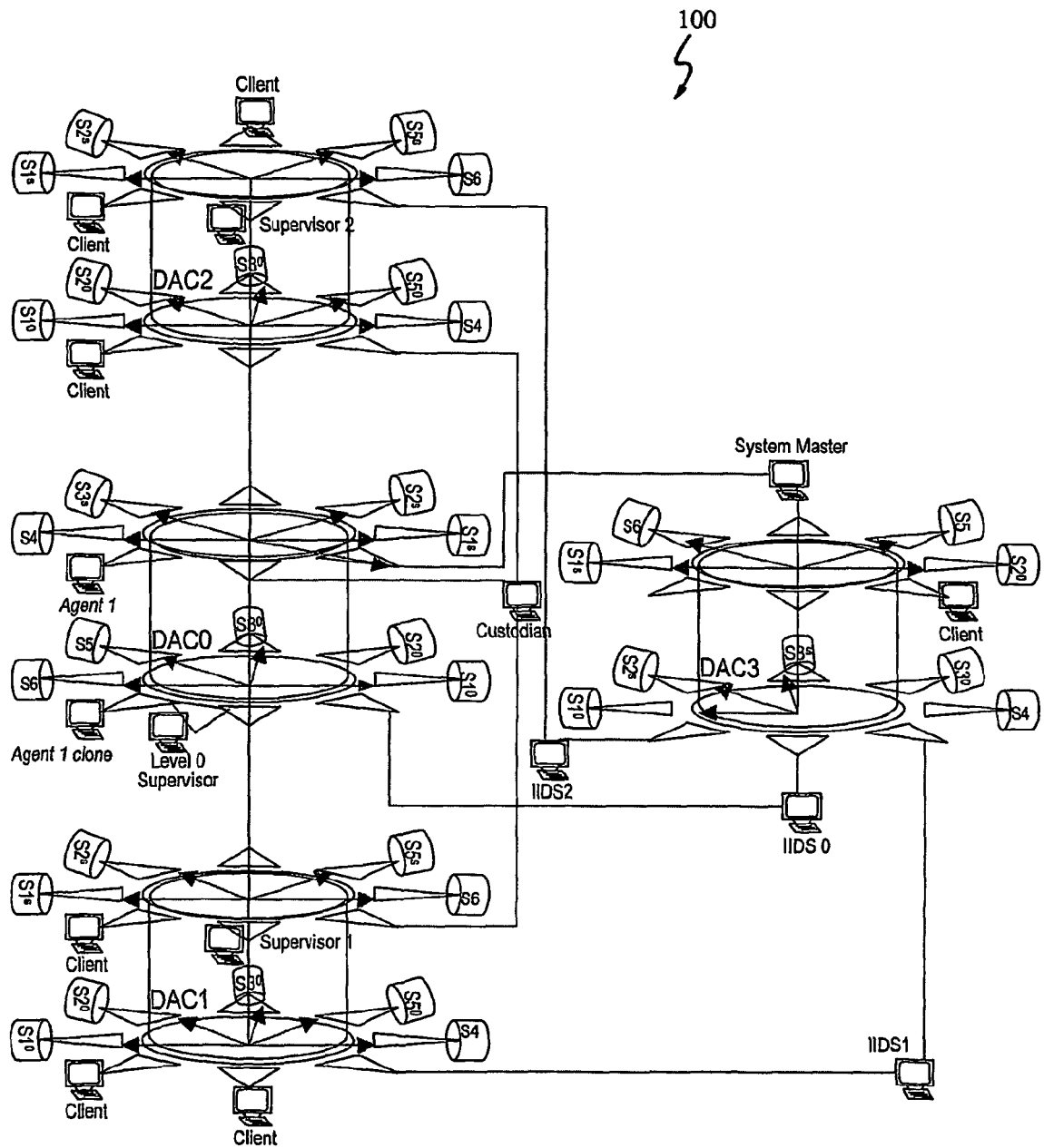

FIG. 37 is a schematic diagram showing the backbone of a hybrid DACS network showing central control possible with a "System Master" unit.

Figure 38:
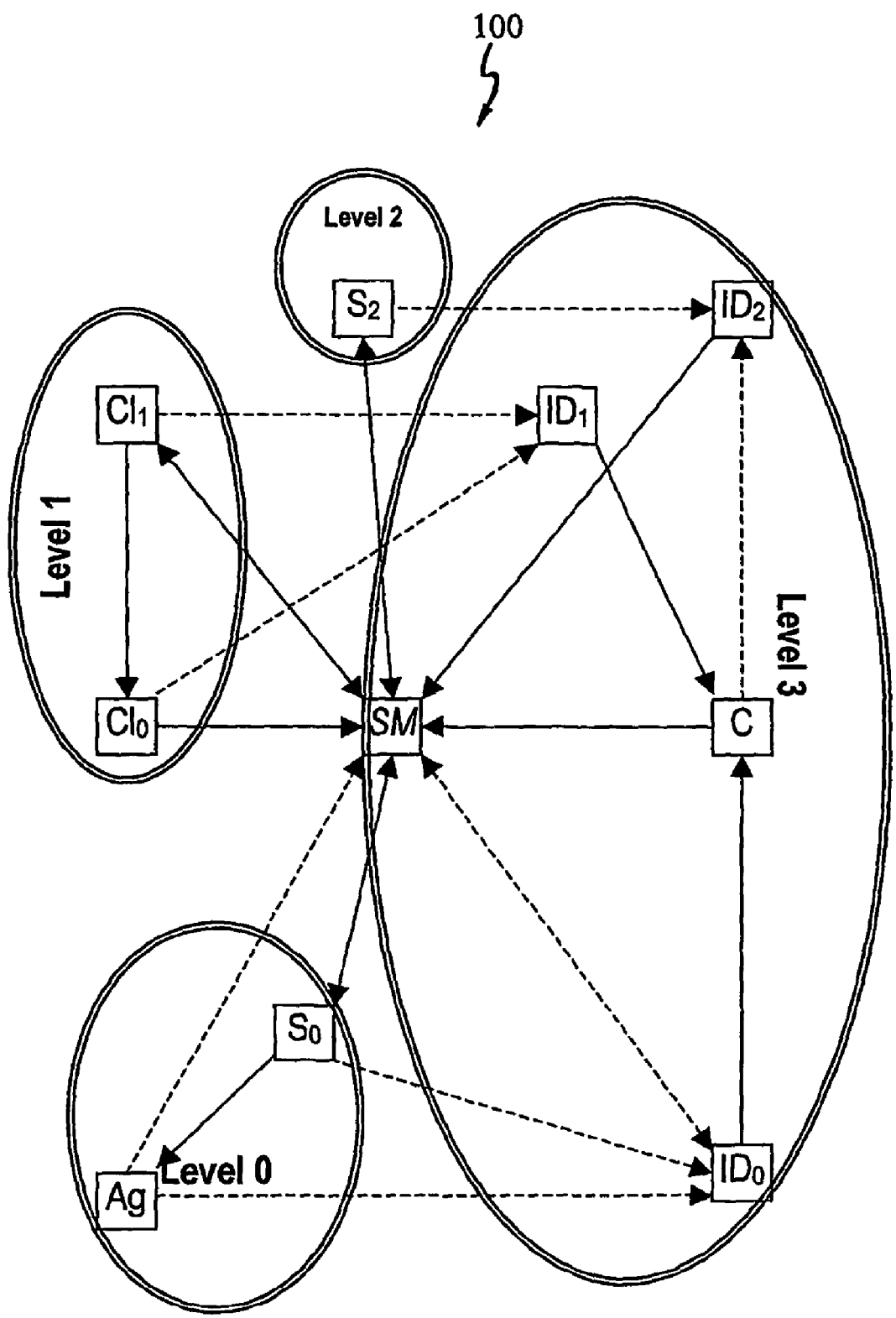

FIG. 38 is a schematic diagram illustrating the manner in which DACs can be interconnected in a hybrid network and illustrating network communications on that network.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

Glossary

In the description below and in the drawings, the following terms have the following meanings (which will be explained in further detail in the description below):

attachment the device or system attached to an AP or TP port (an AP-attachment or TP-attachment respectively)

terminal unit a TP-attachment that is explicitly addressable using a TID

DAC Distributive Access Controller

AP Access Port, a location at which processor systems may attach to the DAC

TP Transfer Port, a location at which storage systems or other DACs may attach to the DAC $1°$ as indicated by the context, either: (1) the Primary AP (the AP at which a system is allowed to issue restricted commands via the DAC); or (2) the Primary target (a shadowed device which an AP can explicitly target)

$2°$ Secondary AP, the AP at which restricted systems may attach to gain access to TP devices APxU Access controller unit for an enumerated AP, x being a variable RUy Access controller unit for an enumerated TP, y being a variable IDC Interlock and Datalink Coordinator, a centralized processing component for coordinating path allocation and control through a SCSI DAC ACI Access Control Interface, access control unit from which the device owner specifies the access control parameters for each AP to TP link Alert a snoop module that detects when an attachment is beginning a bus access and alerts the DAC so that a path to the intended target can be established RI Reset and Initialization subcomponent, a SCSI DAC subcomponent responsible for generating a reset condition and for initializing the state of the DAC PCC Port Communication Controller, a SCSI DAC sub-component responsible for supervising the activities through each established unidirectional path of an effectively bidirectional bus IRC Interface Request Controller, an IDC subunit that records and prioritizes R/P requests from an APXU or RUy R/N Reset/Normal, a SCSI DAC signal that holds DAC components in the reset state while the RI subunit is active rPID reset Port ID, register used to assign a port ID to the RI module SD or SDy Storage Device, an enumerated terminal unit, represented by y, attached to a TP and directly identified within the DAC by its TID SCSI Small Computer System Interface; refers to a standard interface scheme for attaching devices to a computer sUy-APs:bAPx describes a selectable path from RUy to the enumerated AP bus represented by x sAPx-SUs:bSUy describes a selectable path from APxU to the enumerated TP bus represented by y path (xx) establishment of a bi-directional path specified by a path selector designated as xx, e.g. path(tP)

spath(xx) establishment of a bidirectional path specified by a shadow path selector designated as xx, e.g. spath(sP)

lpath(xx) latches the state of the given bus path by holding the output buffers (bXXx of the selectable path sYYy-XXs:bXXx), essentially isolating the AP and the TP from each other; the path is still considered to be in use; usually asserted to select between the $1°$ and the shadow target of a shadow pair path( ) destruction of the path previously established by path (xx)

spath( ) destruction of the path previously established by spath(xx)

G/D Grant/Deny, a signal issued by IDC to APxU or RUy to indicate whether the required path or target is available and reserve for APxU or RUy the path access R/P link Request/Command Process, a signal issued by APxU and RUy to request clearance to establish a path between an AP and TP attachment, or to qualify the bus signals required to safely process a SCSI C/M A/b a positive asserted signal, e.g. G/d means Grant was asserted a/B a negative asserted signal, e.g. g/D means Deny was asserted DB Data Bus, collection of electrical paths that connect devices and through which the devices send each other data CB Control Bus, collection of electrical paths that connect devices and through which the devices classify and control the use of DB DS Data Shunt, a shunt pathway used by the RI subunit during a bus scan; DS returns DB and CB to RI while the AP buses are disabled SID Source Identifier, the name or number used to explicitly address an AP attachment APID AP Identifier, the name or number used to explicitly reference an AP TID Target Identifier, the name or number used to explicitly address an SDy device sT shadow Target identifier, the name or number used to explicitly address the SDy device to be used as the shadow for a TID tPID TP identifier, the name or number used to reference a specific TP tP the path selector for creating a bi-directional path between APx to SDy; contains components necessary to establish the correct sUy-APs:bAPx and sAPx-SUs:bSUy pair sPID shadow Port identifier, the name or number used to reference the specific TP to which the sT is attached sP the path selector for creating a bidirectional path between APx to SDy, where SDy is a shadow device; contains components necessary to establish the correct sUy-APs:bAPx and sAPx-SUs:bSUy pair BSY Busy, a SCSI specific signal that informs devices on the bus whether or not the bus is in use SEL Selection, a SCSI specific signal that informs the units currently using the bus to enter the SCSI Selection or Reselection state ATN a SCSI specific signal that informs a target device the bus will enter the Message state CID Command/Data, a SCSI specific signal that clarifies the current bus phase as C/M or Data MSG Message, a SCSI specific signal that clarifies the C/M bus phase as Message versus Status or Command I/O Input/Output, a SCSI specific signal that clarifies the bus direction as input or output CIM Command/Message mode, a SCSI specific DAC mode in which the DAC rejects, substitutes, or allows Messages, Status and Commands to enforce the given permissions Data as indicated by the context, either: (1) Data mode, a SCSI specific DAC mode during which the DAC must allow, modify or block bus controls and information flow to enforce the given permissions; or (2) Data bus between the DAC and the storage units of a RAM DAC Data' Data bus between the DAC and the processor units of a RAM DAC Interlock a SCSI specific DAC signal set by Alert to indicate that the AP to TP path is locked and the AP and TP device are allowed to communicate Lock a SCSI specific DAC signal pulsed by IDC to force a selected Alert circuit into the bus busy loop; asserted by Alert to the IDC to indicate that the external AP or TP bus is busy.

perm permission, the access control settings used by all DACs sigs path control signals, bit record of control signals applied to the path selectors and control signals in order to enforce the access permissions sh path control signals, bit record of control signals applied to the path selectors and control signals in order to enforce the access permissions tag transitory stack block tag, used to indicate when a block element in the TS structure is allocated or free for allocation TS Transitory Stack, an array of records used to store the path and bus states for SCSI data transfers that terminate without being completed or aborted PT Permission Table, table used by the SCSI DAC to record the accessible targets and access mode for each target from any AP AT Access Table, lookup table used to determine the paths selectors and access permissions for any TP attachment accessible to a given AP attachment Agent as indicated by the context, either: (1) a computer attached only to the SCSI DAC and to the Internet; agents serves as internet servers or Internet border caches for the trusted zones; or (2) paired programs, one working in the distrusted zone and one working in the trusted zone (both cooperate to ensure security at checkpoints)

Distrusted zone a network segment that has network access only to external networks; only agents are found in distrusted zones Supervisor data server in network zone that has no network connection and only connected to the DAC(s) of that zone Client a workstation or server in a network zone that has network connection to other clients in its zone and may have a connection to the DAC of that zone IIDS or IIDSX Internal Intrusion Detection System, a system with connections to DACs in one or more network zone(s) that has no network link to any other system in the zone(s); IIDS serves no data but can access but not modify any data on storage shared with any Client, Supervisor, Custodian or System Master Custodian a system with connections to DACs in one or more network zone(s) and has no network link to any other system in the zone(s); custodians share storage with many other systems and manage the shared storage units System Master a system that connects directly or via a cascaded link to the $1^0$ port of all DACs in all zones and has no network connection to any other system Sx Storage unit attached to a DAC in a hybrid network, where x is an arbitrary numeric designation that distinguishes the unit from all other units on the same DAC $Sx^s$ Storage unit attached to a DAC in a hybrid network, that serves as the shadow storage for certain unauthorized access to Storage $Sx^0$, where x is an arbitrary numeric designation that distinguishes the unit from all other units on the same DAC $Sx^0$ primary Storage unit of a shadow pair attached to a DAC in a hybrid network, where x is an arbitrary numeric designation that distinguishes the unit from all other units on the same DAC Address address bus between the DAC and the storage units of a RAM DAC Address' address bus between the DAC and the processor units of a RAM DAC DAP DAC AP table, cache memory dedicated to being used as AP definitions in the RAM DAC DTP DAC TP table, cache memory dedicated to being used as TP definitions in the RAM DAC APRT AP Request Translator, an n-way range lookup table used to validate whether an address falls within the instruction ranges of the currently active AP on a RAM DAC TPRT TP Request Translator, an n-way range lookup table used to validate whether an address falls within the data ranges of the currently active AP-attachment on a RAM DAC AC Access Controller, the central control unit of the RAM DAC RAM Random Access Memory bDT Data Transfer bus, a common data bus internal to the DAC that transports data between components of the DAC and between the DAC and bDB bDB Data Bridge bus, which is used to transfer data between the RAM DAC and either Data or Data'; bDB also facilitates simultaneous data transfers between Data and Data' and between any two internal components of the RAM DAC bAT Address Transfer bus, a common address bus internal to the DAC that transports data between AC and TPRT or APRT, and between AC and bAB on the RAM DAC bAB Address Bridge bus, which allows simultaneous address transfers from Address' to Address and between internal components of the DAC; bAB also facilitates the transfer of addresses from Address' to AC and from AC to Address Os Operating System, the Supervisory program on a computer that smooth interfacing between computer devices and programs Record.element a generic reference in which item (namely, an element) in object (namely, Record) is being selected or targeted

[Array.index] a generic reference in which an element is selected from an Array or table by indexing

[Table].item a generic reference indicating that the Table is searched for a Record containing the matching item

[xx.yy] a generic reference in which a range (xx to yy) of elements of an array or table is targeted shadow an alternate target to which accesses denied at the $1^\circ$ target are implicitly diverted page[xx] defines the generic reference as accessing an element know as a page memory (nn)[xx.yy] a generic reference that accesses a range (xx to yy) of elements in a table that is offset by nn from the start of memory p(xx) a generic reference that performs a table lookup and creates a path selector that can be later used in a later path(nn) path establishment $X \cup Y$ OR, the union or logical OR of X and Y $X \cap Y$ AND, the intersection or logical AND of X and Y $X \oplus Y$ XOR, the exclusion or logical XOR (exclusive OR) of X and Y USID Unique Source Identifier, a temporary replacement for the actual SID used when making an access through the DAC; USID is an index into the TS and can be used to give a unique reference to each pending request from an AP to a TP attachment Respond( ) a generic response to a command or message that has been blocked because it would lead to an eventual access violations; the response type is dependent on implementation and may be specific for the various messages and commands used by the storage system General Description of DAC As mentioned above, a "distributive access controller" or "DAC" is a physical device which can be applied as a conjunctive device or as an integrated part of any kind of information storage unit in an electronic system. Applied as such, DACs allow secure sharing of common storage by transforming logically partitioned systems into physically partitioned systems with more secure electronic connectivity, and by removing the control of access permissions beyond the reach of attached systems. These DACs provide multiple access ports by which computer systems can attach to the DAC to access the storage unit(s) while governing the type of access allowed at each access port. Typically, each DAC provides a primary access port to which a capable owner connects to gain full control of the attached storage unit(s). Each DAC also provides at least one other secondary access port to which any capable system connects to gain restricted access to the same storage unit(s) without the aid of said owner. The type of access allowed through these lesser, secondary access ports is set by the DAC's hardware and may be changed only via the DAC's installed switches. These DACs enhance access control from attached systems by utilizing their physical point of attachment, namely each of the access ports, as an unmodifiable identity (ID) element. This mode of action generates a more trustworthy environment by removing the possibility that an attached system could act as an impostor and gain access to attached resources to which it has not been given rights. The owner of the attached storage unit or and the DAC can be certain that no attached system (whether local or remote) can override the DAC's access permissions.

Since the primary purpose of networking is to share information, protecting the information source (and often the destination) should be the primary goal of any security scheme. The DAC can be inserted into the bus path of any storage unit to act as an adjunct to the storage unit's own controller. In particular, the storage units may utilize IDE, Small Computer System Interface (SCSI), Firewire, Fiberchannel or other bus types, and include hard disk drives, RAM disk drives or multidrive units such as fiber-channel or standard RAID units. The DACs according to the invention can adapt even banks of random access memory (RAM) of any kind (e.g. dynamic, CMOS, NOV etc). Described in detail below are: a preferred embodiment of the DAC for access control to SCSI storage units, and a preferred embodiment of the DAC for access control to memory. When possible, annotations referring to points of variations with respect to the two described preferred embodiments for adapting other storage unit types will be provided.

Figure 1:
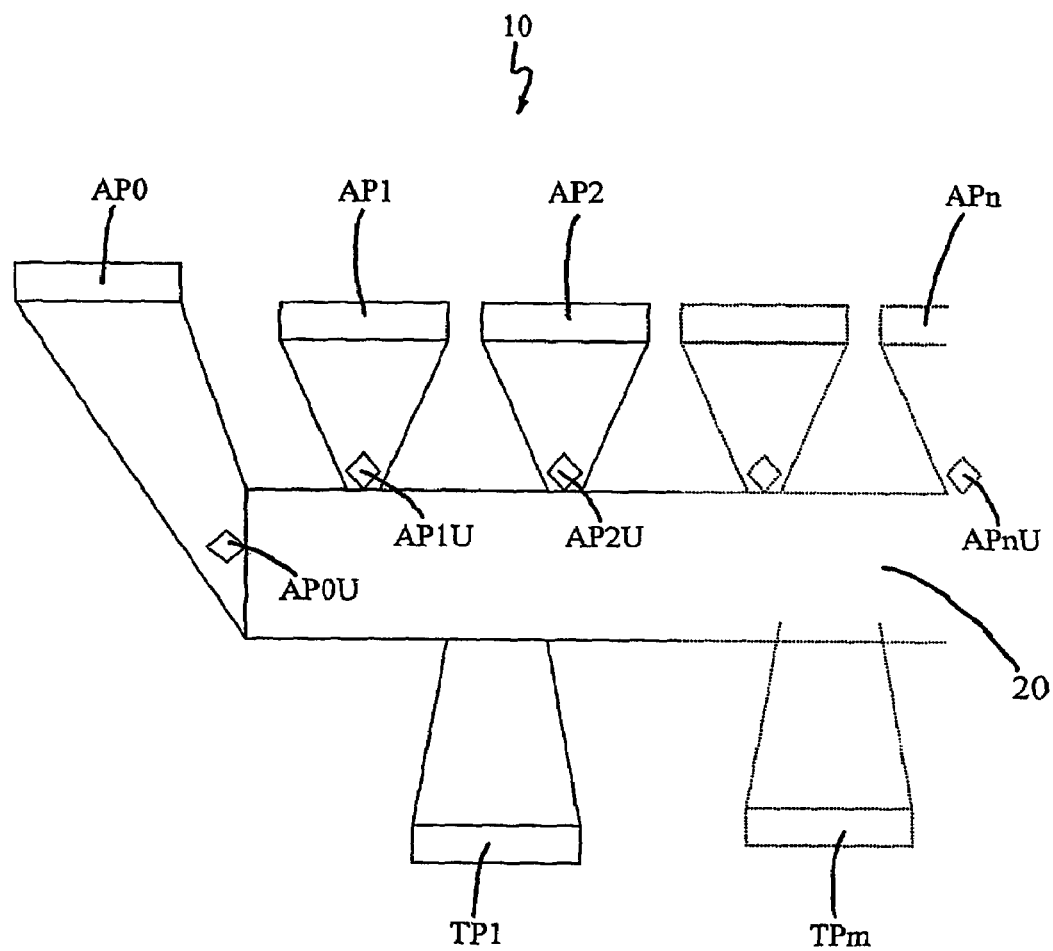
FIG. 1 is a general schematic illustration of a DAC depicting its primary functional component blocks.

FIG. 1 is a general schematic illustration of a DAC 10 depicting the primary functional component blocks of DAC 10. The generalized form of DAC 10 illustrated in FIG. 1 can be adapted for any of the widely varied methods and means by which computer systems may access the large variety of storage medium available to electronic systems. Referring to FIG. 1, DAC 10 comprises multiple access ports APx (where $0 \leq x \leq n$ and n is an integer $n \geq 2$) at which capable systems may attach to DAC 10 in order to access the storage unit(s) controlled by DAC 10. Of these access ports, one access port AP0 is differentiated to act as the primary or "owner" access port. Associated with each access port APx is a corresponding access controller unit APxU specifying the type of access allowed via the given access port APx; each of the corresponding access controller units APx may be pre-set by the owner through an access controller interface unit ACI (explained below). DAC 10 further comprises one or more transfer ports TPy (where $1 \leq y \leq m$ and m is an integer $m \geq 1$) at which one or more storage unit(s) may attach to DAC 10. DAC 10 further comprises an arbitrating communication control unit 20 that facilitates communication and the transfer of information between the access ports APx and the transfer ports TPy.

Figure 2:
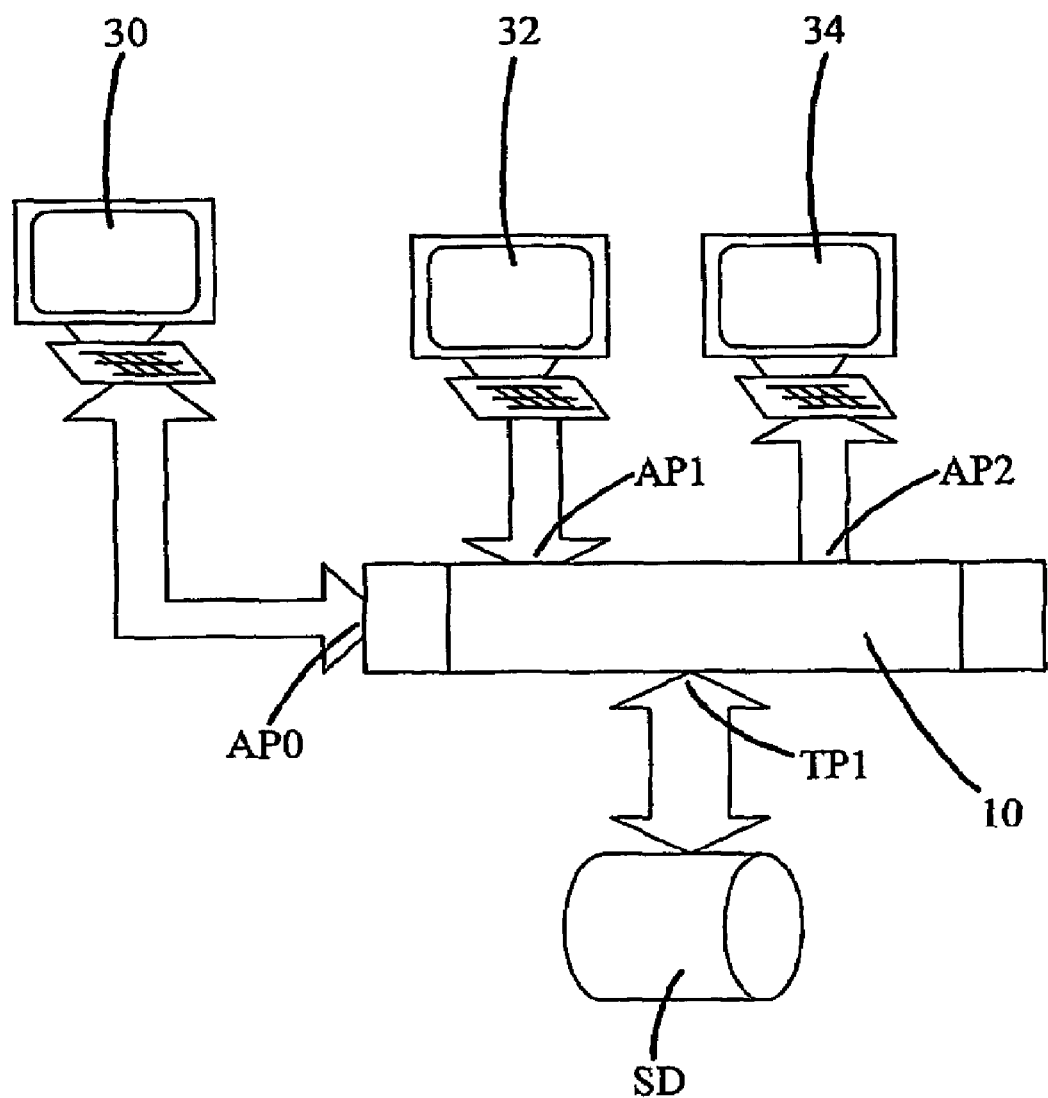
FIG. 2 is a general schematic illustration of a network-like system utilizing a DAC.

FIG. 2 is a general schematic illustration of a typical network-like system utilizing the DAC 10. Referring to FIG. 2, system attachments 30, 32, 34 attach to DAC 10 at access ports AP0, AP1, AP2 respectively and storage device SD attaches to DAC 10 at transfer port TP1. Each of the attachments 30, 32, 34 shown in FIG. 2 may represent, individually, a program, a singular computer, or an entire network (for example, LAN, WAN, or the Internet). Although only one storage device SD and three attachment 30, 32, 34 are shown in FIG. 2, DAC 10, as mentioned above, can be configured to accept a primary attachment and n additional secondary attachments (where n is an integer n≧1) along with m storage units (where m is an integer m≧1). Referring to FIG. 2, access port AP0 is the primary access port and the flow of information through access port AP0 and the ability of attachment 30 to control storage device SD is unrestricted except for what is needed to maintain transfer partitioning and integrity. On the other hand, access ports AP1 and AP2 are secondary access ports where restricted systems may attach to DAC 10 to gain access to storage devices attached to DAC 10, but with access restrictions imposed by the owner of DAC 10. In the example illustrated in FIG. 2, access port AP1 is designated as "write only" and so the flow of data from attachment 32 is allowed to proceed only from access port AP1 to storage device SD and not vice-versa, and DAC 10 generates appropriate signals to inform or mislead attachment 32 regarding the status of restricted transfer attempts. Access port AP2 is designated as "read only" and so the flow of information is restricted to the controls necessary to set up the access and the reading of information from storage device SD. DAC 10 partitions the port buses to effect transparent access and flow of information among access ports AP0, AP2, AP3 and transfer port TP1 for enhanced security. DAC 10 gives priority to, and allows all requests from, attachment 30 at primary access port AP0. On the other hand, DAC 10 qualifies access requests from attachments at secondary access ports AP1 and AP2 and intercedes as necessary to enforce access restrictions assigned to the corresponding access control interface unit AP1U, AP2U. Storage device SD receives and responds only to requests passed on by DAC 10.

SCSI Oriented DAC

The following description applies the general principles discussed above to an embodiment of DAC 10 suitable for SCSI storage units.

SCSI DAC Problems to Solve

For DAC 10 to adapt SCSI storage units for use as secured shared storage, several problems and opportunities arise that require special attention:

1. SCSI systems utilize identity (ID) values to uniquely specify which attachment is initiating a communication, and which attachment is being targeted for the communication. This can be used to allow DAC 10 to determine which systems to connect for authorized communications. Yet, DAC 10 must ensure that the initiator's ID is true and that the initiator's true ID is never known to the target in order to maintain the privacy of the initiator.
2. SCSI buses are shared buses: only one initiator and its target can communicate using the bus at any instance in time. DAC 10 must overcome this limitation in order to support multiple access ports and transfer ports.
3. To share the bus, the attachments must continually monitor the bus for an opportunity to use it. This means that each attachment is, and must be, aware of all other attachments on the bus. DAC 10 must prevent this in order to provide transparent access.
4. All targets must monitor the bus to determine when it is being targeted. This implies that all targets on the bus can be discovered by the simple act of presenting their ID with the initial connection request. DAC 10 must prevent this in order to provide appropriate access control to otherwise private storage.
5. The target can be told to disconnect and must depend on the initiator's ID in order to reconnect and complete whatever process was initiated. DAC 10 must support this feature while ensuring that the initiator's ID remains private.

SCSI DAC Characteristics

The first opportunity arises from the observation that as a DAC 10, an SCSI oriented DAC 10A must be able to adapt several initiators and storage units on the same device. The SCSI bus' use of targeting IDs makes it possible for initiating systems to concurrently and transparently access the attached storage units. Yet, each storage unit can only ever assume one ID value for every session following power-on-reset and all attached systems must target the storage units with this same ID. In addition, each attached system may have initiating devices whose IDs are unique within that system but may not be unique with respect to other systems that are serviced by the DAC 10A. This can present problems for routing and opportunities for misuse by impostors (systems attempting to gain access to resources by assuming the ID of other attached systems).

SCSI DAC Hardware Description

Figure 3:
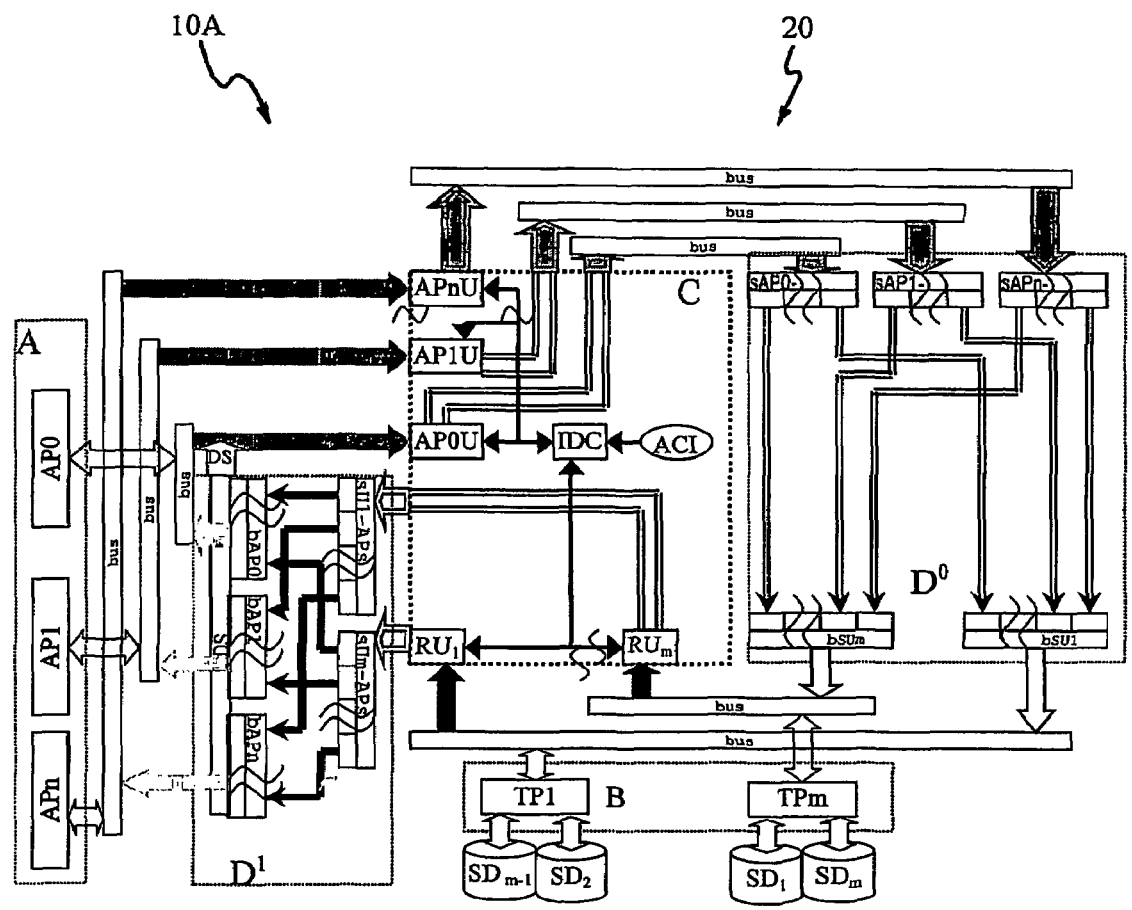
FIG. 3 is a detailed schematic illustration of the chief components of a DAC adapted for SCSI systems.

FIG. 3 is a detailed schematic illustration of the chief components of a DAC 10A adapted for SCSI systems. In particular, FIG. 3 illustrates a system that can successfully share m SCSI storage units among n+1 attachments (the owner's own attachment and n additional attachments). SCSI systems normally share a common bus, and use source and destination IDs to select communicating partners. To allow transparent sharing, no initiating system (at an access port) must be able to detect the presence of any other initiating system attached to DAC 10A. Likewise, no initiating system must be able to detect transfer port attachments with which they must not be able to communicate. These specifications are key to ensuring transparent access to shared storage without the risk of systems being impersonated. To meet these specifications, DAC 10A provides a unique bus attachment point for each attachment and routing controls to assure that each attachment is isolated from every other attachment at all times.

In FIG. 3, different parts of DAC 10A have been grouped into sections for ease of understanding, namely sections A, B, C, $D^0$ and $D^1$. In the example illustrated in FIG. 3, section A includes a primary access port AP0 and secondary access ports AP1, . . . APn from which attachments can access any given storage device SDy, where $1 \leq y \leq m$, provided that the particular attachment has been assigned permission by DAC 10A. Section B includes the transfer ports at which the storage devices SDy to be shared are attached; note that multiple storage units may attach to any transfer port. The communication control unit 20 of the DAC 10A is provided by sections C and $D^0$ and $D^1$. Section C is germane to the establishment and maintenance of the bus uniqueness described above, and will be discussed in greater detail below. Then the buses are kept isolated by sections $D^0$ and $D^1$, which also provide the access path to the target systems when necessary. Sections $D^0$ and $D^1$ may be integrated but are depicted as separate entities for ease of comprehension. Sections $D^0$ and $D^1$ provide the path through which the communication signals flow to and from participating access ports and transfer ports. The depicted connecting buses are also simplistically represented for ease of comprehension. The communication path combinations selected for this embodiment afford optimal utility, versatility and throughput of the other possible circuit implementations that can be considered.

Section C is the main processing section of DAC 10A. Each access port APx has a corresponding access controller unit APxU ($0 \leq x \leq n$), and each transfer port TPy has a corresponding access controller unit RUy ($1 \leq y \leq m$). In the example illustrated in FIG. 3, section C includes n+1 individual access controller units APxU ($0 \leq x \leq n$) and m individual access controller units RUy ($1 \leq y \leq m$). It is possible to operate one access controller unit APxU and one access controller unit RUy with a sequencer/selector to multiplex each bus for processing. However, this modification, even though functionally possible, would induce significant access delays and thus decrease performance of DAC 10A. As shown, up to a minimum of (n+1) or m independent concurrent paths can be established for maximum throughput.

Figure 4:
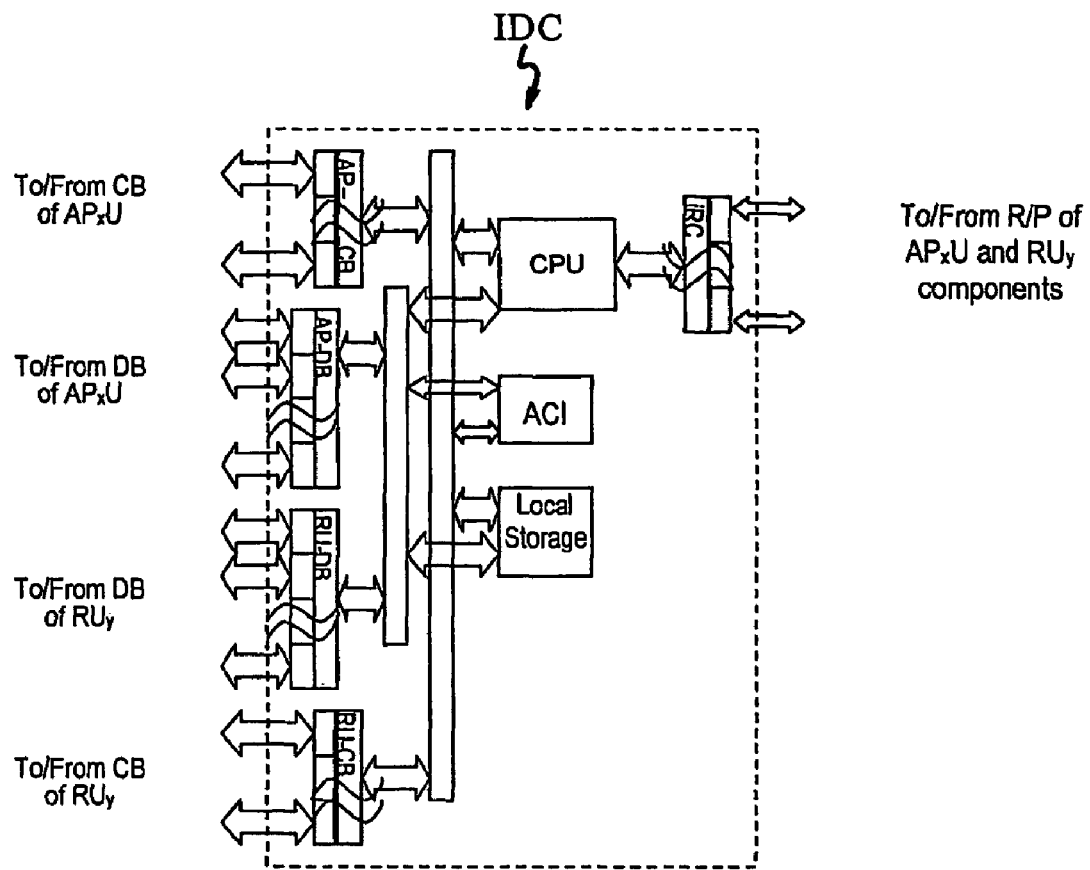
FIG. 4 is a schematic illustration depicting the functional layout of the "Interlock and Datalink Coordinator" processing component of the SCSI oriented DAC.

Section C includes a centralized processing component IDC which functions as an "Interlock and Datalink Coordinator" for coordinating path allocation and control through the DAC 10A ("interlock" will be discussed below, and refers to the situation where the path from the access port to the transfer port is locked and the attachments thereto are permitted to communicate). FIG. 4 is a schematic illustration depicting the functional layout of processing component IDC. Processing component IDC centralizes control and co-ordinates activities between access controller units APxU and RUy, $0 \leq x \leq n$ and $1 \leq y \leq m$. Processing component IDC utilizes its own central processing unit and local storage, in addition to the ability to access registers and local memory of all access controller units APxU and RUy. Processing component IDC has a separate local data bus DB and control bus CB which multiplexes signals (via APxU-CB, APxU-DB, RUy-CB, RUy-DB) from each access controller unit APxU and/or RUy as needed to process and disseminate controls for data flow. Requests for service from access controller units APxU and/or RUy are received separately at an interface request controller IRC and are prioritized and queued internally to ensure service is granted. In particular, an access controller unit APxU and/or RUy issues a "link Request/command Process" signal R/P to request clearance from processing component IDC to establish a path between an access port APx and a transfer port TPy, or to qualify the bus signals required to safely process a command or message or subsequent data transfers. Controller IRC records and prioritizes these signals R/P and interrupts processing component IDC according to parameters set by the owner of DAC 10A. Processing component IDC responds to a signal R/P with a "grant/deny" signal G/D to indicate whether the required path or target is available and reserve the path access for the access controller unit APxU or RUy.

Figure 5:
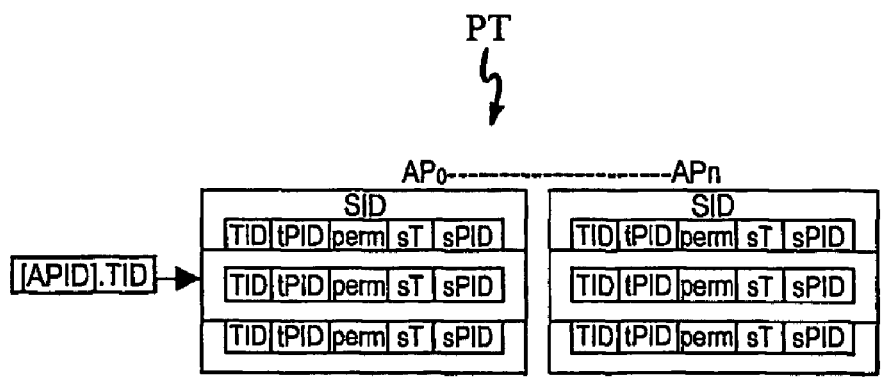
FIG. 5 is a conceptual diagram of an access port permission table composed by an "Access Control Interface" unit to implement access control requirements specified by the owner of a SCSI oriented DAC.

Processing component IDC includes an access control interface unit ACI from which the owner of DAC 10A specifies the access control requirements needed for each link between each access port APx and each transfer port TPy. Unit ACI is located on processing component IDC to allow runtime permission modification without interfering with or needing to completely reset DAC 10A. FIG. 5 is a conceptual diagram of an access port permission table PT composed by unit ACI. Permission table PT is set by the owner (the party who controls DAC 10A) and details the source identifier SID of the system attached to each access port APx. Permission table PT further defines the target identifier TID of each target storage device SDy that is accessible to the access port APx, the transfer port identifier tPID to which the target storage device SDy is attached, and the permission codes (perm) allowed from the source identifier SID to the target identifier TID. Such permission codes may be taken from the following Table I:

TABLE I

Access Permission Codes by DACs

| V | 1° | Write | Read | perm |
|---|---|---|---|---|
| 0 | 0 | 0 | 0 | no access (na) |
| 0 | 0 | 0 | 1 | read-only (r) |
| 0 | 0 | 1 | 0 | write-only (w) |
| 0 | 0 | 1 | 1 | read-write (rm) |

TABLE I-continued

Access Permission Codes by DACs

| V | 1° | Write | Read | perm |
|---|---|---|---|---|
| 0 | 1 | 0 | 0 | Owner with no access (*m) |
| 0 | 1 | 0 | 1 | read-only with shadow (*r) |
| 0 | 1 | 1 | 0 | write-only with shadow (*w) |
| 0 | 1 | 1 | 1 | full control (m) |
| 1 | 0 | 0 | 0 | virtual-no access (na) |
| 1 | 0 | 0 | 1 | virtual-read-only (r) |
| 1 | 0 | 1 | 0 | virtual-write-only (w) |
| 1 | 0 | 1 | 1 | virtual-read-write (rw) |
| 1 | 1 | 0 | 0 | virtual-Owner of inaccessible share (*m) |
| 1 | 1 | 0 | 1 | virtual-read-only share (*r) |
| 1 | 1 | 1 | 0 | virtual-write-only share (*w) |
| 1 | 1 | 1 | 1 | virtual-Owner of read/write share (m) |

Table I shows the possible permission codes for any attachment to an access port APx to access any storage device SDy on any type of DAC 10, not only a SCSI oriented DAC 10A. Depending on storage system implementation, some permission codes may be unused or may have expanded functionality. On a SCSI oriented DAC 10A, the na permission code prevents a storage device SDy from being discovered or accessed from the given access port APx. On a RAM oriented DAC 10B (explained below), na does not make the attachment at a transfer port TPy inaccessible (a null-attachment is used instead), it notifies the hardware that a software component must pre-empt all access to that attachment. On the RAM oriented DAC 10B, the rw permission gives the attachment at access port APx exclusive access to the attachment at transfer port TPy, with the guarantee that elements of the attachment may only appear in the attachment of any other access port APx with the na or *m permission. The r permission guarantees that elements of the attachment may only appear in the attachment of any other access port APx with the na, *m, or same permission. Furthermore, it guarantees that only one other attachment at an access port APx can access an element of attachment with the w permission. The w permission guarantees that elements of the attachment may only appear in the attachment of any other access port APx with the na, *m, or opposite permission. On the SCSI oriented DAC 10A, the w allows the access port APx to add to the contents of the storage device SDy but not modify its existing contents, while rw allows content modification but not management of the storage units. On a RAM oriented DAC 10B, the *m permission is reserved for memory management transfer port TPy attachments only and refers to an attachment (access port APx or transfer port TPy) which has been allocated to another access port APx. The hardware of DAC 10 treats access to an attachment with this permission as an access violation. On a SCSI oriented DAC 10A, *m is applied to storage devices SDy that are being intercepted by a master access port attachment, or storage devices SDy whose "shadows" (explained below) are non-operational. On all DAC 10 that support the shadow feature, the permissions *r and *w indicate that the specified operation (r or w respectively) is allowed at the target identifier TID, and that the opposite permissions (w and r, respectively) must be directed at the shadow target. On the RAM oriented DAC 10B, the m permission is reserved for memory management access ports and denotes free transfer port attachments that may be allocated as access port or transfer port attachments as needed. No element of such an attachment may appear in any other attachment whatsoever. On the SCSI oriented DAC 10A, m allows the access port APx full access to the storage device SDy with the freedom to manage the storage device SDy. The virtual permission bit (V) is included for historical compatibility for systems that use the virtual addressing techniques. The virtual permissions operate similarly to the first four corresponding permissions in the table but DAC 10 uses the shadow field as an offset to find the intended target. The shadow feature is not supported with virtual permissions and the hardware ignores its permission bit setting. The virtual share permissions that use the $1^0$ bit are merely recommendations for software use.

Referring to FIG. 5, for a SCSI oriented DAC 10A that supports a shadow feature, the shadow target identifier sT and shadow transfer port identifier sPID for locating and accessing the shadow target storage device SDy can also be defined in permission table PT. The access permission of shadow target storage device SDy is the implied opposite of the primary target (see Table I). Target identifier TID and shadow target identifier sT must be different if they are both on the same transfer port TPy. When the permission codes define a "virtual" permission, shadow target identifier sT and shadow target port identifier sPID are used instead of target identifier TID and transfer port identifier tPID for valid access modes.

Figure 6:
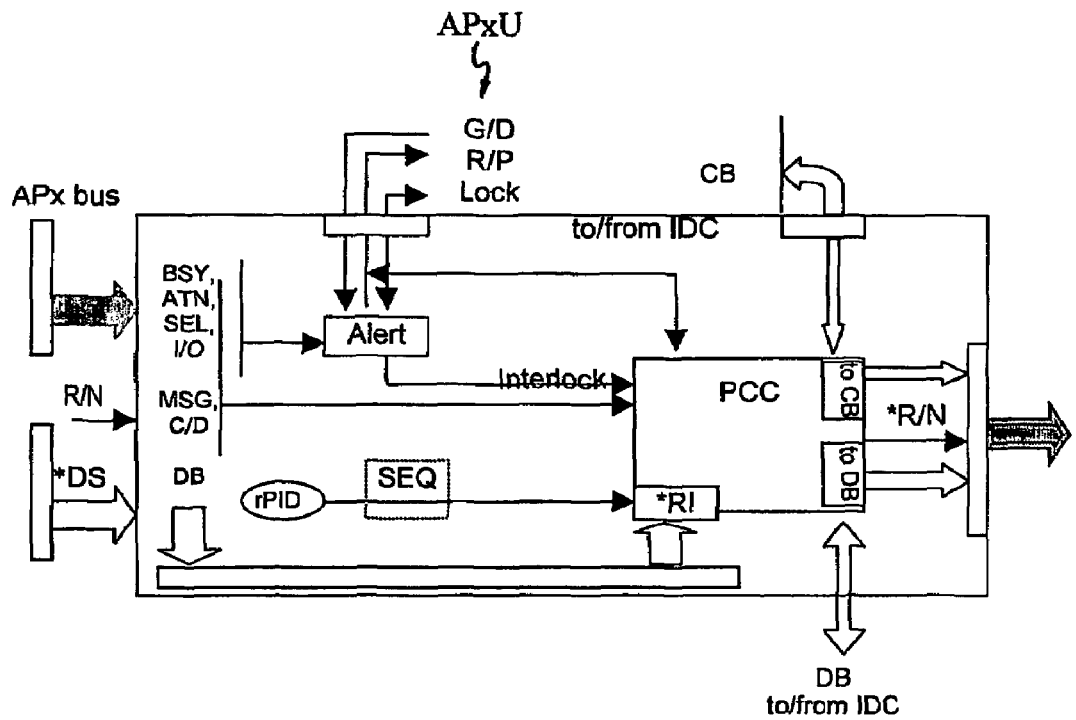
FIG. 6 is a detailed schematic illustration of an access controller unit for an access port in a SCSI oriented DAC.

FIG. 6 is a detailed schematic illustration of the components of an access controller unit APxU, where $0 \leq x \leq n$. Each access controller interface unit APxU with an attachment to its corresponding access port APx requires access to an attached storage device SDy, establishes the data-flow path required, issues a signal R/P to processing component IDC, and handles disallowed requests. Each access port APx has its own unique port identifier APID which is used to route signals back to the correct access port to ensure system integrity. Each attachment at an access port APx similarly has a source identifier SID, which is the name or number used to explicitly define such an attachment; however, for purposes of access through DAC 10A, source identifier SID is temporarily replaced during a "Selection" process by a unique source identifier USID (this addresses both the anonymity issue as well as the issue of different access port attachments having the same SID). A port communication controller PCC is responsible for supervising the activities through each established unidirectional path of an effectively bidirectional bus, and controller PCC generates and recombines signals to set up, maintain, and route signals through a data-flow path. Controller PCC also contains a processing unit capable of decoding and encoding SCSI signals so as to detect bus phases and to respond to a subset of the SCSI messages and commands.

As explained in further detail below, access controller unit APxU includes an "Alert" module which determines when an attachment wishes to communicate through an access port APx, and alerts processing component IDC of DAC 10A so that a path to the intended target can be established. The Alert module asserts an "interlock" signal, which is a SCSI-specific signal set by the Alert module to indicate that the path between the access port and the transfer port has been locked and secured, thereby providing an exclusive access path between the participating access port and transfer port; only then are the access port and transfer port attachments allowed to communicate. This condition may be described as "interlocked" for the purposes of the following description. When the signal Interlock is released, controller PCC then frees the locked access path(s) so that they may be reassigned to other transfer ports and access ports. This system allows for as many concurrent transaction paths as the minimum of (n+1) or m. Each access control unit APxU manipulates a data bus DB and a control bus CB.

FIG. 6 shows some components that are present only in access controller unit AP0U, and not in any other access controller unit APxU, where $x \neq 0$. One of those components present only on access controller unit AP0U is a "Reset and Initialization" subcomponent RI, which performs reset and initialization processing. DAC 10A treats subcomponent RI as an additional attachment at access port AP0, and an optional reset port ID register rPID contains the port identifier APID assigned to access port AP0 and assigns the same port identifier APID to subcomponent RI. A data shunt DS is also present only for access controller unit AP0U and is a shunt pathway used by subcomponent RI during a bus scan; data shunt DS returns data bus DB and control bus CB to subcomponent RI when the access port buses are disabled during a "Reset" (as explained below).

Figure 7:
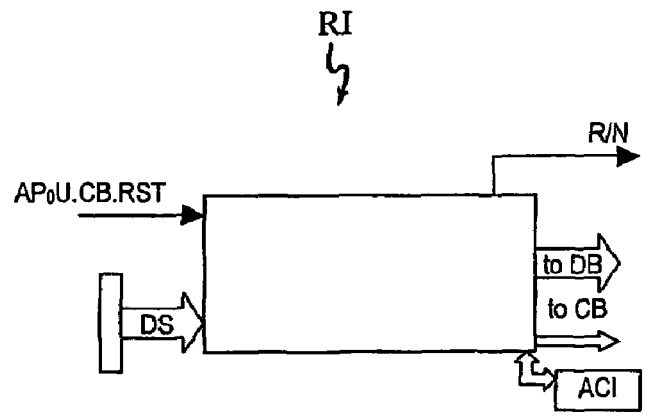
FIG. 7 is a more detailed schematic illustration of the "Reset and Initialization" subcomponent present on the access controller unit for the primary access port in a SCSI oriented DAC.

FIG. 7 is a more detailed schematic illustration of subcomponent RI. At power-on to DAC 10A, subcomponent RI subsumes the role of controller PPC of access controller unit AP0U in order to gain access for scanning all transfer ports TPy and access ports APx. The access functionality of access ports APx is simulated by data shunt DS. Subcomponent RI also has access to the permission table PT of unit ACI for initializing permissions set by the owner of DAC 10A. Subcomponent RI also monitors a reset line RST, which is generated only by AP0U in response to a "Reset" message from the owner of DAC 10A to perform a partial reset of all devices attached to all transfer ports TPy.

Figure 8:
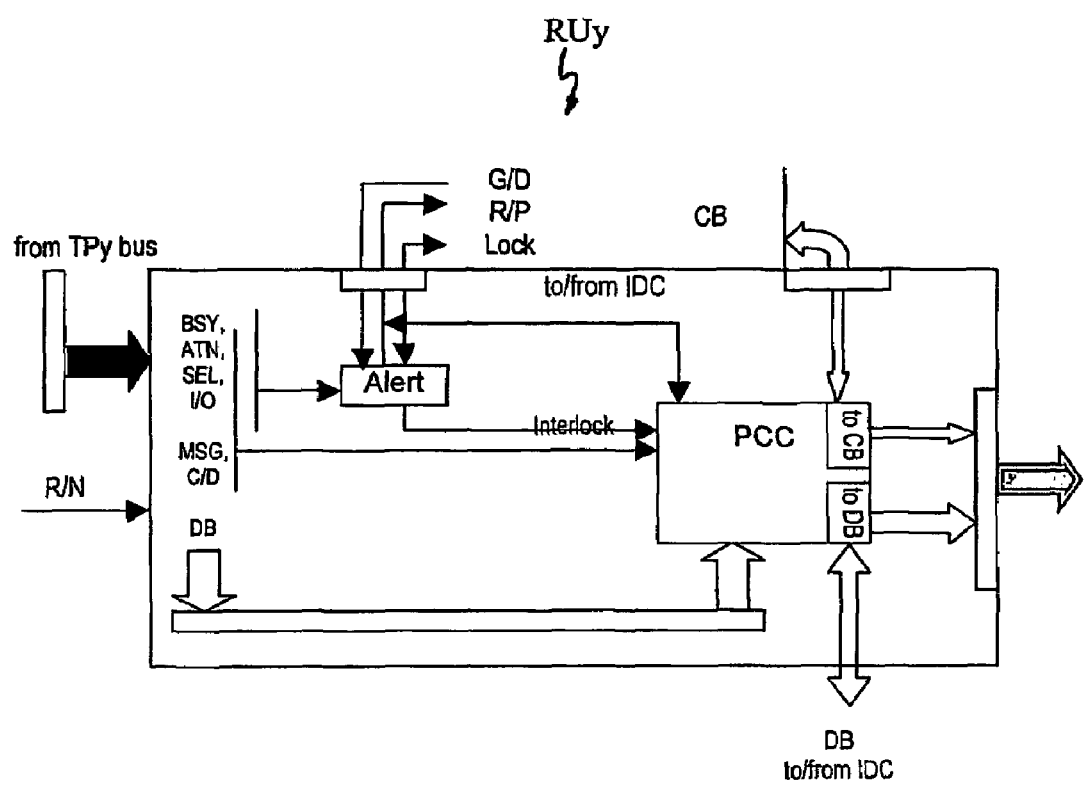
FIG. 8 is a detailed schematic illustration of an access controller unit for a transfer port in a SCSI oriented DAC.

FIG. 8 is a detailed schematic illustration of the components of access controller unit RUy, where $1 \leq y \leq m$. Access controller unit RUy is almost identical to access controller unit APxU, which makes sense since SCSI systems allow target storage units to re-initiate connections. The primary difference is that access controller unit RUy triggers a "Reselection" process in DAC 10A, during which processing component IDC uses the temporary unique source identifier USID to retrieve the port identifier APID and the original source identifier SID. Messages and commands from a reselecting target are also filtered, in a manner similar to how source items are filtered by an interlocked APxU. A real implementation may take advantage of the interlocked processing to incorporate access controller units APxU and RUy into one component, multiplexing operational differences as determined by the selection/reselection outcomes of a predetermined truth table.

SCSI DAC Initialization

As discussed above, subcomponent RI is reserved for the owner access port AP0 and thus is present only in the access controller unit AP0U. The task of subcomponent RI is to generate a "Reset" condition at power-on and process the Reset signal for the owner access port AP0 only. The power-on reset condition forces the access controller unit AP0U into initialization mode.

Figure 9:
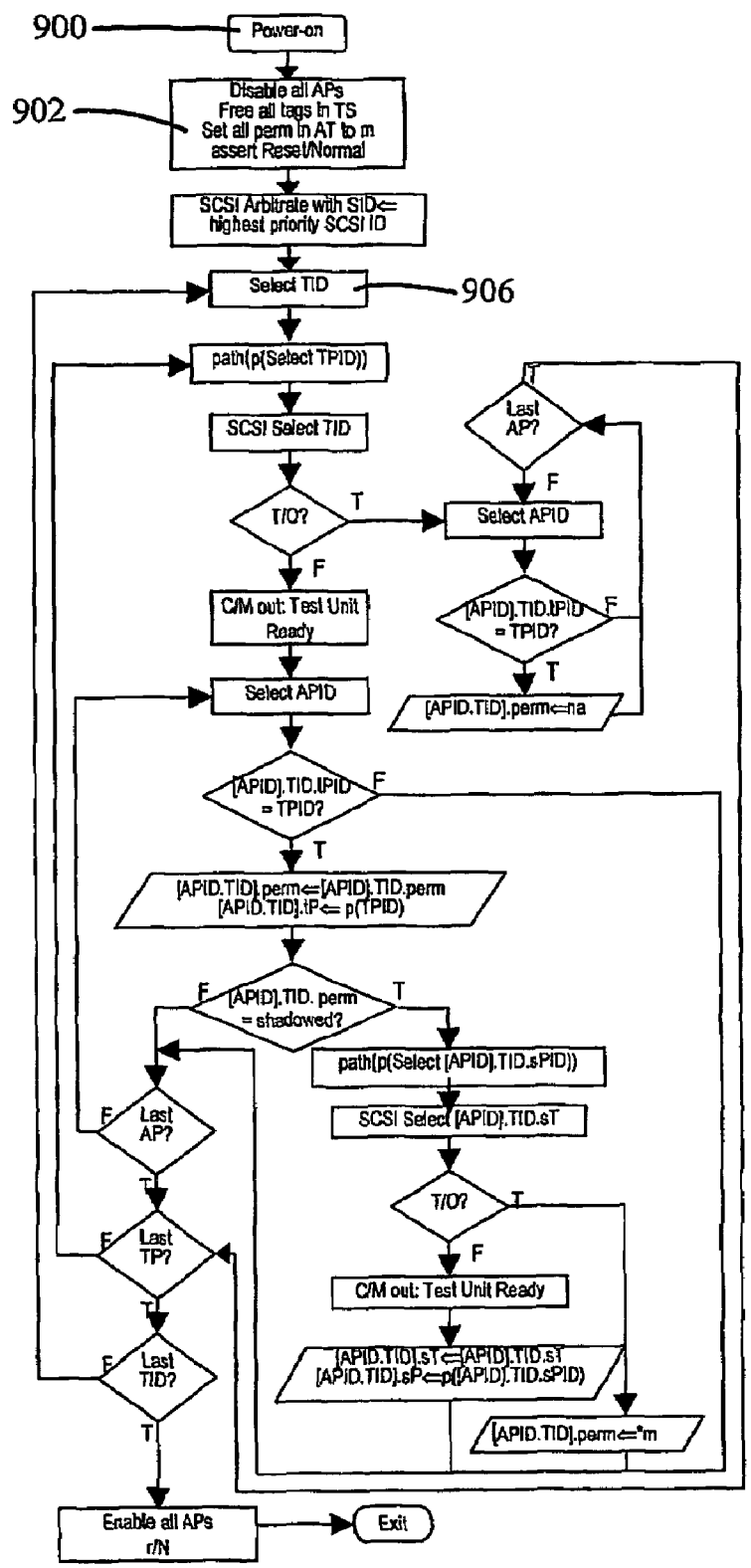
FIG. 9 is a flowchart outlining the initialization process which prepares a SCSI oriented DAC for normal operation.
Figure 10:
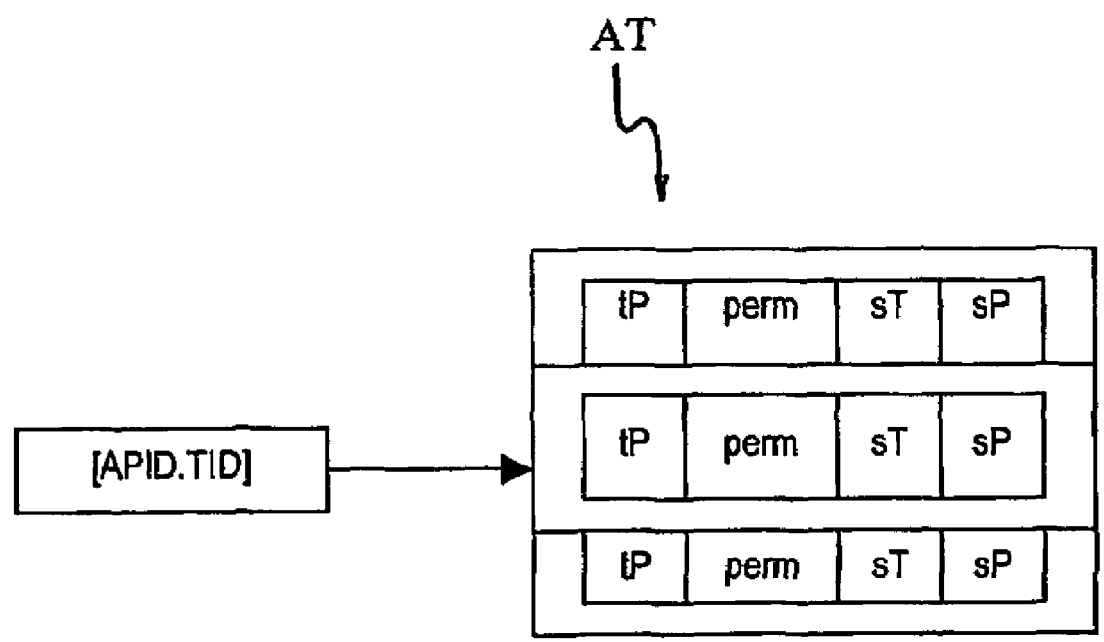
FIG. 10 is a diagram of the logical structure of an access table used by a SCSI oriented DAC.

FIG. 9 is a flowchart outlining the initialization process, which prepares the DAC 10A for "Normal" operation. As shown in step 900, the first step of initialization is to power-on the DAC 10A. As shown in step 902, all access port buses are disconnected to prevent any attachments from interrupting the process. As mentioned, subcomponent RI is situated in the path of the primary access port AP0, and acts as an attachment at access port AP0. Subcomponent RI gains full control of DAC 10A by activating data shunt DS. As shown in step 906, subcomponent RI then actively scans for storage devices SDy using their target identifiers TID at each transfer port TPy and builds an access table AT, as illustrated in FIG. 10. Subcomponent RI logs from unit ACI into access table AT the port identifiers TPID and their access permissions in respect of each access port APx, using the permission table PT illustrated in FIG. 5. Path selector tP creates a bi-directional path between APx and SDy, and path selector sP creates a bidirectional path between APx and a shadow device. Unassigned target identifiers TID are excluded while assigned target identifiers TID that are missing or unresponsive are assigned the "No Access" (na) permissions at all access ports APx to prevent them from being targeted for use. The four-bit access codes, defined in Table I, are used when needed by the processing component IDC to determine the signals necessary to control the data-flow paths. Note that the na permission prevents any present storage device SDy from being discovered by a given access port APx and its attachment. DAC 10A may use the virtual permissions but these permissions are inherently less secure and less versatile than the non-virtual permission set. For virtual permissions, the shadow target identifier sT and shadow target port identifier sPID are actually used to select a target although the target identifier TID is used by the source and used for the access validation. For the rest of this discussion, the virtual permissions must be considered operationally identical to non-shadowed permissions with the stated target selection exception.

SCSI DAC Normal Operations

After the power-on Reset and Initialization process illustrated in the flowchart in FIG. 9, "Normal" operation (r/N) is asserted and attachments are allowed to access storage devices SDy controlled by DAC 10A. Attachments at access ports APx are expected to perform an initial scan to determine what, if any, SCSI storage devices SDy are present in its environment. Such a scan should be issued at system start-up unless the operating system (OS) can dynamically install devices. DAC 10A will not respond if a scanned target is not attached to DAC 10A or not allowed to be accessed by the attachment or from its access port APx and the attachment will timeout unless the required storage device SDy is present on its local bus. Thereafter, a timeout during SCSI selection of an accessible storage device SDy controlled by DAC 10A should only mean that the target is busy. Attachments that encounter such timeouts should retry for a reasonable number of attempts until the target can respond or is assumed to be malfunctioning. Additional logic can be added to forcibly disconnect a communication path (by initiating a target disconnect to the source and a source disconnect to the target) after a time interval. DAC 10A could force the target to wait before reconnecting by ignoring it (allowing it to timeout whenever it attempts a reselection) for a given time interval. DAC 10A would reinitiate the connection when all allowed attachments have had a fair chance to connect to the storage device SDy, or it can allow the target access to a path when the waiting interval has expired.

The following is a step by step description of how DAC 10A processes a communication event from a given secondary access port APx, $1 \leq x \leq n$, to a given target on a given transfer port TPy. The discussion focuses on one particular pair of these ports but is applicable to any pair of access port APx and target port TPy on DAC 10A. When the port pair involving the primary access port AP0 would differ in function, the difference is addressed at the earliest possible moment in the discussion below. Note that the discussion will be applicable to all communication between any access port APx and any transfer port TPy unless otherwise specified.

SCSI DAC Path Selection

When an attachment, for example at access port AP1, attempts to access a storage unit, for example storage device SD2 at transfer port TP1, a unique path must be established to allow this communication. As shown in FIG. 3, access to storage from access port AP1 is controlled by access controller unit AP1U and access to data from storage device SD2 is regulated by access controller unit RU1 of section C. Together, these components must determine when access is being requested and facilitate access if it should be granted. Component AP1U is shown in greater detail in FIG. 6 (although it should be noted once again that subcomponent RI and related components in FIG. 6 are not a part of access controller unit AP1U) and access controller unit RU1 is shown in greater detail in FIG. 8.

Figure 11:
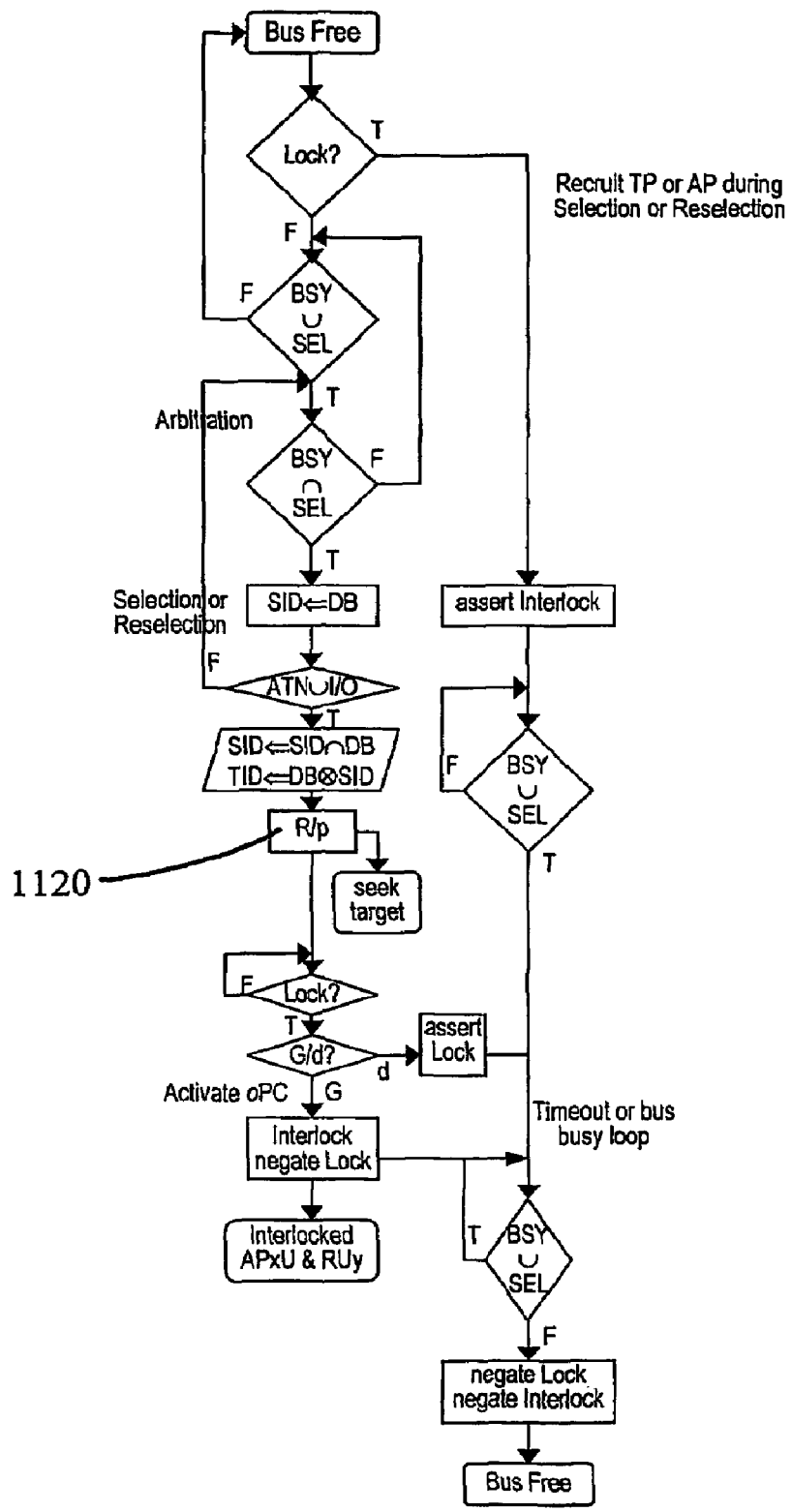
FIG. 11 is a flowchart illustrating the operation of the Alert module of an access controller unit for a SCSI oriented DAC.

Each access controller unit AP1U and access controller unit RU1 has an Alert module that detects and negotiates a request for access; the operation of the Alert module is illustrated in the flowchart in FIG. 11. The Alert module is implementation specific and must be adjusted to suit each implementation. In FIG. 11, BSY, SEL, ATN and I/O are SCSI bus signals that can be snooped to determine the state of the bus. The Alert module then generates signal R/P to notify DAC 10A when an access port or transfer port attachment wishes to access DAC 10A as a pathway for communication. The Alert module also generates a signal Interlock to notify its parent access controller unit APxU or RUy that it has been assigned rights to a given data path, and negates it when the path has been relinquished. Note: side-processes with no visible exit indicate a triggered process in processing component IDC. Distribution of such processing allows for maximum utility of resources.

The Alert module is critical to the efficient functioning of DAC 10A and should be implemented as a pure logic circuit (i.e. function not fully implemented in software). The Alert module depends on the processing modules of processing component IDC. As shown in step 1120, when the Alert module asserts a signal R/P with the signal "Lock" negated, processing component IDC enters the "Seek Target" process illustrated in more detail in the flowchart in FIG. 12 to determine if access should and can be granted, and if the path can be established (the target is not otherwise engaged).

Figure 12:
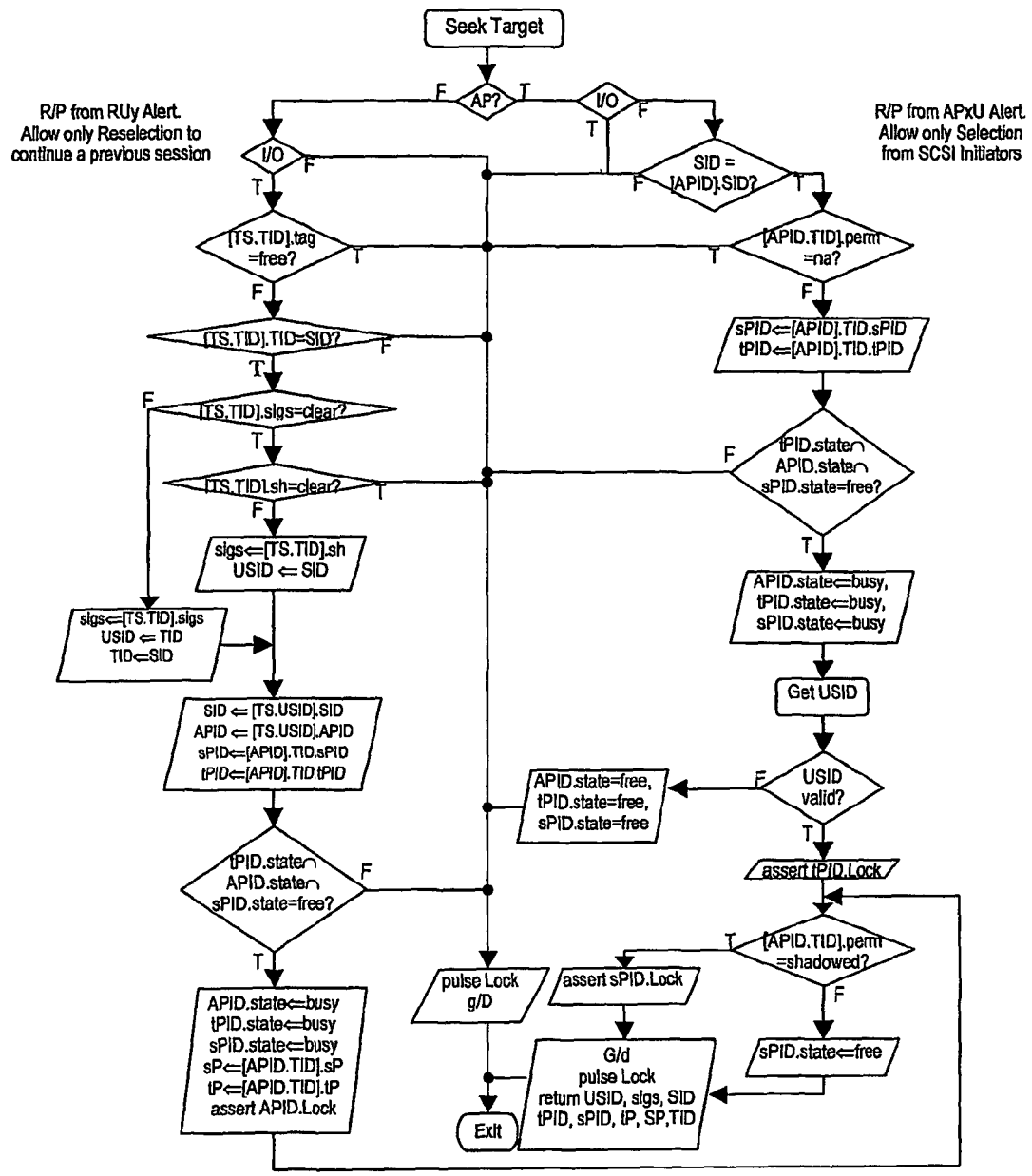
FIG. 12 is a flowchart depicting the actions of the "Interlock and Datalink Coordinator" processing component to a Request/Process signal asserted by the Alert module to locate and address accessibility to a requested target system.

FIG. 12 is a flowchart depicting the actions of processing component IDC component to signal R/P asserted by the Alert module to locate and address accessibility to a requested target system. Processing component IDC. validates path availability and use rights of the involved ports by the target and source units. The process utilizes permission records of access table AT (shown in FIG. 10) and routing records of a transitory stack TS (explained below), depending on whether signal R/P was asserted by an access controller unit for an access port APx or for a transfer port TPy. Port state (port.state) information is derived both from internal records of processing component IDC as well as the Lock status of the given port since devices external to the port can use the external SCSI bus.

Figure 13:
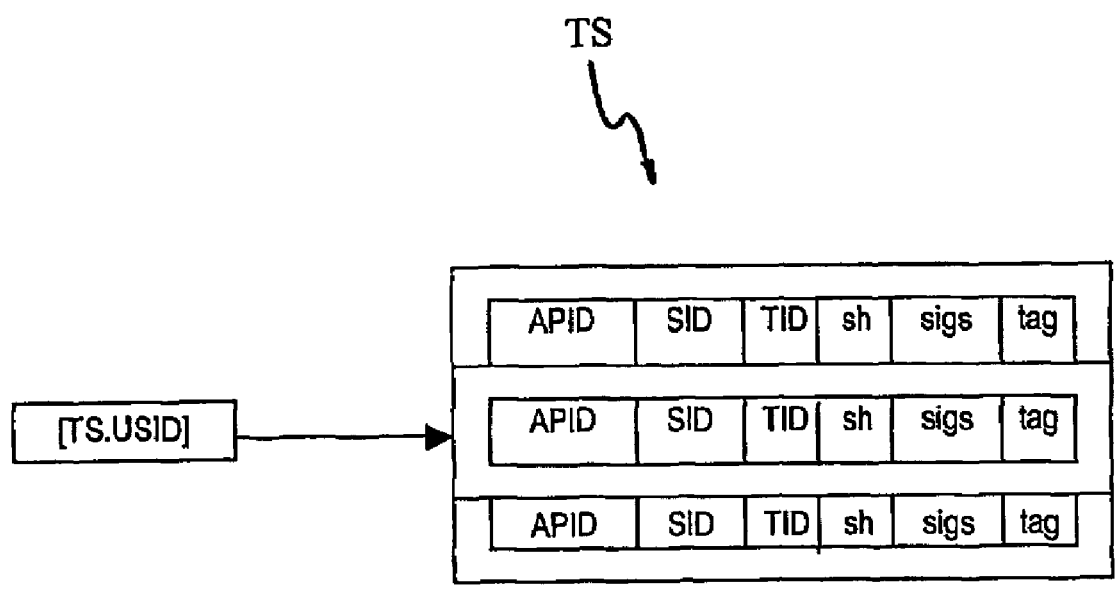
FIG. 13 is a diagram of the Transitory Stack of a SCSI oriented DAC.

Stack TS is a transitory stack in the form of an array of records used to store the path and bus states for data transfers that terminate without being completed or aborted. FIG. 13 shows the utilization of a dynamic allocation table for stack TS. It is used to generate a unique source identifier USID to support the SCSI communications feature of disconnection and reconnection. It also enables a fully populated DAC 10A to host access ports APx with attachments that have the same source identifiers SID and allow each to access any or all transfer port TPy attachments without conflict. The elements of the allocation table are the access port identifier APID, the source identifier SID, flags for historical control of data and control bus signals (sigs and sh), and a flag (tag) to note whether a particular unique source identifier USID has been allocated or not. The unique source identifier USID, first generated as a replacement for a presumedly non-unique source identifier SID is also the index for locating the source identifier SID and its related counterparts.

Figure 14:
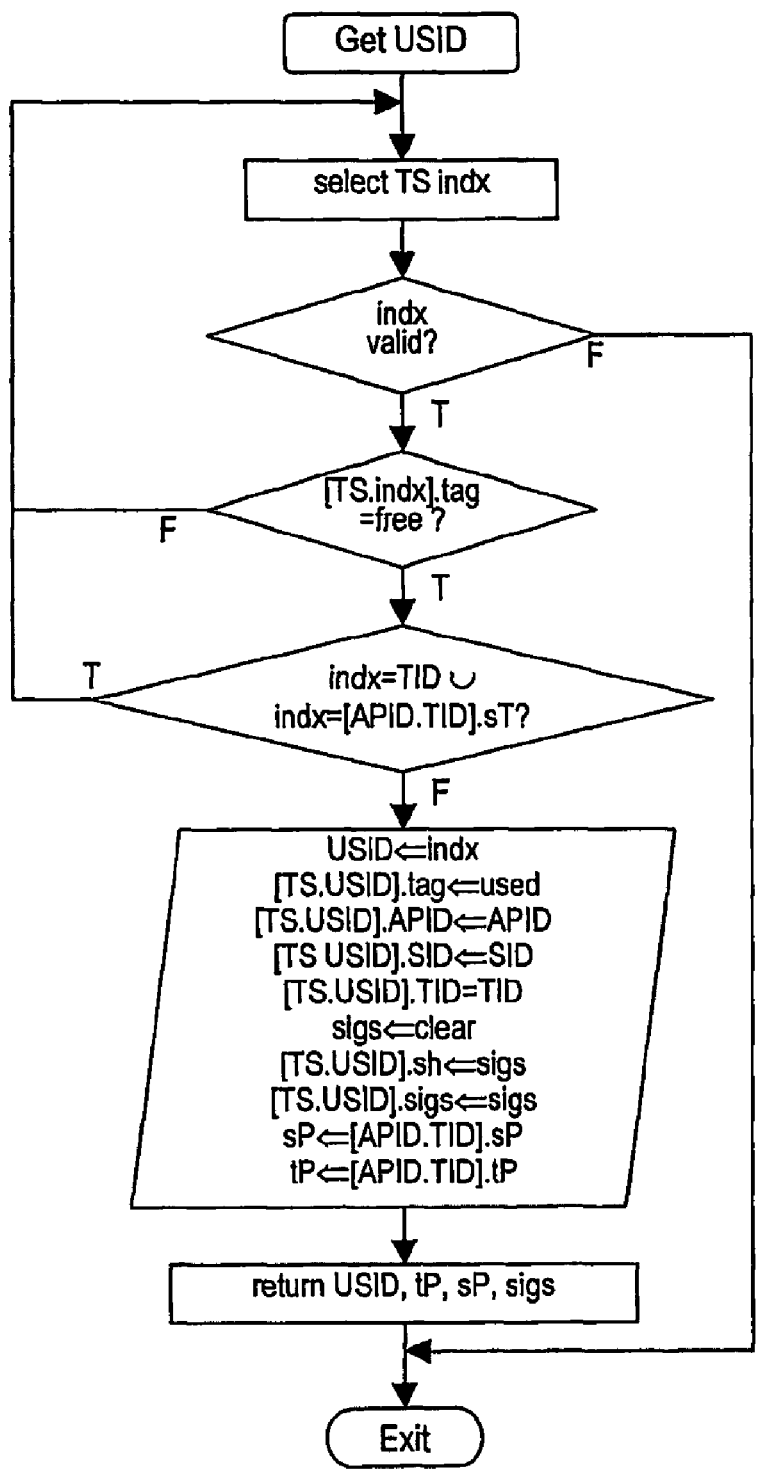
FIG. 14 is a flowchart depicting how a SCSI oriented DAC uses internal routing controls to enforce port usage and access transparency.

The flowchart in FIG. 14 depicts how DAC 10A uses internal routing controls to enforce port usage and access transparency; in particular, it depicts the internal dynamic access routing control by processing component IDC. Each unique connection out to a terminal unit is assigned a unique source identifier USID that is known only to DAC 10A and is used by DAC 10A to replace the original source identifier SID. This unique source identifier USID is used to locate the real source for any reply it should receive, and for connection re-establishment by the target.

For access port AP1, only the Selection (Sel/resel) phase is recognized and will be processed only if permissions allow it, and a unique source identifier USID can be allocated in accordance with the flowchart in FIG. 14. A target may be inaccessible because it is being accessed by another access port APx, or its transfer port bus is in use by some other device in its local system. As shown in FIG. 11, DAC 10A is aware of all busy local buses since access controller unit APxU or RUy will have invoked the Seek Target process and received a Deny access (g/D) from the processing component IDC, to which it responded by asserting the signal "Lock" until the external bus is released. For a reversed connection (where storage device SD2 attempts to reconnect to the attachment at access port AP1) only the Reselection (sel/Resel) phase is recognized and will be processed if a valid unique source identifier USID was already allocated to it. Since all access port and transfer port local buses are isolated, DAC 10A never contends during the "arbitration" process shown in FIG. 11, thus a timeout is the only manner by which to respond to an unavailable path, and the proper manner by which to respond to the intrusive attempt of making a prohibited access. As already stated, any condition that prevents the successful allocation of a path will cause processing component IDC to issue a signal g/D (meaning "access denied"), or else the processing component IDC will assert a signal G/d (meaning "access granted"). Aside from asserting signal Lock in response to signal g/D, the Alert module also allows a SCSI Sel/Resel timeout to occur after which, the attachment may retry its access or abort its attempt. In the case of signal G/d, the Alert module will issue signal Interlock to controller PCC, activating it and allowing it to assert the path which was passed to it by processing component IDC. Processing component IDC will also assert signal Lock to the desired Alert module to notify it that its controller PCC must participate in the communication path. Once signal Interlock is issued, the Alert module maintains signal Interlock until the bus becomes free (signals BSY and SEL are negated).

SCSI DAC Access Verification

Figure 15:
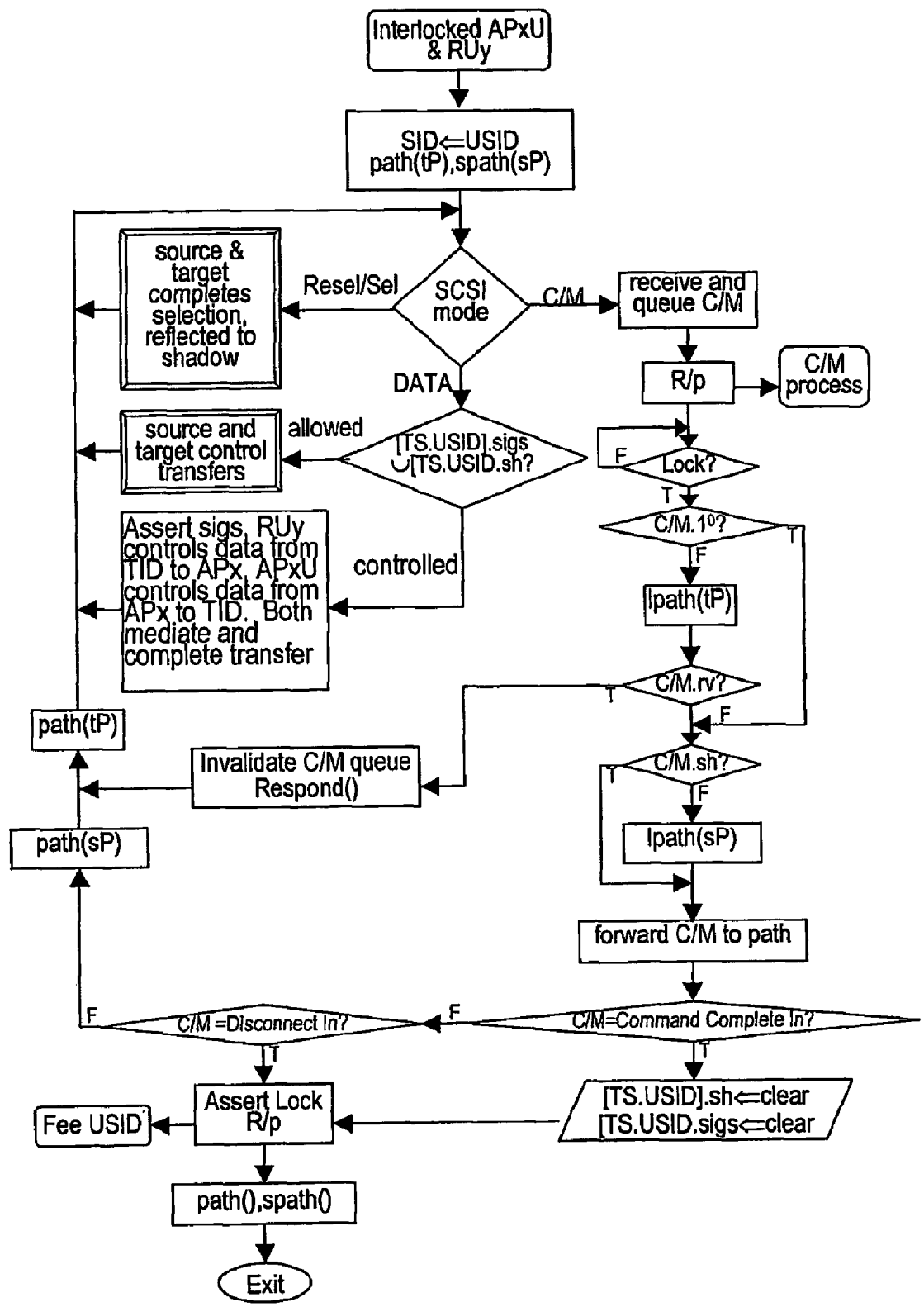
FIG. 15 is a flowchart depicting the formal operation process of a SCSI oriented DAC for a particular access port to transfer port communication session.

With signal Interlock asserted, controllers PCC of access controller unit AP1U and access controller unit RU1 are activated and will mediate all activity between the source access port AP1 and the target storage device SD2, as depicted in the flowchart in FIG. 15. First, controller PCC asserts path selectors tP and sP to activate the individual unidirectional path buses controlled by the access controller unit AP1U and access controller unit RU1. The initial state for controller PCC is the Sel/Resel mode in which controller PCC allows the target and source to complete the Selection process unimpeded except to replace source identifier SID with the unique source identifier USID and vice versa. For all other exchanged commands or messages, access controller unit AP1U will replace all references to source identifier SID with unique source identifier USID before allowing them to reach the target. Likewise, access controller unit RU1 will replace unique source identifier USID instances with the true source identifier SID before it returns any messages from the transfer port TPy. Processing of transactions on an established path through DAC 10A is summarized in Table II:

TABLE II

Sub-component oPC & iPC of Components AP × U & RUy from, Section C of FIG. 3, bus activity controls and interactions.

| Interlock | MSG ∪ C/D | SEL | I/O | Perm | mode | DB | CB | AP × U Result | RUy Result |
|---|---|---|---|---|---|---|---|---|---|
| Negated | | | | | | | | Inactive | Inactive |
| Asserted | 0 | 0 | 0 | r | DATA | I | M | historical | pass AP × U |
| Asserted | 0 | 0 | 0 | *r | DATA | ˆP | ˆP | write sTx | pass AP × U |
| Asserted | 0 | 0 | 0 | w | DATA | P | P | write SDx | pass AP × U |
| Asserted | 0 | 0 | 0 | *w | DATA | P | P | write SDx | pass AP × U |
| Asserted | 0 | 0 | 0 | rw | DATA | P | P | write SDx | pass AP × U |
| Asserted | 0 | 0 | 0 | m | DATA | P | P | write SDx | pass AP × U |
| Asserted | 0 | 0 | 1 | r | DATA | P | P | pass RUy | read SDx |
| Asserted | 0 | 0 | 1 | *r | DATA | P | P | pass RUy | read SDx |
| Asserted | 0 | 0 | 1 | w | DATA | I | M | pass RUy | historical |
| Asserted | 0 | 0 | 1 | *w | DATA | ˆP | ˆP | pass RUy | read sTx |
| Asserted | 0 | 0 | 1 | rw | DATA | P | P | pass RUy | read SDx |
| Asserted | 0 | 0 | 1 | m | DATA | P | P | pass RUy | read SDx |
| Asserted | 0 | 1 | 0 | r | Sel | P | P | selection | interlocked |
| Asserted | 0 | 1 | 0 | *r | Sel | P | P | ˆselection | ˆinterlocked |
| Asserted | 0 | 1 | 0 | w | Sel | P | P | selection | interlocked |
| Asserted | 0 | 1 | 0 | *w | Sel | P | P | ˆselection | ˆinterlocked |
| Asserted | 0 | 1 | 0 | rw | Sel | P | P | selection | interlocked |
| Asserted | 0 | 1 | 0 | w | Sel | P | P | selection | interlocked |
| Asserted | 0 | 1 | 1 | r | Resel | P | P | interlocked | reselection |
| Asserted | 0 | 1 | 1 | *r | Resel | P | P | ˆinterlocked | ˆreselection |
| Asserted | 0 | 1 | 1 | w | Resel | P | P | interlocked | reselection |
| Asserted | 0 | 1 | 1 | *w | Resel | P | P | ˆinterlocked | ˆreselection |
| Asserted | 0 | 1 | 1 | rw | Resel | P | P | interlocked | reselection |
| Asserted | 0 | 1 | 1 | m | Resel | P | P | interlocked | reselection |
| Asserted | 1 | | 0 | r | C/M | *Q | *Q | filter writes | pass AP × U |
| Asserted | 1 | | 0 | *r | C/M | *Q | *Q | write to sTx | pass AP × U |
| Asserted | 1 | | 0 | w | C/M | *Q | *Q | filter reads | pass AP × U |
| Asserted | 1 | | 0 | *w | C/M | *Q | *Q | ˆread from sTx | pass AP × U |

TABLE II-continued

Sub-component oPC & iPC of Components AP × U & RUy from, Section C of FIG. 3, bus activity controls and interactions.

| Interlock | MSG ∪ C/D | SEL | I/O | Perm | mode | DB | CB | AP × U Result | RUy Result |
|---|---|---|---|---|---|---|---|---|---|
| Asserted | 1 | | 0 | rw | C/M | *Q | *Q | allow/except | pass AP × U |
| Asserted | 1 | | 0 | m | C/M | P | P | allow-all | pass AP × U |
| Asserted | 1 | | 1 | r | C/M | *Q | *Q | pass RUy | filter reads |
| Asserted | 1 | | 1 | *r | C/M | *Q | *Q | pass RUy | ^allow/except |
| Asserted | 1 | | 1 | w | C/M | *Q | *Q | pass RUy | filter writes |
| Asserted | 1 | | 1 | *w | C/M | *Q | *Q | pass RUy | ^allow/except |
| Asserted | 1 | | 1 | rw | C/M | *Q | *Q | pass RUy | allow/except |
| Asserted | 1 | | 1 | m | C/M | P | P | pass RUy | allow/all |

(I = isolation, P = permit use, M = modify controls, ^ = shadowing, Q = filter applied)

Table II shows the state of the primary control signals and their outcomes with respect to control of interacting components of DAC 10A. A signal Interlock is generated by the Alert module as the master control for any communication to be initiated or continued. Signals MSG, SID, SEL and I/O are SCSI-specific control bus CB signals. The indicator mode follows the SCSI standard, and is indicative of the active state of DAC 10A (see FIG. 18) with respect to communicating phases between the access port APx and transfer port TPy. "DB" and "CB" in Table II represent the general state controls applied to the data bus DB and control bus CB respectively. "APxU Result" and "RUy Result" are the outcomes from the perspective of the access controller unit APxU and access controller unit RUy and reflect the co-operative link between these units. The Interlocked result indicates that the access controller unit APxU and access controller unit RUy have been recruited, and "historical" indicates that the access controller unit's output states have been held unchanged except as dictated by control bus CB, effectively blinding the source of the target of the action of the other. Virtual permission implementations are identical to that of the corresponding r, w, and rw permissions in this table.

To process commands or messages, controller PCC will blind the receiver to the event by latching the bus state, and respond as appropriate to receive and queue the entire message. As soon as a sufficient portion of the command/message has been queued, controller PCC will submit it for approval to processing component IDC by asserting signal RIP. In response to signal R/P with signal Lock negated, processing component IDC enters the "C/M Process" procedure illustrated in the flowchart in FIG. 15 to evaluate the queued C/M for its intended purpose.

The flowchart in FIG. 15 depicts the formal operation process of DAC 10A for a particular access port to transfer port communication session. The combined operation of the access controller unit APxU, access controller unit RUy, and processing component IDC are required to facilitate this process. Access controller unit APxU handles communications from the access port APx to the target device and access controller unit RUy handles communication between the transfer port TPy and the source attachment. Processing component IDC is invoked only to determine how to process restricted messages or commands (C/M Process) and to notify it that the communication path can be released. Predefined processes are those built into both target and source systems requiring no further mediation from DAC 10A than those depicted. The flowchart in FIG. 15 demonstrates that DAC 10A interferes with the transmission of messages and data only as necessary to preserve the access transparency and permission conformity.

Figure 16:
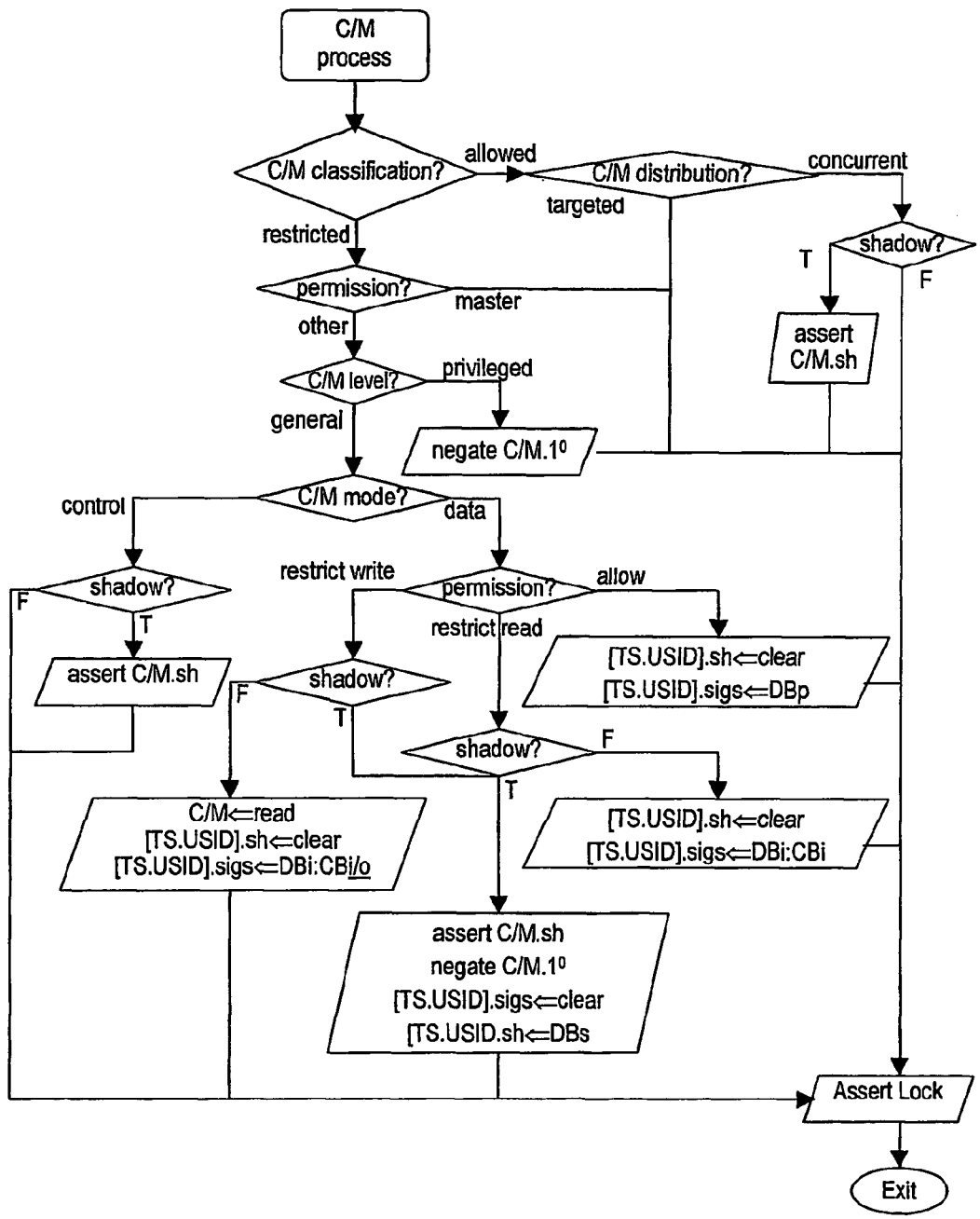
FIG. 16 is a flowchart illustrating how the "Interlock and Datalink Coordinator" processing component filters restricted commands and messages when requested by an access controller unit of a SCSI oriented DAC.

The flowchart in FIG. 16 illustrates how processing component IDC filters restricted commands and messages (C/M) when requested by access controller unit APxU or access controller unit RUy. Processing component IDC ensures that $1^\circ$ and shadow states are synchronized for any data transfer event by ensuring that both are tagged to receive C/M when necessary. Processing component IDC also assures that no target device receives C/M that would allow the attachment to exceed its access privilege. It does this by substitution or rejection of the C/M, or by predicting data transfers and the control signal manipulations that will avert the possibility of the breach occurring. It records these predictions and controls so that they will be enforced even during a disjointed transfer session. Processing component IDC returns control signals, by way of the C/M queue record, that indicate to controller PCC how the C/M should be dealt with (C/M.$1^\circ$=allow access via path(tP), C/M.sh=allow access via path(sP), or C/M.rv=blind target and respond to source).

The C/M Process will update the queue processing flags to dictate the resultant action to be taken by access controller unit AP1U or access controller unit RU1 as required to complete the transaction. Declassified C/M (allowed) are allowed to all systems and may be streamed concurrently to the target and its shadow when necessary. Access port attachments with the m permission may process all restricted C/M, even those which are privileged. Privileged commands are denied to all other access port attachments and the access controller unit APLU or access controller unit RU1 will respond as appropriate to placate the source and nullify the C/M effect while withholding the C/M from the intended target. C/M which specify upcoming data transfers may be substituted, or allowed as dictated by the perm restrictions, and the processing component IDC will update the stack TS record illustrated in FIG. 13 with the bus control forecasts required to enforce the perm restrictions during the transfer. In particular, privileged C/M are those whose effects may directly or indirectly affect pending tasks initiated from other sources, or modify the prescribed operation of the target. Restricted control C/M are those, which are direction specific and thus must be directed to the target or its shadow when appropriate. All data transfer C/M are restricted and are specifically those which direct the target to begin or continue a data (as opposed to control and status) transfer. These are restricted because the target to which they will be delivered or the manner in the transfer will be processed may need to be modified to meet the perm restrictions.

SCSI DAC Access Control

Once inspected, controllers PCC of access controller unit RU1 and of access controller unit AP1U co-operate to act on the queued C/M as directed by processing component IDC. When directed to discard (C/M.rv ie both C/M.1° and C/M. sh negated) the C/M, controller PCC invalidates the C/M queue and initiates an appropriate response to the sender. Concurrently, the complementary controller PCC disables the target's bus at transfer port TPy and activates its return to the sender so that the sender can receive the response. For all other processing directives, the sender is blinded (output to its bus is latch by lpath(xx)) while the C/M is forwarded to the receiver (recall the C/M may have been substituted by processing component IDC). When a receiver and its shadow must concurrently receive a C/M, their paths are activated and they can receive the forwarded C/M concurrently. Conversely, when the C/M is to be forwarded to only the target or only its shadow, the other's path is blinded during the C/M forwarding.

Finally, when a C/M that specified a data transfer has been processed by the receiver and the data transfer is about to begin, the respective controller PCC consults stack TS and asserts the recommended bus controls to ensure that the transfer does not overstep the perm specifications. Table III summarises the possible bus controls (sigs or sh) set in stack TS by processing component IDC:

Processing component IDC allowed a Read C/M issued by the sender to be delivered unmodified to a w storage unit. However, the ensuing data transfer is controlled by isolating the data bus DB between the sender and the receiver, and the sending controller PCC holds the receiver's data as null for the duration of the transfer. Both sender and receiver control buses CB are connected and synchronized so that the C/M sender believes the transfer is occurring as requested. In addition, processing component IDC substituted the Write C/M to a r storage with a Read C/M before delivery to the receiver. During the ensuing data transfer, the data buses DB are isolated and the control buses CB are connected but the I/O direction signal is inverted so as to appear as expected by the original C/M sender. For a DAC 10A that supports the shadow feature, the same inappropriate transfers (read and write) to *w and *r storages respectively, actually proceed normally as if allowed, but the transfer is performed with their shadows instead. DAC 10A uses these bus control techniques to negate the need to emulate the entire data transfer process, which can include the ability to support Disconnection and Reselection. SCSI systems can be directed to Disconnect, ie pause the transfer and release the bus. Of course this requires that the storage devices reconnect and Reselect the source(s) at some point later to complete the transfer. This would require extra circuitry and processing power to save and restore numerous pending transfers and to properly schedule reconnection to

TABL III

F rmat and use of the sigs record (sigs.DBx:CBy) used by the SCSI DAC. Note: sigs and sh are identical records but are used to indicate whether the 1° or the shadow (resp ctiv ly) is the target

| DB | CB | symbol | Data mode effect |
|----|----|--------|------------------|
| 00 | 00 | DBi:CBi | Foil attempt to read storage with w perm. DAC allows read but blinds reader by sending null data to receiver and collecting data from source. Source and receiver drive CB signals |
| 00 | 01 | DBi:CBp | Foil attempting to write storage with w, *w, rw or m perm after system compromise has been pronounced. DAC substituted write with read and collects data from source. Source and receiver data paths are isolated. |
| 00 | 10 | DBi:CBs | Foil attempting to read storage with r, *r, rw or m perm after system compromise has been pronounced. DAC sends data to receiver. Source and receiver data paths are isolated. |
| 00 | 11 | DBi:CBi/o | Foil attempt to write storage with r perm. DAC substituted write with read and collects data from both source & receiver. CB is engaged but DAC inverts direction control signal during transfer. |
| 01 | Xx | DBp | Allow attempt to read or write storage with r, w, rw or m perm. Source and target are allowed to transfer data in the allowable direction |
| 10 | Xx | DBs | Allow attempt to read or write storage with *w or *r perm. Source and target's shadow are allowed to transfer data in the allowable direction |
| 11 | Xx | clear | Uninitialized, no current or pending or data transfer predicted. | xx = irrelevant

Table III explains the usage of the sigs and sh records that are used to record predicted data transfer mode handling by access controller unit APxU and access controller unit RUy. The sigs and sh are identical records but are used, respectively, to indicate whether the 1° or the shadow is the target. Each record has two fields, field DB which controls the state of the data bus DB, and field CB which controls the state of the control bus CB, communication control signals, and the operations of access controller units APxU and RUy indirectly. In Table III, "symbol" represents the manner in which the field selection will be denoted, and "Data mode effect" explains how and why the controls are applied. The sigs record is applied only during a SCSI "data mode" event (see Table II). For the purpose of Table m, the r, w, and rw permissions are identical to the implicated r, w and rw permissions.

potentially many different sources. By allowing the target to do an actual transfer (even thought it may be in the wrong direction) and simply control whether the data arrives where intended, DAC 10A can support true transparency with relatively low overhead and complexity.

SCSI DAC Path Dissolution

A communication session ends when the devices complete their transfer (or DAC 10A tricks them into disconnecting if a connection time limit is implemented) and releases the bus. Controller PCC detects this by noting when a target issues the "Command Complete" or "Disconnect" message to the source. In response to a Command Complete C/M, and before requesting release of the path, the data transfer control flags sigs and sh are cleared to disable all further data transfers that may arise without approval, and the processing component IDC is invoked to release resources of DAC 10A. The Disconnect-in C/M leaves the data transfer controls intact and simply request that the path be released. In either case, processing component IDC is alerted of the impending bus release by controller PCC asserting signal R/P while signal Lock is asserted. This causes processing component IDC to enter the "Free USID" procedure illustrated in the flowchart in FIG. 17 to determine whether to release the unique source identifier USID for reuse.

Figure 17:
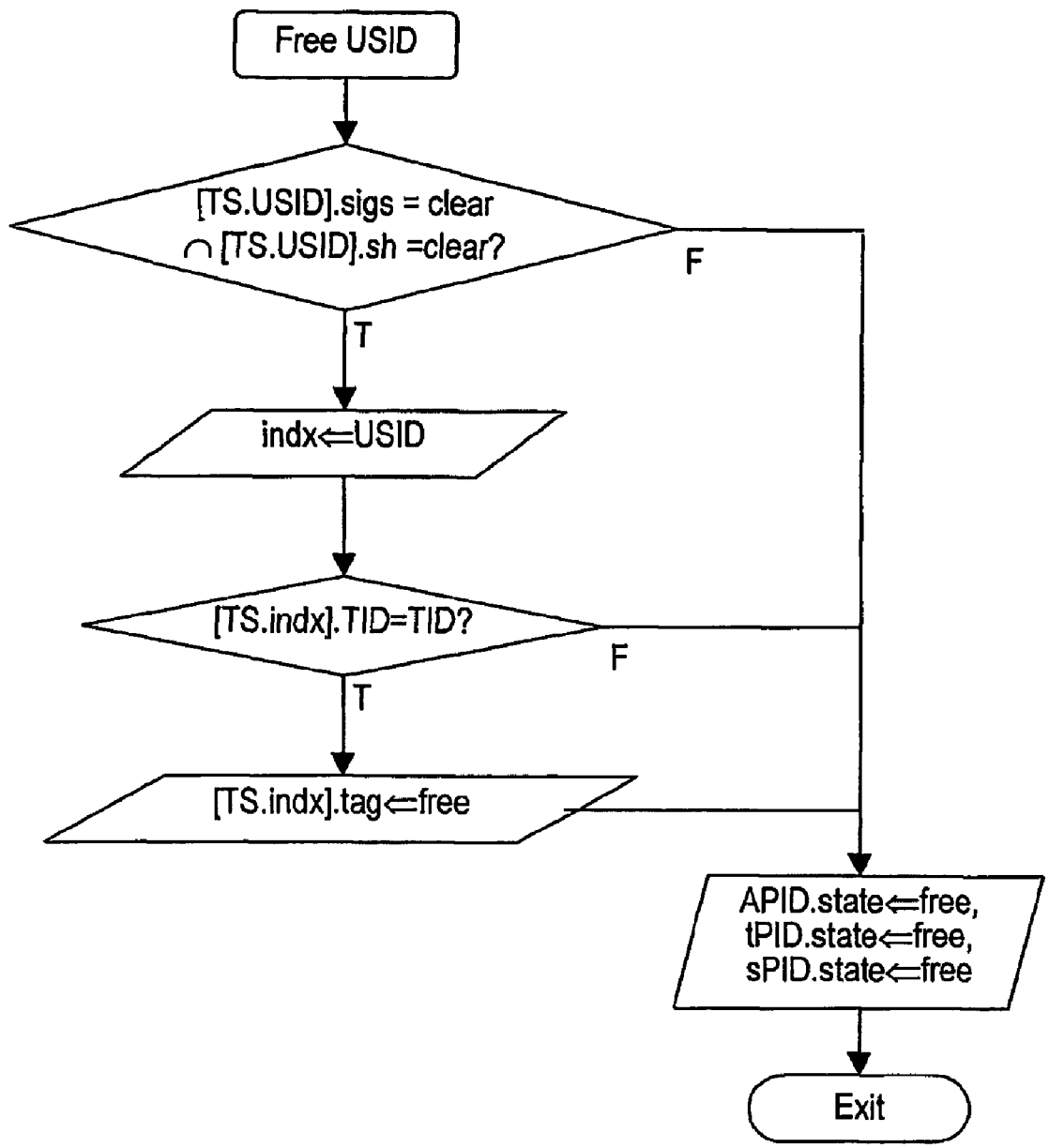
FIG. 17 is a flowchart depicting the operations required to release any unique source identifier used by a SCSI oriented DAC for later reuse.

The flowchart in FIG. 17 depicts the operations required to release any unique source identifier USID for later reuse. The unique source identifier USID is only be released if it belongs to the requesting port and if that port has no outstanding transfers in place. Regardless of whether the unique source identifier USID can be released the communication path can be released for reuse.

The other resources that were recruited for the path (the access port APx, transfer port TPy, and the shadow transfer port) are released to allow other systems to gain access to them. This ends the involvement of processing component IDC and controller PCC. The access controller unit AP1U will disable its processing of the inputs from the access ports APx, RU1 and will deactivate the paths to the target (path( )) and the shadow (spath( )), at which point both are can longer act in unison. Their Alert modules linger in a cycle, awaiting the indication that their attachments have released the bus before they release signals Lock and Interlock and re-enter the bus free state.

SCSI DAC Access Transparency and Source Identification

Note that at no time can an attachment address DAC 10A nor notice any difference in the function of its storage systems, while DAC 10A can redirect and substitute C/M exchanged between attachments. Thus DAC 10A is truly a bus device. Furthermore, DAC 10A can do what is necessary to avert an access breach without the attachments being able to determine that their communications are being manipulated (stealth technology). DAC 10A enforces transparent access by ensuring that each communication path is completely private. In this manner, no attachment at any port can ever detect communication between any other attachments even though there might be several concurrent paths established (i.e. port snooping is now ineffective). Each target can be shared among multiple sources, each accessing the target with different permissions. Each port can be programmed to accept only a particular attachment ID, thus the physical port connection now attaches an unmodifiable location dimension to all IDs or other modes of identity validation mechanisms.

SCSI DAC Access Control Extension

DAC 10A can be designed to inspect more than just the control signals and C/M, using the same techniques used for C/M inspection to inspect the data being transferred. This may introduce small response lags when the attachments change phases, but data transfers can proceed at full speed provided that controllers PCC are supplied with sufficient memory to buffer the transported information. This kind of monitoring can also pool the received transmissions at some collection point in order to gain the luxury of offline logging and inspection under more processing power. This adaptation is possible because it will still not require DAC 10A to support the disjointed transfers since DAC 10A can allow the target and source to operate as given by the SCSI specifications.

Feature: DAC Shadows

An added feature of DAC 10A is the use of shadowing of storage units to add a further element of access control and offer auditing capabilities. A shadow storage is allocated from one of the attached storage devices SDy and is assigned to be the shadow of any other storage device SDy via programming of unit ACI. Shadowing is activated by the assignment of the shadow permissions, *r or *w, to a primary storage unit (1°). When permission is assigned to the 1° of a shadow pair, the declared shadow is automatically assigned the opposite permission. This implies that the rw and m permissions cannot be shadowed since they have no functional opposites (C/M restricted at rw storage are too dangerous to the shadow). Shadow storages have their own unique ID by which they can be explicitly addressed on DAC 10A, and which must be made unusable by affected access ports APx. In this manner, the attachment will be unable to distinguish the *r or *w 1° storage from a r or w storage unit. Access to the shadow is controlled purely by DAC 10A and on invocation of the restricted permission being attempted at the 1° storage unit. Processing component IDC signals controller PCC to make the path switch before forwarding/processing C/M, and for restricted data transfers. Switching entails latching of the signals presented to the 1° storage unit (at a bXXn, as shown in section D° of FIG. 3), with a concurrent selection of the shadow's path (also via a bXXn, as shown in section D° of FIG. 3). Reservation of the shadow path by processing component IDC and activation of the shadow path when signal Interlock was asserted ensures that the path is readily available. Shadows can help to stabilise restricted environments such as read-only OS drives, and imbue the affected attachment with immunity to OS manipulations, preventing attackers from modifying or otherwise controlling the attachment. Shadows are also excellent tools for logging true-positive intrusion attempts, leaving an attacker with no way to prevent the logging and no recourse once the log has been made. This makes shadows ideal for triggering real-time intrusion alarms. Aside from being used for intrusion detection, shadows passively absorb viruses and trojans when they attempt to install themselves onto disks, and absorb the effects of viruses and web-page defacing, events that would destroy or otherwise modify stored information.

Overall Operation of SCSI DAC

Figure 18:
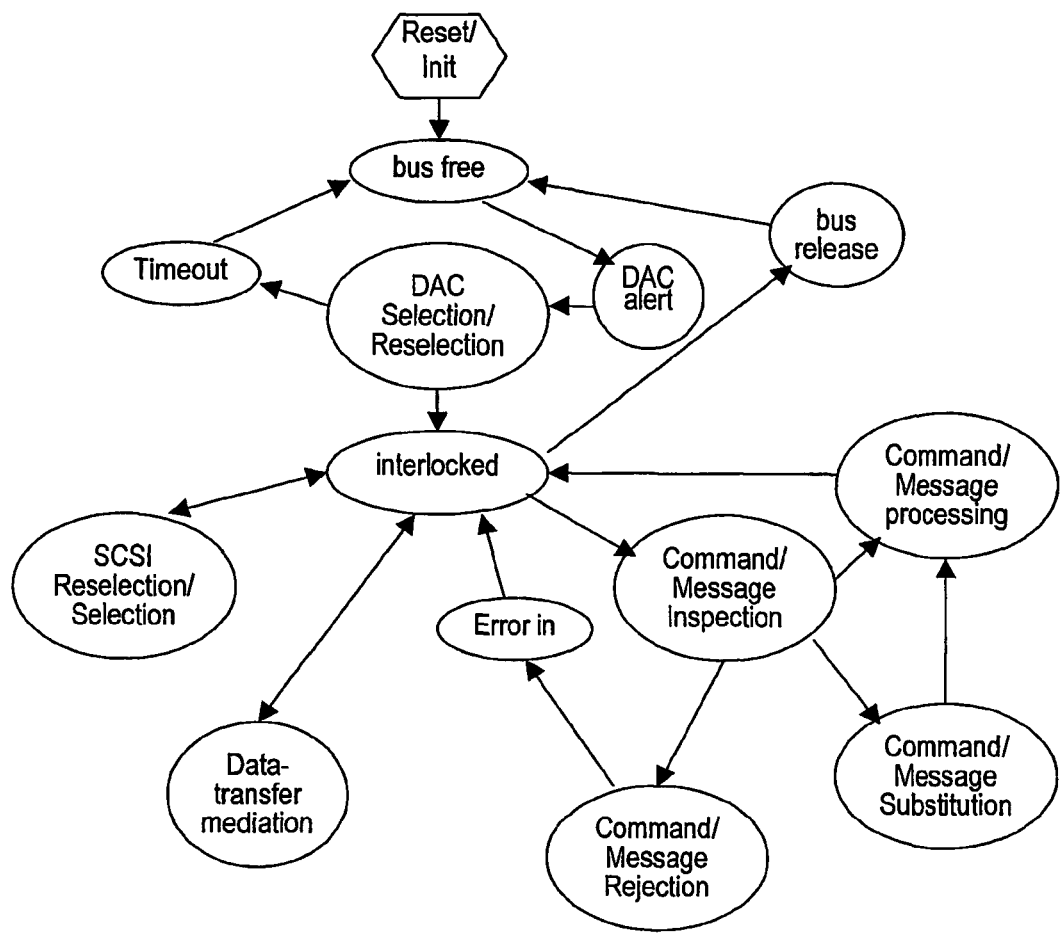
FIG. 18 is a state diagram showing the operation states through the fill operation of a SCSI oriented DAC.

In summary, the state diagram in FIG. 18 shows the full operation of DAC 10A. After Reset/Initialization, each state element is valid for any initiating attachment and involved circuitry necessary to establish an access port to transfer port connection and mediate a communication event between a source and target attachment.

RAM Oriented DAC

The following description applies the general principles discussed above to an embodiment of DAC 10 suitable for random access memory (RAM).

Within computers, programs often interact in a manner similar to the manner in which computers interact on a network. There are programs that offer services to other programs (server-types), and there are programs which request services from other programs (client-types). This is the essence of the client-server model of networks and, not surprisingly, the problems that networks have with respect to sharing storage also exist within computers. However, the methods used to exploit these problems are complicated by the nature in which RAM is used, which in turn complicates the apparent task of the RAM oriented DAC 10B.

Problems to Solve

For a DAC 10B to adapt RAM for use as a secure storage medium, several problems arise, regarding the manner in which RAM is used by the computer under normal conditions, that serve as the basis for security breaches. Unlike the SCSI oriented DAC 10A, which in essence separates the control of disk storage from the computer, it is not applicable to say that the RAM oriented DAC 10B separates the control of RAM from the computer or the CPU. RAM is, in fact, an integral part of the computer, i.e. without RAM the computer, as we know it, cannot exist or function. The difficulties are ones of conception:

1. While the computer is the processing device and disk is the storage device for networks, inside the computer the CPU is the processing device and RAM is the storage device. The RAM oriented DAC 10B needs to protect memory from illegal accesses by the CPU.
2. The CPU is not on par with the computer as a processing unit, it requires a program in order to attain the same level of functionality. However, programs exist in memory, the very storage device that a RAM oriented DAC 10B needs to protect secure from illegal access by processing systems. Several programs may exist in or use memory at the same time, thus a RAM oriented DAC 10B must protect programs from illegal access made by other programs.
3. Programs and data are essentially the same with respect to memory (the storage units for computers) and with respect to the CPU (the processing unit of computers). Neither the location nor the time of existence of programs or data in memory can be pre-determined. A RAM oriented DAC 10B must allow for the dynamic definition and redefinition of memory areas as programs or data, and must maintain and protect this partitioning for as long as is needed.
4. Corruption of programs can have the same effect on the security of the program's data (stored information for programs) as illegal access to the data itself, so the RAM oriented DAC 10B must protect programs from themselves as well as protect their data from other programs.

RAM DAC Characteristics

Thus, transparent sharing of RAM storage implies both the transparent usage of memory for data and program as well as the transparent sharing of stored data between programs. Programs and their data reside in memory so a DAC 10 applied to RAM will provide program instruction partitioning and access protection to the their datasets in much the same manner as the SCSI oriented DAC 10A provides partitioning between computers on networks by applying access protection to storage. RAM uses separate address buses and data buses DB; thus the processing of a DAC 10B as a RAM bus will be much simpler than in respect of the SCSI oriented DAC 10A. However, the RAM oriented DAC 10B requires more flexibility and involves more complex techniques because of the dynamic nature of memory configurations required by a system at any instance in time. Memory is arranged as one contiguous range of IDs wherein each memory unit (bit) has its own unique ID. Industry standards have defined slightly larger groupings of bytes (8 bits), words (2 bytes), and double and quad words (4 and 8 bytes) but, to date, the memory efficiency of software decreases dramatically with the size of the grouping. Thus the byte remains the atomic memory unit. This arrangement creates a huge problem because memory in a computer can number in the millions or billions bytes. It is therefore unfeasible if, not impossible, to control access to each unit individually, as was possible with the SCSI oriented DAC 10A. The physical compartmentalization of many storage units onto one storage device, as with SCSI hard drives, would make it ideal for assigning an ID to each device. This is what enabled the SCSI oriented DAC 10A to provide physical access points between devices as access ports and transfer ports. The granularity of memory and the dynamic allocation of memory precludes the use of physical access ports and transfer ports and necessitates a logical representation of the same for the RAM oriented DAC 10B. And while the access port attachments are physically and operationally distinct from the attachments at any transfer port in the SCSI oriented DAC 10A, there is currently no clear distinction between any parts of the memory structure within a computer. Thus some logical construct must be created to yield the functionality of the DAC 10 as depicted in FIGS. 1 and 2.

RAM DAC APs and TPs and their Attachments

To this end, we will define an access port attachment (or "AP-attachment") as a disjoint program fragment. Each complete program is assigned a unique ID when using DAC 10B. This program ID becomes the access port indentifier APID for the access port AP to which the program is attached and to which DAC 10B associates its AP-attachments. Each AP-attachment is defined by a memory range used to contain instructions and to which DAC 10B will only allow access for program instructions. Each AP-attachment should encompasses program instructions that are functionally related (a program thread), or are contiguously grouped but non-contiguous with respect to other attachment of the same access port AP.

Transfer ports TP are used to group data ranges (TP-attachments) that are assigned to, and associated with each AP-attachment. A transfer port identifier TPID is the semi-unique ID assigned to each transfer port TP, and each transfer port TP must be associated with at least one AP-attachment at the access port AP in question. The access port AP in general, and the specific AP-attachment in particular, may access the TP-attachments as data.

Figure 19:
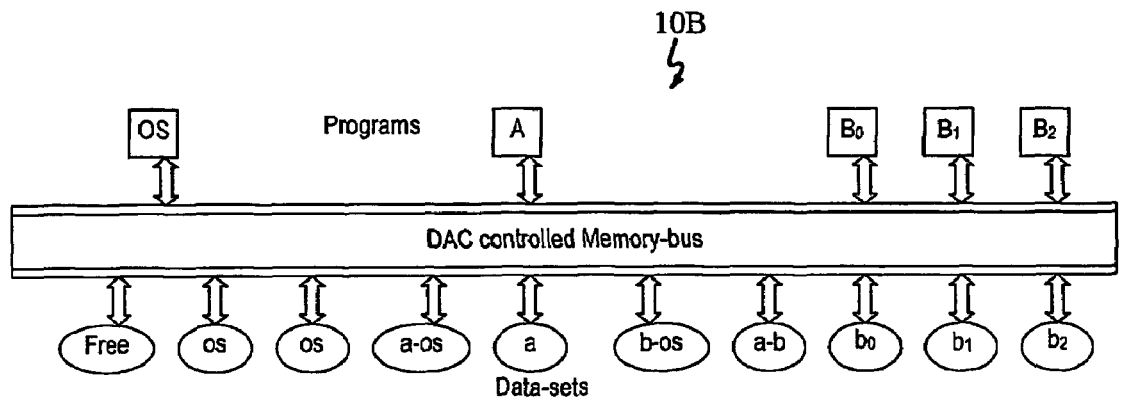
FIG. 19 is a general schematic illustration showing the logical re-arrangement of RAM memory effected by use of a RAM oriented DAC.

FIG. 19 is a general schematic illustration showing the logical re-arrangement of RAM memory effected by use of RAM oriented DAC 10B to achieve the functionality of DAC 10. As illustrated in FIG. 19, programs "connect" to DAC 10B at access ports AP and data "connect" to DAC 10B at transfer ports TP; by defining access ports and transfer ports and their attachments in this manner, a logical arrangement results that parallels the arrangement for the general DAC shown in FIGS. 1 and 2. Access is allowed vertically and only between specific programs and their assigned data. This horizontal separation between program code and data-sets allows DAC 10B to enforce access permissions between access ports AP and transfer ports TP. In addition, the vertical separation that exists between the groups of program plus accessible data allows DAC 10B to provide unbreachable access to private data, transparent access to shared data, and total disjunction between programs. In Multi-CPU environments of all types, this logical configuration is also achieved with respect to the CPU and its attendant program and data sets.

RAM DAC Required Components

Obviously then, each access port AP and each transfer port TP must be dynamically allocated at runtime because each access port AP will attach a program, and each transfer port TP will attach some data-set belonging to the program. The dynamic allocation of memory to programs and data necessitates the flexibility or runtime programming of this type of DAC 10B, and the ability to restrict programming access to a select few programs in order to assure the required security. As such the embodiment of DAC 10B involves a core hardware component that handles the predictable security functions, and separate, supportive software components (the boot-driver and OS-driver) that handles the programming interface and the unpredictable aspects of computing. Only security-specific aspects of the software will be discussed here, since other aspects will vary according to the requirements of system designers, and those aspects are unimportant to the concept of the DAC 10B.

An n-way range lookup table APRT functions as an "AP Request Translator" to validate whether an address falls within the instruction ranges of the current active access port AP on DAC 10B. Similarly, an n-way range lookup table TPRT functions as a "TP Request Translator" to validate whether an address falls within the data ranges of the currently active transfer port TP on DAC 10B.

Figure 20:
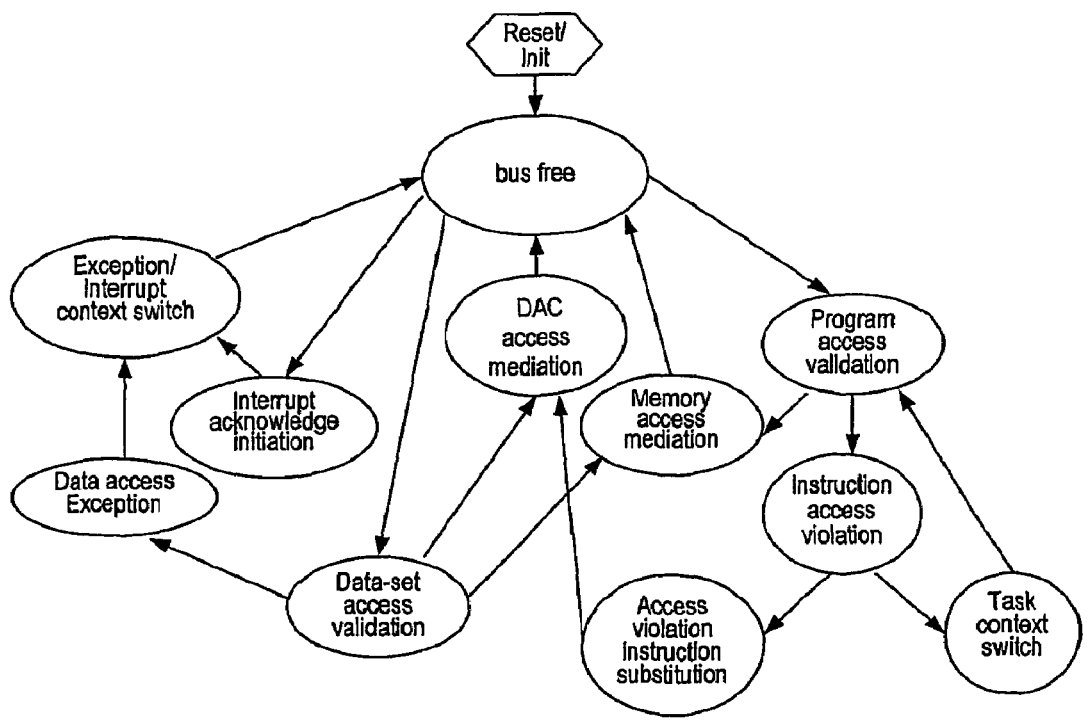
FIG. 20 is a state diagram showing the operational states through the overall operations of the hardware component of a RAM oriented DAC.

FIG. 20 is a state diagram showing the overall operations of the hardware component of DAC 10B. To convert the logical separation of memory ranges that define AP-attachments and TP-attachments into physical separation at runtime, each and every memory access must be validated and enforced. However, unlike the SCSI oriented DAC 10A, which must interpret and react to commands being sent between access ports APx and transfer ports TPy, the RAM oriented DAC 10B can, but need not, interpret CPU instructions in order to detect inappropriate memory access attempts. Because the security problems that exist in single CPU systems also apply to multi-CPU systems (that is, the programs are the true processing entities and the source of security risks), the remaining discussion will therefore not distinguish between single and multi-CPU environments nor DACs 10B.

RAM DAC Hardware

Figure 21:
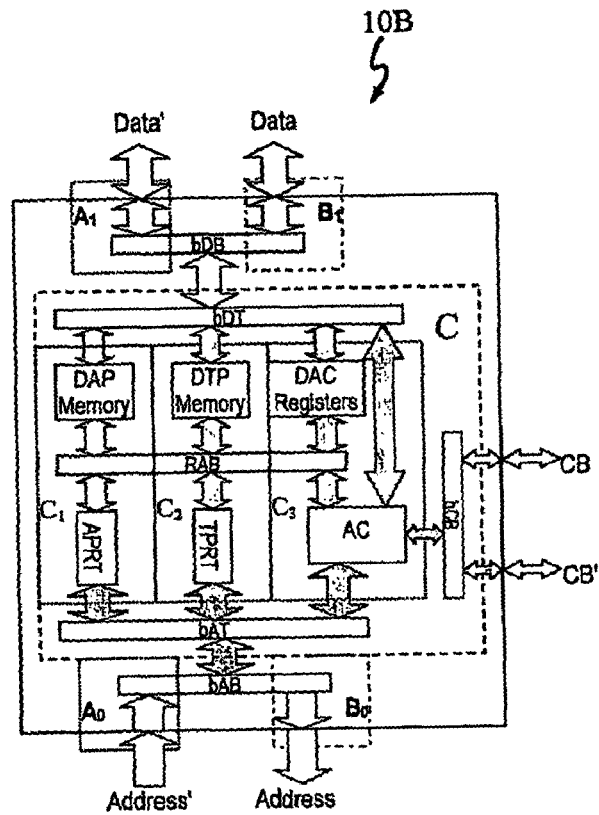
FIG. 21 is a detailed schematic illustration of the components of a RAM oriented DAC.

FIG. 21 is a detailed schematic illustration of the components of DAC 10B. In particular, FIG. 21 shows the means by which all access to memory can be partitioned into program specific accesses for monitoring and control. Sections $A_0$ and $A_1$ are functionally similar to section A on the SCSI oriented DAC 10A, logically representing the access port paths from which attachments make access requests to memory. Likewise, sections $B_0$ and $B_1$ logically represent the transfer port paths through which data is accessed. Section C is similarly the main processing section of DAC 10B. AP-attachments and TP-attachments on DAC 10B must share the same physical address and data paths through DAC 10B. As a result, sections $C_1$ and $C_2$ are used to discriminate between access port and transfer port accesses while section $C_3$ directs and controls the internal data paths for all incoming and outgoing signal buses according to the access permission. In multi-CPU environments where the CPUs share the entire memory space, sections A, and the CPU attachment interface bCB can be replicated to accommodate each CPU. To adapt discrete memory multi-CPU systems, sections A and B, the table APRT, the table TPRT, and registers of DAC 10B, as well as bCB must be replicated such that each A-B-APRT-TPRT-DAC registers-bCB set is private to each CPU. An access controller AC in section $C_3$ would serve as the interconnecting medium and central regulatory component similar to the processing component IDC of the SCSI oriented DAC 10A.

In effect, FIG. 21 represents the hardware implementation of DAC 10B that will segregate memory, as shown in FIG. 19, into m TP-attachments which may be shared among n AP-attachments. This hardware is dynamically programmable and will assert and maintain the memory segregation until it is no longer required. The hardware is designed to be inserted into the bus paths between a processing unit and the memory resources of a computer. The hardware of DAC 10B includes:

1. an address bridge bus bAB that allows transfer of addresses from the Address' bus to controller AC and from controller AC to the Address bus (bus bAB also facilitates the simultaneous address transfers from the Address' bus to the Address bus shown in FIG. 21 and between internal components of DAC 10B);

2. a data bridge bus bDB that allows the transfer of data between DAC 10B and either the Data bus or the Data' bus (bus bDB also facilitates simultaneous data transfers between the Data bus and the Data' bus and between-internal components of DAC 10B);

3. an address transfer bus bAT, which is a common data bus internal to DAC 10B that transports data between controller AC and table TPRT or table APRT, and between controller AC and bus bAB and from bus bAB to table TPRT or table APRT; and 4. a data transfer bus bDT, which is a common data bus internal to DAC 10B that transports data between components of DAC 10B and between DAC 10B and bus bDB.

Bus bAB and bus bDB allow permitted accesses to proceed to completion, while bus bAT and bus bDT are freed for use by DAC 10B to perform "housekeeping" functions concurrently. The table APRT and table TPRT are implemented as n-way caches that can perform all n range comparisons in parallel. This measure increases the efficiency of DAC 10B and minimizes the latency introduced by access validation.

An access port table DAP comprises cache memory dedicated to being used as access port definitions in DAC 10B, while a transfer port table comprises cache memory dedicated to being used as transfer port definitions in DAC 10B. The cache used as table DAP and table DTP can be implemented as a single unit, but are shown as separate modules in FIG. 21 only for sake of clarity. The cache and registers of DAC 10B are memory mapped and accessible to software in whose transfer ports TP they are defined.

RAM DAC Hardware Registers

Figure 22:
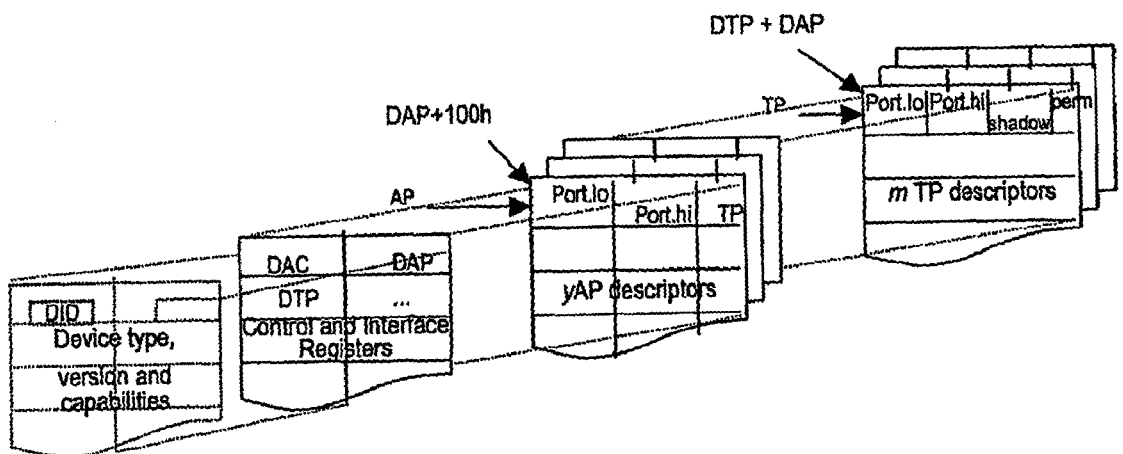
FIG. 22 is a diagram showing the logical arrangement of the internal cache memory of a RAM oriented DAC.

FIG. 22 is a diagram showing the logical arrangement of the internal cache memory of DAC 10B as it is utilized by DAC 10B. The following description applies specifically to the internal organization for the singular CPU implementation, but hold true for multi-CPU models except that, in respect of multi-CPU models, the pages are arranged in sequentially grouped blocks (a "block" is described below), one for each CPU in discrete memory systems. All registers of DAC 10B are memory-mapped allowing it to protect access even to its own registers and cache memory. The first page holds the devices descriptor registers used to identify the type and capabilities of DAC 10B. The next few pages of the cache hold the Control and Interface register sets used to communicate with DAC 10B. The cache memory is also a repository for descriptors used by tables APRT and TPRT for access port and transfer port definition respectively via tables DAP and DTP. The next n×y subsequent pages are allocated for access port descriptors arranged as n access ports AP, each capable of owning y non-contiguous code fragments (AP-attachments), and each code fragment can specifying its own transfer port TP. The remaining pages are allocated for m×n×y transfer port descriptors grouped as n×y transfer ports TP, with each transfer port TP capable of containing up to m distinct non-contiguous data ranges (TP-attachments).

While the memory map of the hardware memory pages and registers of DAC 10B are shown in FIG. 22, a more detailed description of its registers and their arrangement and their purpose are given in Tables IV and V:

TABLE IV

RAM DAC Minimum Control Register Set.

| Register | Address | Function |
|---|---|---|
| DAC (rw) (Dloc) | DAC | Programmable DAC memory address register used to relocate the DAC and its registers sets in memory. |
| DAR(r) | DAC + 8 | DAC address range = DAC + the size, in bytes, of the DAC device |
| DAP (r) | DAC + 16 | DAC AP memory address register used to locate the start of the AP descriptors, AP descriptors begins after the last register. |
| AP (*r) | DAC + 24 | Access Port - attachment ID indicating the program currently being executed, writes to AP are shadowed to hAP |
| TP (r) | DAC + 28 | Transfer Port - active resource table pointer for current AP |
| DTP(rw) | DAC + 32 | DAC Transfer Port memory address register read = start of the TP descriptors, write = relocate TP descriptors relative offset from DAP |
| DCP(rw) | DAC + 40 | Control Port - controls for special state handlers |
| DSP(r) | DAC + 48 | Status Port - records state of DAC | r = readable, w = writeable, *r readable with shadow

TABLE V

RAM DAC Minimum Interface Register Set.

| Register | Address | Function |
|---|---|---|
| DID(id) | DAC | ID signature of the DAC |
| hAP(rw/s) | DAC + 52 | AP holder - AP of pending task switch, or parent AP of current AP |
| lJump(rw) | DAC + 56 | Instruction code for call "iAP handler" to invoke software component |
| iAP(rw) | DAC + 76 | AP for interrupt/exception handler. iAP is invoked during lACK |
| eCall(rw) | DAC + 66 | Instruction code for "call eAP handle" to invoke software component |
| eAP (rw) | DAC + 80 | AP for task access violation Handler invoked on attempt by AP to access an unowned Resource or to invoke another AP |
| iAddr(r) | DAC + 84 | AP + address of last validly executed instruction |
| Eaddr(r) | DAC + 96 | AP + address of instruction fetch that triggers an access violation |
| Vaddr(r) | DAC + 108 | AP + address of task that invoked the most recent Task switch |
| Daddr(r) | DAC + 120 | AP + Address of the last data access that triggered the access violation | r = readable, w = writeable, /s = writeable shadow of AP, id = readable when mapped in Table IV lists the minimum set of control registers required for proper implementation of DAC 10B. Control registers are reserved for use by the software component of DAC 10B only and are critical for the proper initialization and use of DAC 10B for secure memory sharing. Table V lists the minimum set of interface registers required for proper implementation of DAC 10B. Interface registers are used by the software components of DAC 10B and may be assigned to the operating system (OS) to allow the OS to manage programs. This register set will provide sufficient information to allow error and exception handlers to locate and deal with the offending program.

The registers are arranged in order to give DAC 10B a smaller memory footprint in the system. The first page is occupied by DAC ID registers DID which contain read-only information about the DAC hardware type, version, capabilities etc. to allow recognition by software when not initialized. Register DID is the only visible element of DAC 10B until the software component loads and submits its ID into a designated address within register DID. When DAC 10B recognizes the software's ID, it maps out register DID to reveals all its registers for access. The control registers give the status of DAC 10B and controls the operations of the hardware of DAC 10B. The interface registers allow the software to adapt DAC 10B to the specific environment of the host machine and its software environment. The register set is designed to minimize the effort that supervisory programs must expend when performing management of tasks that have been animated. They also provide such programs with sufficient information to resolve access violations in order to effect the appropriate response. Note each register is assigned a default permission.

DAC 10B can be used to assign some or all of its registers to the transfer ports TP of select software. However, the access mode assigned at runtime will not supersede the default permission given in the tables; that is, a read-only register will never be successfully modified even if the software assigns it a writeable permission. In addition, the shadow of the access port register will always be the "AP holder" register hAP regardless of the assigned transfer port permission. Note also that even though writes to access port AP are shadowed to register hAP, register hAP itself is readable and writeable. This allows for the definition of the parent of a task by writing to register hAP with no other consequence, but a write to access port AP will clear the task-switched flag (DSP.ts) of the status register DSP and update register hAP instead of access port AP. This allows approved task-switch requests to be posted by writing the task's access port identifier APID to the access port register. Programs are not allowed to modify access port AP since DAC 10B uses it to locate instruction and data pages of the currently active task and would cause all further CPU accesses to memory to yield indeterminate results.

RAM DAC Permission and Access Tables

The tables APRT and TPRT are the keys to ensuring that a program's access to memory is valid and transparent to all other programs. At any instant they hold the definition of the instruction and data-set address ranges of the currently active program. Their actions guarantee that unauthorised access to instruction or data belonging to other programs will always be detected. On every access to memory, by the CPU, they (concurrently) check the target address against those allowed to the currently active program. Based on their report, controller AC may allow the program's activity, which could cause refreshing of table TPRT, or may trigger an access violation error to alert the enforcement software.

FIG. 23(A) is a diagram showing the implementation of table APRT as an n-way range lookup table holding the AP-attachments assigned to the current access port (task) and their associated data set selectors (transfer port identifiers TPID). The pages of table APRT are mapped into the cache memory of table DAP. A successful instruction address lookup is one that fits within the an AP-attachment defined by one of the pages and that page must not have a null port identifier TPID. The match result and the valid port identifier TPID are returned to controller AC for further processing. Table APRT is refreshed from the memory ranges of table DAP and only by a successful write to the access port register of this DAC 10B. Only the hardware of DAC 10B can update the access port register, which it does only if a task transition is allowed to occur.

FIG. 23(B) is a diagram showing the implementation of table TPRT as an n-way range lookup table containing the data ranges (TP-attachments) of a transfer port TP assigned to the current AP-attachment, their associated access permissions, and the shadow offset if defined. The pages of table TPRT are mapped into the cache memory of table DTP. A successful data address lookup is one that fits within the range defined by one of the m TP-attachments with the correct permissions for the mode of access requested. The match result and the computed shadow address are returned to controller AC for further processing. Table TPRT is refreshed from the memory ranges of table DTP only by a successful write to the transfer port register of this DAC 10B. Only the hardware of DAC 10B can update the transfer port register, and only when a successful task transition occurs or a valid AP-attachment (page) that defines a new transfer port TP is asserted.

Taken as a whole, FIG. 23 shows the relationship between the contents of lookup tables APRT and TPRT and definition tables DAP and DTP respectively. As demonstrated in FIG. 23(A), the contents of table APRT are refreshed from memory of table DAP when controller AC modifies the access port register when changing the currently active program. FIG. 23(B) shows the refreshing of the contents of table TPRT from memory of table DTP, which occurs when controller AC updates the transfer port register with a new value during a successful instruction fetch into a different AP-attachment defined by a page of table APRT.

When access port AP0 is currently active, writes to table DAP that target descriptors respecting access port AP0 updates both tables DAP and APRT. The changes become effective on the next instruction access.

The combined actions of the hardware components of FIG. 21 are summarised in the flowchart in FIG. 24. The flowchart integrates all processes of the hardware of DAC 10B and their contribution to the validation and processing of all memory accesses. Processes in DAC 10B are initiated concurrently to speed the validation process. DAC 10B makes use of highly parallel processing to efficiently validate and process each and every memory access. A memory access is initiated by the CPU and detected by controller AC. DAC accesses and memory accesses are essentially identical with respect to CPU control signals, but DAC accesses do not appear on the external memory bus of the computer.

According to the flowchart in FIG. 24, the hardware itself does not yet fully meet the definition of a DAC 10. Missing are the means by which to create access ports AP and transfer ports TP and the means by which the memory access permissions are set.

RAM DAC Software Components

While access to instructions in a region not defined as an AP-attachment and access to data in a region not defined as a TP-attachment will be denied by the hardware, the access ports AP and transfer ports TP must first be defined and the dynamic environment required by software makes pre-set control of use allocation nearly impossible. As such, DAC 10B also has software components. Their tasks are to secure the memory resources of the computer and serve portions of it as access ports AP and transfer ports TP as needed (the boot-river), and to aid the OS with enforcing access violations (OS-driver) detected by the hardware of DAC 10B. The drivers may be implemented as firmware on the same physical unit as DAC 10B but loadable software will be more flexible and easier to upgrade. The recommended operations of the OS-independent, boot-driver functions are depicted in the state diagram in FIG. 25.

Figure 25:
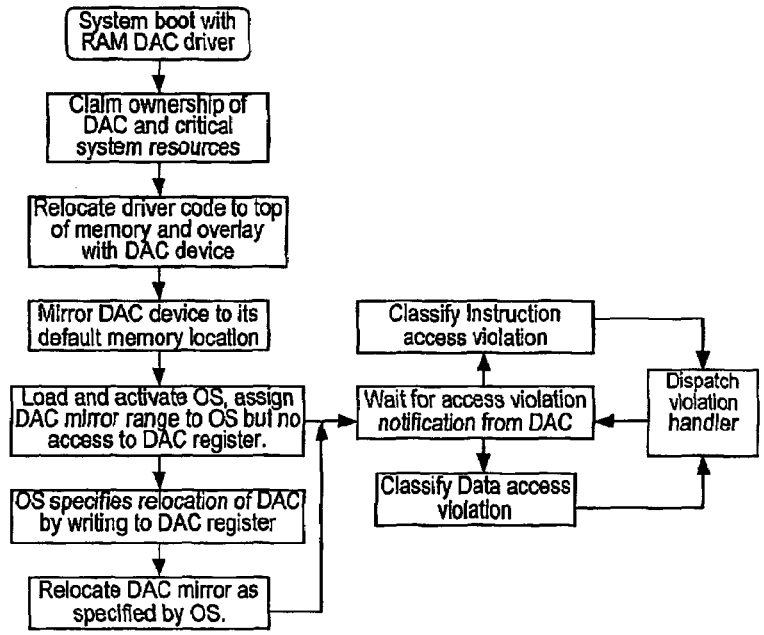
FIG. 25 is a state diagram which shows the recommended operational state of the OS independent software component of a RAM oriented DAC.

FIG. 25 is a state diagram which shows the recommended operational state of the OS independent software component of DAC 10B. Notice that the software component initiates before the OS and that it initiates the OS. DAC 10B must remain in full control of its protected storage devices at all times. Thus the software component of DAC 10B must supersede the OS in control of access to RAM, just as the SCSI oriented DAC 10A supersedes the attachment and its OS in control of access to storage devices.

The functions of the OS-driver (not shown) are to aid the OS with memory and task management, translate these actions into access control specifications for the bootdriver, and translate the boot-driver's realtime violation classifications into OS and application-specific resolution responses.

RAM DAC Initialization

Like the SCSI oriented DAC 10A, the primary access controller unit APxU is responsible for the initialization of DAC 10B and its resources. At system reset, the default settings of the hardware of DAC 10 are asserted, as shown in Table VI, placing it (and thus any active software) in control of all onboard memory and memory mapped devices:

TABLE VI

RAM DAC interface and Control Registers default values

| Register | Value | [0]port.lo | [0]port.hi | [0].perm | [0].TP |
|---|---|---|---|---|---|
| AP | 0# | 0 | ffffffffffffffffh^ | | 0 |
| hAP | 0# | | | | |
| TP | 0 | 0 | ffffffffffffffffh^ | m | |
| iAP | 0 | 0 | ffffffffffffffffh^ | | 0 |
| eAP | 0 | 0 | ffffffffffffffffh^ | | 0 |
| DAC | ^-DAR − 10000h* | | | | |
| DAP | 160 | | | | |
| DTP | DAP + size(APRT)* | | | | |

*presettable and programmable, #null AP, ^or max memory location detected

Table VI shows the default values for the hardware of DAC 10B at system reset. These settings allow DAC 10B to exist in a computers system and retain current functionality until the software components are initialized. These defaults ensures that, like any DAC 10 when inserted into any currently "unaware" systems, DAC 10B will make no apparent changes to that system except that register DID will appear in the computer's memory space.

As recommended in the state diagram in FIG. 25, the boot-driver component is best used as the boot loader as this gives it the best chance of securing the entire memory space, including the hardware of DAC 10B itself. The boot-driver initializes itself according to the specifications found in register DID of the hardware of DAC 10B, then prepares the memory space for use. To initialize the memory space, the boot-driver must (in the following order):

1. Relocate its program and data to the top or bottom of memory (dependent on CPU requirements) in order to take itself out of the "free" memory space and leave "free" memory as one contiguous block when possible.
2. Define its instruction ranges as attachments to access port AP0, the primary, and officially null, access port identifier APID.
3. Define its data sets as TP-attachments that are accessible to its AP-attachments.
4. Define the rest of the memory space as "free" TP-attachments to its AP-attachments.
5. Disable Interrupts and initialize the registers (eCall, iCall, etc.) of DAC 10B.
6. Relocate DAC 10B to its final operational location in the memory space. Close examination of the flowchart in FIG. 28 (described below) reveals the fact that the hardware of DAC 10B can execute code that is mapped to its own memory range without impeding access to its registers. To protect it own instructions and conserve memory space, the boot-driver hides its AP-attachments by overlaying them with the hardware of DAC 10B.
7. Jump to the relocated "hardware initialization complete" AP-attachment to update the CPU and avert a possible access violation resulting from the next action.
8. Invalidate attachment #0 (the default) by making its address range null (address.lo≧address.hi). This will eliminate the memory usage default (all manageable, all executable) and immediately apply the boot-driver's instruction and data access range restrictions.
9. Restore interrupts.

At this point, the bootdriver's access port AP is the only one defined and thus is the only program that can execute. Since it can access the entire memory space, including the hardware of DAC 10B (but excluding its program instructions) as data, it is by definition the "Master AP". The hardware of DAC 10B will prevent access to the boot-driver's AP-attachments and TP-attachments by any access port AP whose TP-attachments exclude it, and the boot-driver will ensure that the hardware TP-attachment of DAC 10B is excluded from all other AP-attachment or TP-attachment. Since no other access port AP can access the hardware of DAC 10B, only the boot-driver can define access ports AP or transfer ports TP within it; thus the boot-driver will remain as the Master AP.

RAM DAC Access Control Interface Software

The boot-driver and the hardware of DAC 10B constitute the majority of requirements of DAC 10B. The only missing functionality is that provided by unit ACI of the SCSI oriented DAC 10A to define AP-TP use and access rights. This component must necessarily be software to support the variety of operating systems, and the flexibility and dynamic environment of computers. The equivalent of unit ACI for DAC 10B is the OS specific OS-driver component that interfaces the OS to DAC 10B to allow for dynamic access port AP and transfer port TP connection and access assignment. To support the OSdriver while retaining the segregation between the OS and the boot-driver, DAC 10B makes use of the memory-like nature of the hardware to create a memory-based virtual DAC hardware call the DAC-mirror. The boot-driver prepares the memory range, which starts at the original value in the DAC register and spans the range of register DID, with the access mode and values of register DID. This mirrors the default state of the hardware of DAC 10B (register DID mapped between the DAC register and register hAP, hAP-end of DAC not present), and allows the DAC-mirror to be discovered during the expected search by a DAC-aware OS, that will be installed later. The DAC-mirror allows the boot-driver to supervise the activity of the OS-river program as it asserts its presence and aids the OS with its tasks. In particular, when the OS-driver registers its ID, the boot-driver can validate it and re-map the DAC-mirror to resemble the DAC hardware registers in their default conditions (with register DID mapped out). When mapped in the DAC-mirror's registers will be identical to those of the DAC hardware, with the following exceptions:

1. A DAC register Dloc is assigned the r permission to allow the boot-driver to detect whenever the DAC-mirror must be relocated in order to "virtualize" the relocation procedure for conformity with expected behaviour of DAC 10B.
2. The access port register is marked as r to allow proper virtualization of the effect of clearing the task-switched flag (DSP.ts) of register DSP when access port AP is written.
3. Tables DTP and DAP are also marked as r in the DAC-mirror to enable the boot-driver to simulate the expected reaction in the DAC-mirror.
4. Registers iAddr and dAddr (explained below) are set as rw.

RAM DAC Intializing the OS and OS-Driver Software

Because the OS-driver is OS specific, it is loaded by the OS during the OS initialization process. The boot-driver begins the process by loading the OS into its "free" TP-attachments and prepares an OS access port AP, and related transfer ports TP, as the second access port AP in the hardware of DAC 10B. The initial access port AP and transfer port TP of the OS are identical to the defaults given in Table VI with the DAC-mirror TP-attachment, but excluding the memory ranges of the boot-driver and the hardware of DAC 10B. This allows the OS to initialize as normal without the ability to affect the boot-driver. The boot-driver activates the OS and goes quiescent until an access violation is performed by the OS. This will only occur if the OS tries to access the bootdriver or hardware of DAC 10B, or the OS announces its ability to interact with DAC 10B. If the OS is DAC-aware, its memory scan will detect register DID, and it will load and activate the appropriate driver (note: this is all that is required for DAC compliance—namely, that the driver "completes" the OS). The OS-driver begins is initialization by announcing its ID to the DAC-mirror. The boot-driver responds by building an access port AP and transfer ports TP for the OS-driver and registering them in hardware of DAC 10B. The OS-driver's transfer ports TP encapsulate the OS and the free memory ranges of the OS, with appropriate permission to prevent the two from invoking or modifying each other's instructions, and allow only the OS-driver to manage the free or assigned TP-attachments. The OS and OS-driver will share the DAC-mirror, but the OS is given r access. When the boot-driver is finished, it replaces the mirror DID with the default DAC registers (as above) in the DAC-mirror. The OS-driver is reasserted in order to complete its initialization and mapping of the memory space of the OS. It signals completion of its initialization by writing to register Dloc in order to relocate the DAC-mirror to the desired final destination. At such time, the boot-driver (in recognition of the attempt to move DAC 10B) updates the hardware of DAC 10B and DAC-mirror with the proper access ports AP and transfer ports TP that define the OS and the OS-diver. The OS-driver is now ready for normal operations; thus DAC 10B is now in place and ready for normal operations.

RAM DAC Normal Operations

After OS and OS-driver initialization, the boot-driver goes dormant until it is alerted to an access violation by the hardware of DAC 10B. The OS-driver provides certain memory and task management functions to the OS in order to facilitate the creation and destruction of access ports AP and transfer ports TP dynamically. The functions are considered a part of the OS but must securely share information with the OS-driver and conform to the security requirement of not invoking the OS-driver's instructions. The memory management functions co-operate with the AP/TP management functions using a specialised shared storage definition explained below. The task management functions and the access control functions of DAC 10B co-operate using the DAC-mirror to achieve their needs. This allows the system to operate at maximum efficiency under normal operations.

The following is a detailed description of the use of DAC 10B under normal operations to load a program, consign it to an access port AP (create an access port AP and several transfer ports TP), and assign to it TP-attachments for transparent sharing of data. This will be parallel to the procedure for initializing SCSI AP-attachments and establishing a path from an access port APx to a transfer port TPy within the SCSI oriented DAC 10A. However, SCSI access ports APx are physical and their quantities are fixed. Also, SCSI AP-attachments are created with the capability of initializing themselves, and are physically fixed to DAC 10A by attachment to an access port APx. AP-attachments and TP-attachments on DAC 10B are purely virtual, thus more ground rules are required for their creation, destruction and secure use, and these rule must be obeyed and enforced by DAC 10B itself. In this regard, some of tasks that DAC 10B must perform (such as memory and program management) are already specific for, and primary functions of, the OS. Thus the following discussion will detail only new functions, extensions or modifications that DAC 10B must provide for the OS so that it can interface with DAC 10B and perform program management correctly.

Figure 26:
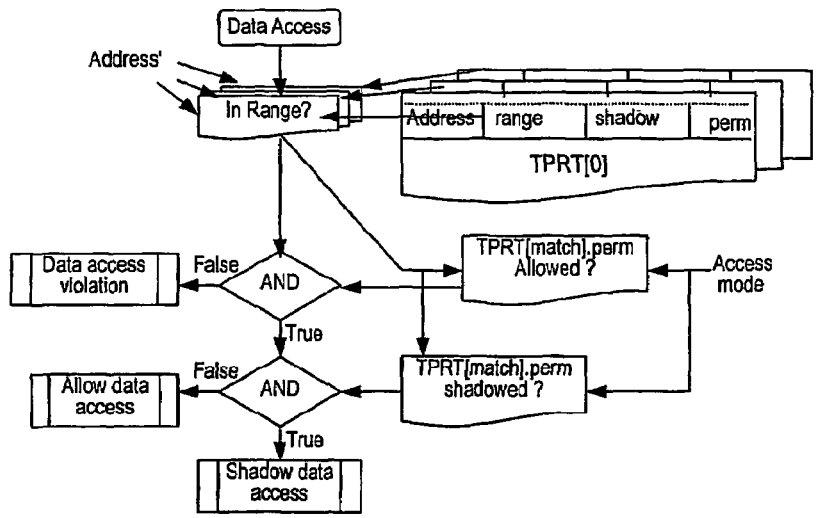
FIG. 26 is a flowchart showing the process used by a RAM oriented DAC for the validation of access to data memory space.

FIG. 26 is a flowchart showing the process used by DAC 10B for the validation of access to data memory space. The "Data Access" function is triggered by controller AC of DAC 10B on detection of the access type/mode from the control bus CB signals, and this function is supervised by table TPRT; its major task is to determine whether the current program's attempted access should be allowed, denied, or shadowed based on where the access is directed, the mode of the access, and the task's permission for such accesses. Virtual locations take the same path as shadowed locations for the purposes of destination resolution. The outputs from this function control the outcome from other concurrent processes.

Figure 27:
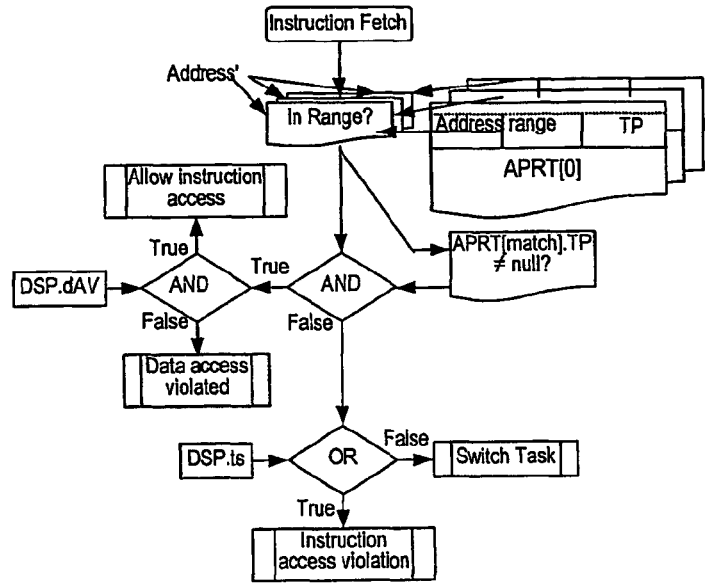
FIG. 27 is a flowchart showing the process used by a RAM oriented DAC for the validation of access to instruction memory space.

FIG. 27 is a flowchart showing the process used by DAC 10B for the validation of access to instruction memory space. The "Instruction Fetch" function is triggered by controller AC upon detection of the access type from the control bus CB signals, and this function is supervised by table APRT, whose major task is to determine the purpose of the access and if it is to be allowed or denied. Access mode is irrelevant since only a read from memory is allowed during an instruction fetch. Access is allowed or denied based on conformity to the current program's AP-attachment definitions as well as DAC state information that impinge on execution flow. The outputs from this function control the outcome from other concurrent processes.

Figure 28:
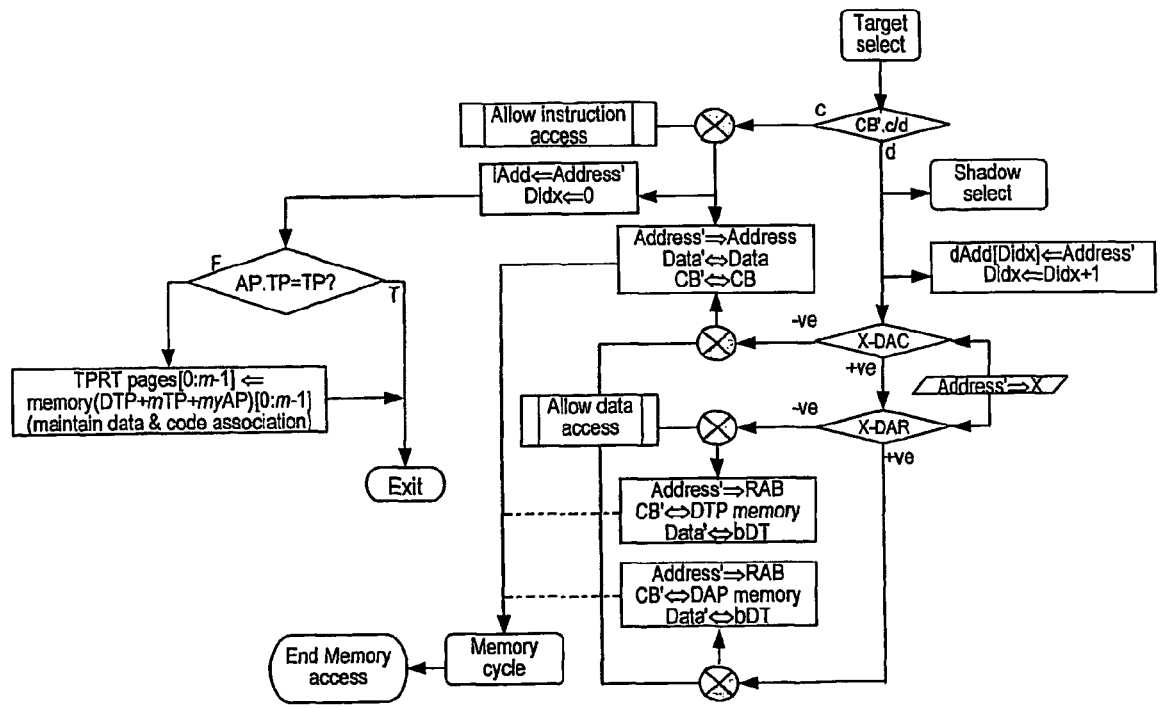
FIG. 28 is a flowchart showing the means by which approved memory accesses are routed by a RAM oriented DAC.

FIG. 28 is a flowchart showing the means by which approved memory accesses are routed by DAC 10B. While the "Data Access" and "Instruction Fetch" functions determine if the access can occur, the "Target Select" function illustrated in FIG. 28 locates the target and activates the necessary circuits for access to external memory or within DAC 10B itself. The "Target Select" function is performed by controller AC at each memory access attempt. Target selection is completed by the outcomes from tables APRT or TPRT during an "Instruction Fetch" or "Data Access" function respectively. The "Target Select" function also keeps a limited access audit trail to facilitate violation debugging.

Figure 29:
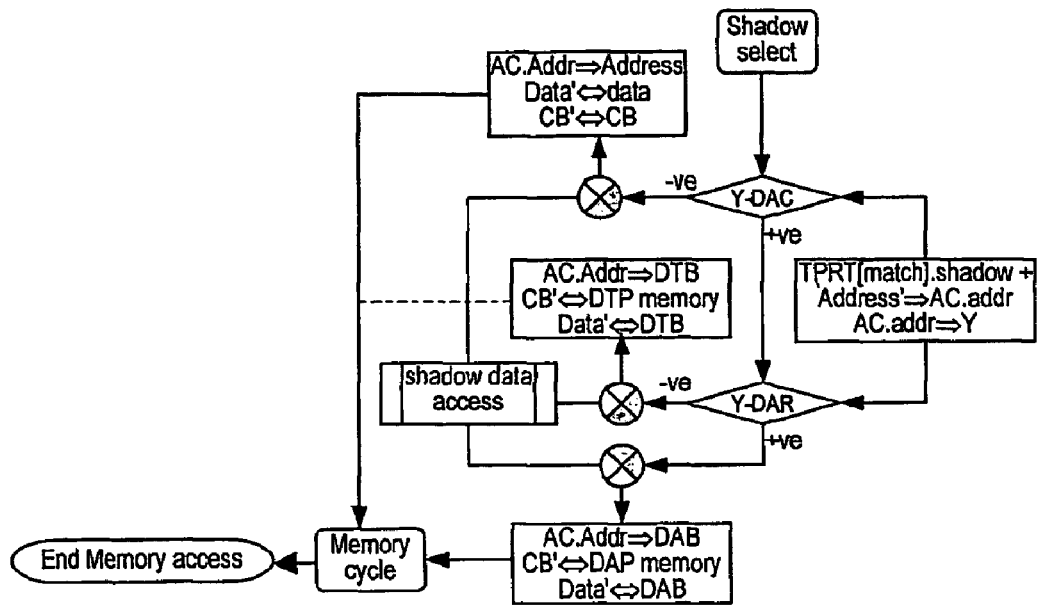
FIG. 29 is a flowchart showing the means by which a memory access is shadowed to a target that is different from that which was requested.

FIG. 29 is a flowchart showing the means by which a memory access is shadowed to a target that is different from that which was requested. Shadow selection is performed by controller AC on notification from table TPRT that the shadow access should be asserted. The target address is derived from the shadow origin returned from table TPRT. Shadow selection uses the precalculated shadow target address (AC.addr) as the target for the actual access. The above is also true for virtual target selection. All shadow targets are pre-validated by the driver at the time of assignment of the shadow permission to any particular transfer port range.

Figure 30:
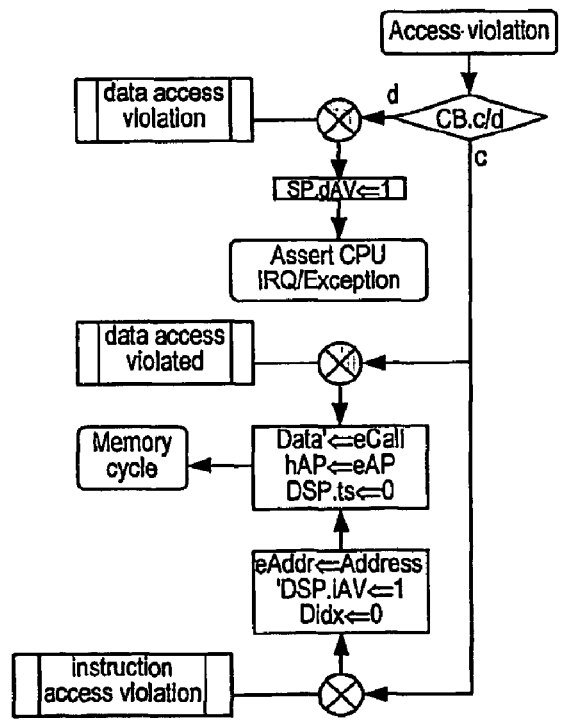
FIG. 30 is a flowchart showing the processing of access violations by an access controller of a RAM oriented DAC.

FIG. 30 is a flowchart showing the processing of access violations by controller AC of DAC 10B. Violations during a "Data Access" cycle raises a CPU exception to prompt the data access and preserve the program's context in case the access will be retried later. Violations during an "Instruction Fetch" results in an instruction substitution that will trigger a task switch to the software component of DAC 10B. Access violations during a "Data Access" necessitates a different response from that possible for an "Instruction Fetch" since data accesses most often occur during instruction execution.

Figure 31:
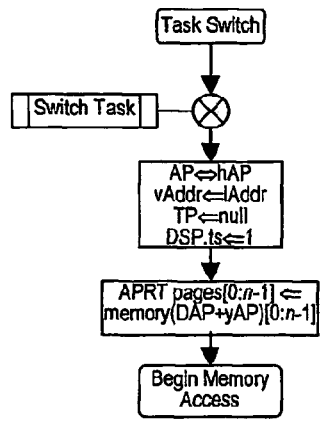
FIG. 31 is a flowchart showing the manner in which a RAM oriented DAC effects a safe transition between two different programs.

FIG. 31 is a flowchart showing the manner in which DAC 10B effects a safe transition between two different programs. Switching between programs involves a context switch in table APRT when the first instruction of the new program is being accessed. In particular, DAC 10B effects a "Task Switch" by reloading the contents of table APRT from the cache location indicated by register hAP, and then reinitiating the memory access cycle. After the context switch DAC 10B restarts its internal "Instruction Fetch" function to re-evaluate the access conformity.

RAM DAC Dynamic AP and TP Creation

The standard OS program-loader implants the statically linked instructions and data of a program (with the necessary fix-ups), as required, into free memory regions under its control. To use DAC 10B correctly, the OS must relegate its memory allocation and de-allocation functions to the OS-driver, and must classify the intended usage of the memory space (instructions, private data, shared data). Unclassified allocations will be defined as private data (rw) by default (note that such classified data cannot be executed as instruction later). The actual allocation can remain essentially unchanged, but the OS-driver will only map the memory ranges into the calling AP-attachment's transfer port TP if the AP-attachment conforms to the operating system's access port AP. The last step is for the program loader to declare a set of memory allotments as a program to the OS-driver. At such time, the OS-driver assigns the memory ranges, content types and access permissions, defined during the allocation process, to the program by building its access port and transfer port definitions in the DAC-mirror. To do this, the OS-driver iteratively creates transfer port identifiers TPID for the program's data sets, computes their descriptor locations in table DTP using the method shown in FIG. 23(B), and fills the descriptors with the memory ranges (upper and lower addresses), access permissions and relative offset addresses of their shadow (if any). Before committing a TP-attachment to the DAC-mirror, the OS-driver scans all assigned access ports AP to determine if the TP-attachment or its shadow-attachment overlaps any access port AP and will refuse to register any program with such a TP-attachment defect. The OS-driver will also reject registration of the program if any of its TP-attachments, or their defined shadow, do not conform to the access permissions as explained for Table I. Finally, if any AP-attachment of the program being registered overlaps any TP-attachment (except free TP attachments of the OS-driver), registration will also fail. Other wise, The OS-driver computes the memory location in table DAP for the access port descriptors using the method shown in FIG. 23(A), and records the AP-attachments and their associated transfer port identifiers TPID. If the registration completes without errors, the OS-driver extracts the access port AP and related TP-attachments from its "free" transfer ports TP (by reclassifying those TP-attachments as *m), and consigns them as m TP-attachments to the program-management AP-attachments of the OS. The OS-driver then returns the program's access port identifier APID to the OS.

RAM DAC Attaching to Dynamically Created APs and TPs

At this point the entire program, its instruction and data-sets, are encapsulated in the TP-attachment of the program-management routines of the OS, allowing it to perform whatever fix-ups are necessary for the program to run. The OS begins the activation of the program by sending the program's access port identifier APID to the OS-river. At such time the OS-driver will modify the program-management transfer ports TP that contain the program so that only the public data used for OS-program interface TP-attachments remain accessible to the OS. All other TP-attachments of the OS that are a part of the program are removed from the reach of the OS by modifying their access permission to *m. Then the OS-driver writes the program's access port identifier APID to the access port register of the DAC-mirror and returns control to the OS. Since the AP register was r, the flowcharts in FIG. 26 and FIG. 30 demonstrate how the hardware of DAC 10B detects the inappropriate write and initiates the invocation of the boot-driver using the instruction substitution of register eCall. Once invoked, the boot-driver notes that the access was from the OS-driver to the mirror access port AP, that the access port AP is new, and that its descriptors in the DAC-mirror are valid. Valid new access ports AP and their attendant transfer ports TP are recorded in the hardware of DAC 10B, and the boot-driver will update register hAP and register DSP of the DAC-mirror (and not the hardware of DAC 10B) before returning control to the OS-driver.

RAM DAC Establishment of Access Paths

When it is ready to do so, the OS will issue a program-flow-change instruction that directs the CPU to begin instruction processing at the program address within the TP-attachments of the OS. The flowcharts in FIG. 27 and FIG. 30 show that as the CPU attempts to fetch the first instruction of the program, the hardware of DAC 10B detects an instruction access violation and redirects the CPU to the boot-driver instead of the target instruction. The redirection is transparent to the CPU and no "Exception" or "Interrupt" will be raised. It is achieved by the hardware itself, which returns register eCall to the CPU instead of the intended instruction, and pre-authorizes the assertion of the boot-driver access port AP by forcing a register eAP into register hAP. The CPU executes the instruction in register eCall and, in accordance with the flowchart in FIG. 27, attempts to fetch the first instruction from the boot-river; the target address lookup will fail since the OS access port AP is still active. This failure, however, triggers the "Task Switch" function shown in FIG. 31, that was pre-authorised by the hardware of DAC 10B, to bring the boot-driver's access port AP into context. Thus, the boot-driver gains control in only 2 instruction execution cycles plus the reload time of table APRT (fairly low error transfer overhead).

RAM DAC Validation of Path Establishment

The boot-driver now determines the cause of the instruction access violation using the state of register DSP, the access port register, register hAP, and register eAP of both the hardware of DAC 10B and the DAC-mirror. The conditions of these registers will indicate if the violation occurred as a result of a Task Switch attempt by any program (including the OS), or hidden errors in the OS, the OS-driver or the boot-driver itself. In addition, register eAddr recorded the program and address of the attempted target instruction violation, register iaddr recorded the program and address of the instruction that attempted the violation, and registers dAddr[0] to dAddr[Didx] (if implemented as an array) recorded the address of the data stream accessed by the CPU on execution of the instruction at register iAddr. These values can be used when recovering from the violation. For example, if the OS attempted to invoke the Task Wwitch using a call instruction, a register vAddr recorded the location of the call instruction from the OS, register eAddr recorded the destination for the call instruction, and the return address to the OS would be recorded on the stack at dAddr[0] to dAddr[Didx]. In this case, the violation was a Task Switch attempted by the OS, as validated by the mirror DSP.ts and conformity of the destination to the mirror hAP. The boot-driver further validates that the access port descriptors in the DAC-mirror concurs with those of the hardware of DAC 10B and that the mirror descriptors of the OS have been appropriately modified to conform to security specifications. Conformity will result in updating the state of the DAC-mirror and the hardware of DAC 10B, then resumption of the Instruction Fetch to activate the new program. This involves updating the DAC-mirror to reflect the task's activity state, initializing the program's stack with a pseudo return-address (if necessary), then performing a controlled Task Switch.

Figure 32:
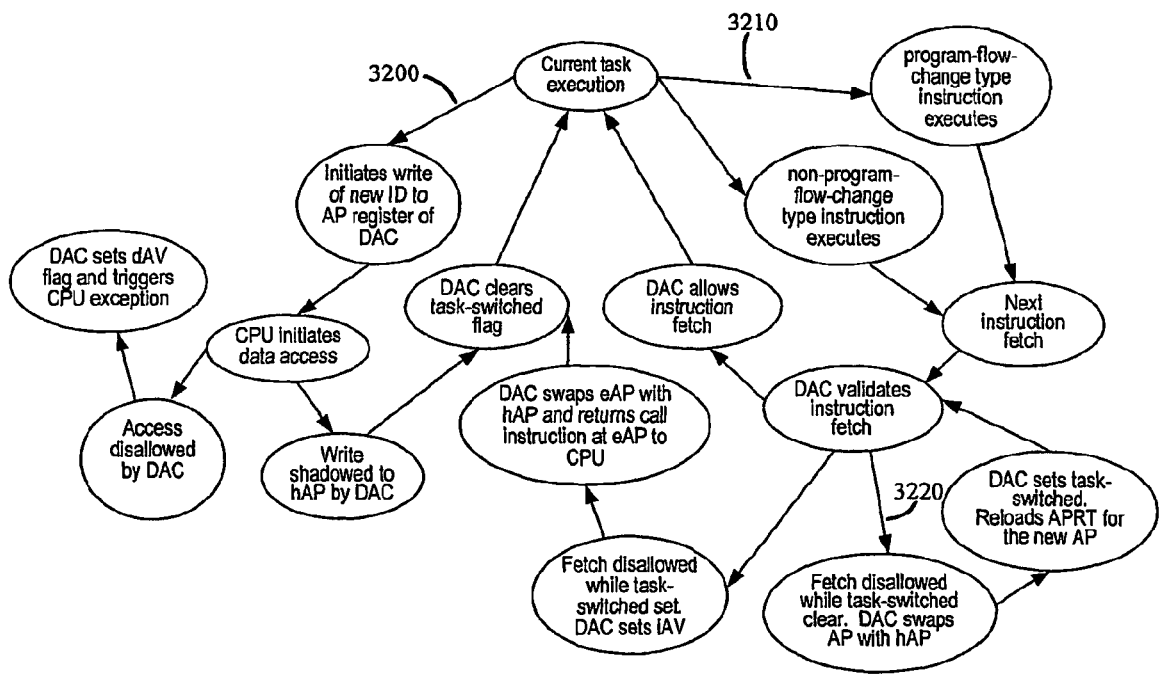
FIG. 32 is a state diagram which illustrates the program-controlled flow of program execution within a RAM oriented DAC.

FIG. 32 is a state diagram which illustrates the program-controlled flow of program execution within DAC 10B, and demonstrates the means by which the Task Switch can occur successfully. FIG. 32 shows the incorporation of program execution with the state of DAC 10B. In particular, it highlights the fact that any program that attempts to execute instructions in any other program's memory space will trigger an access violation within DAC 10B. It also highlights the process by which a supervisory program (usually the OS), in a multitasking environment, can safely promote execution to a subservient program, giving the supervisory program full control over the manner in which all programs interact. When the OS is the currently executing task, it signals to DAC 10B that it approves the upcoming program switch by writing the new access port identifier APID (namely, the program ID) into the access port register, as shown in path 3200. Since the access port register is read-only and accessible to the OS, writing to the access port register is shadowed to register hAP and triggers clearing of the task-switched flag DSP.ts in register DSP. When the OS is finished preparing the new program for execution, it executes a program-flow-change (jump or call or return) instruction, diverting execution to some point in the target program's code memory space as shown in path 3210. This action is noticed by DAC 10B as the CPU attempts to fetch the next instruction from a memory region to which OS instructions have not been allocated, as shown in path 3220. DAC 10B promotes the new access port identifier APID, causing an access port Context Switch and validation of the Instruction Fetch target for conformity in the new access port AP. The only condition for writing the access port register is that once written to, the OS must be prepared to deal with any instruction access violations which may occur prior to activating the program (only the OS can cause such violations since it is the current task). Nevertheless, state information in DAC 10B can help the OS recover correctly from this eventuality.

The boot-driver approves the Task Switch, and then issues an indirect jump instruction through register eAddr to reach the intended instruction. In this manner, control is passed to the new program with the context of DAC 10B set to that of the new program. The context switch mechanism of DAC 10B is the only means by which any program can invoke other programs. This is reserved for use by the boot-driver via its ownership of DAC 10B, and by the OS through its access to the DAC-mirror.

RAM DAC Denial of Path Access

Failure of the security conformity test will cause the boot-driver to update the DAC-mirror's error log registers from the hardware of DAC 10B and performing a Task Switch using an indirect nested call using register eCall of the DAC-mirror. This will allow the OS-driver to deal with the error in an OS-specific manner. If the OS-driver aborts the program activation, it should invalidate the program's AP-attachments and place the access port identifier APID in register iAddr along with the address for OS notification (if applicable) before returning to the boot-driver. If the program activation is to be retried, the OS-driver must ensure the program's conformity before returning to the boot-driver with register iAddr unmodified. Otherwise the boot-driver will classify the fault as a system breach and halt the OS and all its programs after dumping the machine's state to the error logs. Note that regardless of the outcome, the OS-driver must return to the boot-driver or stay within its limited bounds because it has been assigned an access port AP independent of the OS and all other programs. As recommended for the SCSI oriented DAC 10A, the RAM oriented DAC 10B could also be designed with an access port activity timer to ensure that the boot-driver can regain control if any access port AP retained active status for too long. If the OS-driver was compromised, its inability to gain increased access is assured since its AP-attachments and TP-attachments were not assigned by itself but by the boot-driver (regardless of what the DAC-mirror indicates).

RAM DAC AP-TP Access Supervision and Enforcement

Thus far, a single program (the OS not included) has been loaded statically and activated by the OS. Any DAC-aware computer (boot-driver installs) must use DAC 10B for loading and dispatching programs. DAC 10B prevents programs from writing to their AP-attachments, prevents execution of instructions from within TP-attachments, and the boot-driver prevents internal overlap between AP-attachments and TP-attachments. Thus, the standard practice of executing data as instructions during the Task Switch function is abolished. What follows details the manner in which DAC 10B ensures that the program operates and interacts with transfer ports TP in a manner expected of AP-attachments and TP-attachments on DAC 10B.

The state diagram in FIG. 32 shows what happens when the boot-driver writes the program's access port identifier APID to register AP (path 3200), triggering clearing of flag DSP.ts and updating of register hAP. Then the boot-driver executes the indirect jump to activate the approved program (path 3210). Next, Instruction Fetch, detailed in the flowchart in FIG. 27, causes a fetch mismatch (path 3220) and reloading of table APRT to bring the program's access port AP into context and complete a Task Switch in accordance with the flowchart in FIG. 31. The Instruction Fetch is re-evaluated to ensure that the instruction belongs to the new access port AP, and if so, the address is allowed to access the memory bus in accordance with the flowchart in FIG. 28 and return the instruction to the CPU. In the meantime, DAC 10B will refresh table TPRT, if necessary, to maintain the link between the allowed TP-attachments and the AP-attachment from which the instruction was fetched. From this point DAC 10B has locked the access port AP to this program and all subsequent instructions must be directed at its AP-attachments, and all data access must be directed to its defined TP-attachment in accordance with the flowchart in FIG. 26. Otherwise, DAC 10B will indicate an access violation error. In this manner, DAC 10B detects and prevents all AP-to-AP and AP-to-non-AP access violations, especially those that are know for causing the dreaded buffer overflow error. In this error, the attacker uses valid program input to create invalid memory access which eventually forces data into the instruction region or force instruction access to be made to data regions. The end result is that program execution goes out of sequence such that data is executed as instructions by the CPU. The boot-driver can include special mechanisms for catching even internal program data abuses of this type, especially those that use the CPU stack. Options range from the draconian method of assigning the stack as *m within the program so that the boot-driver will be invoked on every access to the stack, to instruction snooping by the hardware of DAC 10B for stack-related or program-flow-change instructions in order to validate their parameters.

RAM DAC Transparent Multitasking

The last item of concern for transparent sharing of memory for programs and data regards "Exceptions" and "Interrupts". Exceptions and Interrupts are signals issued by the CPU in response to an internal error or by an external device for asynchronous external events. Note that the CPU should not support software Exceptions or Interrupts because of the potential for their abuse to override system integrity. Similar functionality can be achieved using TP-attachments, and the mechanisms of DAC 10B eliminates the possibility of abuse from within application software. The occurrence of Interrupts and Exceptions are otherwise unpredictable and their effect must only be visible to the appropriate access port AP, which may not be the currently active access port AP. CPUs already have the facility to handle such events but DAC 10B must be able to ensure that even these events cannot be used to achieve an access violation. Because the CPU can signal when such events are occurring, DAC 10B can use those signals (IACK) to enforce memory sharing rules. Interrupts and Exceptions which are acknowledged by the CPU will invoke an automatic task switch by forcing the contents of an interrupt handler register iAP into register hAP and setting the Interrupt/Exception and task-switch flags (DSP.ie & DSP.ts) in register DSP. This will effect the Task Switch at the earliest possible moment that tables APRT and TPRT can be safely reloaded (this can be immediately if DAC 10B is not engaged). An instruction iJump will be the first instruction executed after signal IACK regardless of the outcome of the Instruction Fetch function. Thereafter the Instruction Fetch function will prevail until the next signal IACK. The iJump instruction is a function of the boot-driver and it preserves the critical CPU and DAC state registers and prepares the DAC-mirror for a further task switch to the prescribed OS-Exception/Interrupt service routines indicated by the mirror iCall. The boot-driver can also use this handle to ensure that the Exception mechanism is no longer used by other access ports AP to invoke the OS, should this be desired. When the boot-driver's interrupt handler regains control it can restore the CPU and DAC state registers and resume the interrupted program by clearing register DSP. Doing so causes DAC 10B to automatically reload register hAP and its Instruction Fetch pointer from register eAddr, its data access pointer from register daddr, and setting flag DSP.ts to. pre-approve the Task Switch. The next Instruction Fetch from the CPU (intended for the boot driver address) will be processed, ignoring bus Address' in favour of its internally latched pointers to guarantee the Task Switch and restoration of the interrupted task.

RAM DAC Shared Storage

Figure 34:
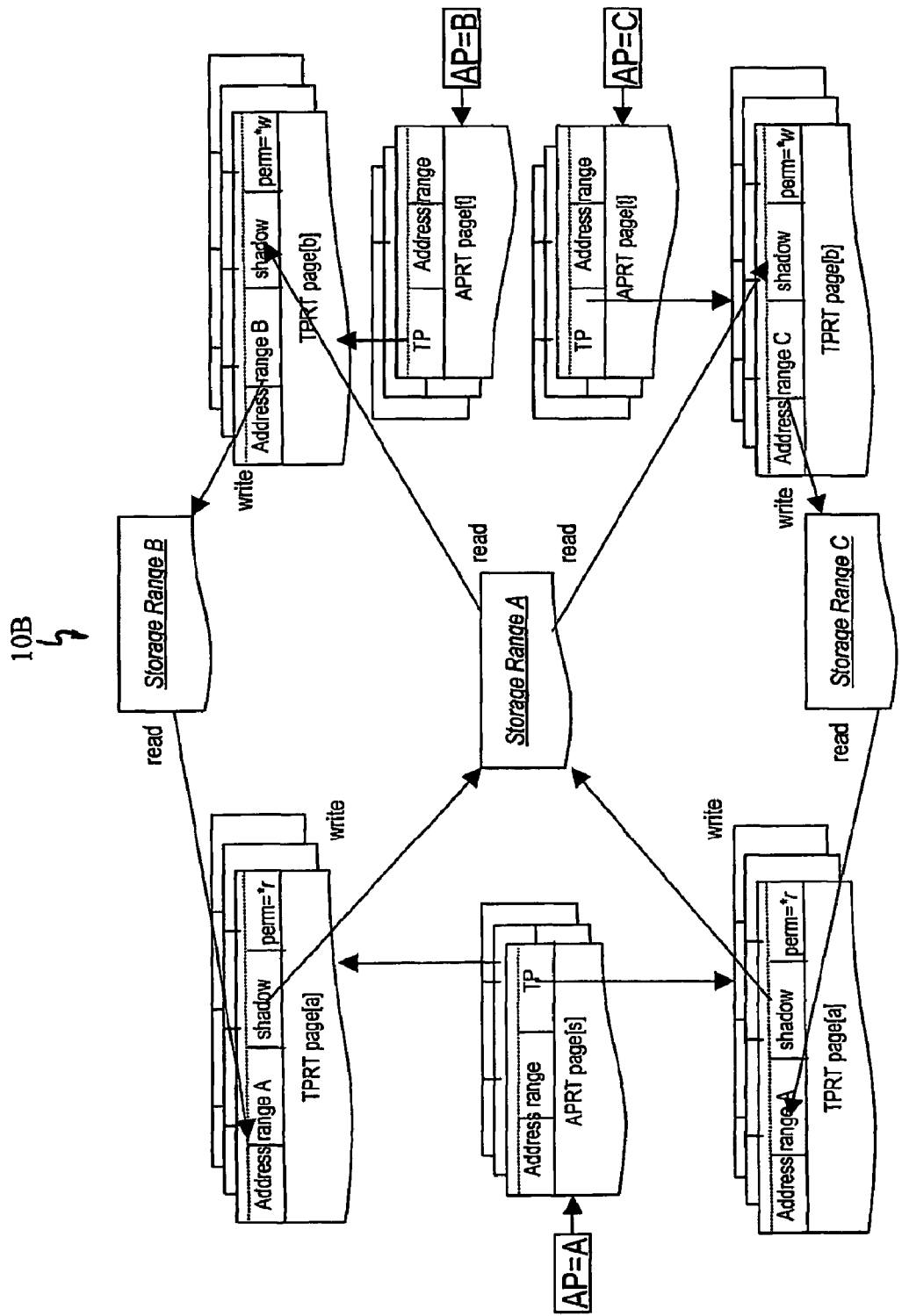
FIG. 34 is a diagram illustrating how to use RAM oriented DACS to define communication channels for the secure sharing of a common resource.

Aside from facilitating the secure sharing of storage for programs and their data, DAC 10B provides similar inter-access-port sharing of storage as that supported by the SCSI oriented DAC 10A. The permissions shown in Table I hints at their nature. The permissions for shareable storage are r, w, *r, *w, and while any number of AP-attachments may access the same storage as r or *r, only one AP-attachment may access the shared storage as w or *w. Note that shareable does not imply public; that is, the owner of a shareable storage must first request that the storage be shared before any other AP-attachments may discover or access the storage. Shared or public TP-attachments may only have the *r and the *w permissions and elements of the attachments may appear only in readable shadow TP-attachments of other access ports AP (the shadow of a *r $1°$ must be internal to TP-attachments accessible to access port AP). The access rule for sharing is that only the owner of the storage must be able to modify its contents, correspondents may only read it. The *r storage is reserved for the OS and this reservation is enforced by the boot-driver. This special reservation is designed to support many clients sharing a single OS storage, or the OS sharing many single client storage, as shown in FIG. 34 (described below).

The OS allocates one of its *r TP-attachment for each client. Although the transfer port TP descriptor is defined for the access port AP of the OS, the $1°$ "belongs" to the client and is the client's private share with the OS, the shadow belongs to the OS and is the public share of the OS for its clients. The allocation of *r storage is useful for OS-specific assignment of shared storage. The allocation/deallocation of *w storage is allowed to all access ports AP. The $1°$ of a *w storage "belongs" to the access port AP in which it is defined, the shadow must be a similar share that is allocated ("belongs") to another access port AP. Belonging to an access port AP implies that only that access port AP can direct the sharing (declare who may read it) or request de-allocation of the storage. Shared storage may only be discarded or shared.

RAM DAC Private AP-only Accessible Storage

Of the multiple TP-attachments supported by DAC 10B, a DAC-aware OS can assign the rw permission for private storage. Private storage is guaranteed never to be shared with any other access port AP including the OS, and private storage may only be accessed by one access port AP for the life of that storage or the life of that access port AP, whichever is shorter. Permission rw is the default for all newly created storage unless otherwise specified, and such storage may only be destroyed (removed from the accessible attachments of access port AP) or converted into na storage.

RAM DAC Between APs Storage Sharing Primitives

DAC 10B supports two forms of storage sharing for networking support; synchronous and asynchronous notification. Instantaneous notification is relevant for realtime, systems functions, and asynchronous is relevant for non-critical event-driven functions. The DAC-mirror is an example of a synchronous shared storage. The DAC-mirror is shared by the OS, the OS-driver, and the boot-driver. The OS shares the DAC-mirror as asynchronous storage with r access (boot-driver enforced rule) and r permission (DAC-hardware-enforced rule) since the OS only needs occasional up-to-date status for dealing with asynchronous task related events. The OS-driver shares the DAC-mirror as synchronous storage with varied r and rw access but r permission. This is necessary because the OS-driver must be able to update DAC 10B and have realtime responses from DAC 10B (the DAC-mirror must react as if it were the hardware of DAC 10B with respect to the OS-driver). The boot-driver shares the DAC-mirror as synchronous storage with rw access and m permission (boot-driver can override the hardware rules) since it must intercept and respond to realtime accesses to properly simulate the hardware of DAC 10B for the OS-driver.

RAM DAC Shared Storage as Virtual Memory

To support the size or availability limitation of memory, the OS is allowed to mark attachments (at an access port AP or transfer port TP) as na if its initially allocated space was swapped with some other process while the access port AP was inactive. DAC 10B will invoke the OSdriver whenever an na TP-attachment is being validly accessed by its access port AP, allowing it to restore the attachment and revert its access permissions. The equivalent to such TP-attachments for AP-attachments is one whose TP has been nullified but whose address range is valid; the driver can similarly restore such AP-attachments.

RAM DAC Storage Management

RAM must be managed all times by various AP-attachments in order to support the dynamic allocation and reallocation of memory for the various use (AP-attachment or TP-attachment) and access permissions. As such, every memory location (except for m in certain cases) will have at least two TP-attachments that define its memory address or address range. Aside from the shared and private permissions, TP-attachments may be assigned as m or *m to allow the relevant AP-attachment to perform management functions. Management functions include assignment and revocation of ownership, insertion or modification of sharing and access permissions. m storage is essentially private (treated as rw by the hardware of DAC 10B) and may only be access by, and is reserved for, program and memory management systems (enforced by the boot-driver). Access ports AP with m storage may request that such storage, or elements of it, be re-assigned for use by another AP-attachment. When approved, such reassignment will result in the storage being removed from the reach of the current access port AP (if assigned as owned and reassigned as private) or redefined as *m within the reach of the access port AP. *m storage are essentially black boxes (treated as na by the hardware of DAC 10B) and may not be accessed by its owner except to redefine (facilitated by the boot-driver) its access permissions. When an *m storage owner redefines its own TP-attachment, it may only redefine it as m (free for use) and this will revoke its accessibility from all other TP-attachments. When an *m storage owner redefines the TP-attachment of another access port AP, it may only redefine it according to the rules that govern the current access permission of the access port AP for the TP-attachment (see above). In particular, the *m storage owner may only move (redefine port.lo and port.hi), resize (redefine port.lo or port.hi), borrow (redefine as na), or release (equate port.lo and port.hi) private TP-attachments. It may only move (when owner moves it), resize (when owner resizes it) or release (equate port.lo and port.hi when access port AP must no longer access it) shared storage for access ports AP that do not own the shared storage. In addition, it may move, resize, or remove (equate port.lo and port.hi for all sharers) shared storage for the access port AP that owns the shared storage.

Note DAC 10B can replace the function of current memory management hardware (MMU) on CPUs. However, DACs 10B have several distinctions that make them more capable and secure memory access control devices than current MMUs: (1) DACs 10B do not require CPU compliance for enforcement of access violations; (2) AP-attachments of DAC 10B may have exclusive access to TP-attachments even though both are defined as part of the same program (many buffer overflow condition result from the inability of the MMU to provide exclusive data use by portions of the same program); (3) the AP and TP definitions of DAC 10B use real memory addresses instead of virtual addresses (virtual addresses mean programmers see their memory ranges as seamless and facilitates buffer overflows; (4) shadowing with DACs 10B provide a unique sharing mechanism that supercedes software controls of the shared memory and provides transparent routing mechanisms for such storage.

Use of DACS as Controlled Communications Portals

Given the characteristics of a DAC 10 that it is not controlled by the systems that use it, and that it allows attached systems to access one another transparently through it, it follows that storage units controlled by one or more DAC 10 can be used as controlled portals through which attached systems can communicate and share information securely. For the reasons set out above, DACs 10 are impervious to software methods of subversion, and the judicious use of DACs 10 as a communication channel would naturally confer protection against intrusion from external systems. These DAC-controlled storage units will, in the remainder of this description, be called "DACS".

The problems with inter-systems security are many but the primary flaw is that the systems must be electronically connected, in a client-server architecture, in order to communicate and share information efficiently. The client-server architecture is ideal for networking trusted and trustworthy systems. However, this model becomes the source of security problems when hostile individuals infiltrate one of the connected systems. To address this security issue, a proposal to erect a foolproof secure communication channel between systems has been presented. This communication channel is composed of DACS, several implied a-priori rules that replace the client-server model of networking, and functional "agents". The key enabling component is the use of the DAC 10 along with digital storage units to provide a physical "checkpoint" barrier at which all information can be subjected to scrutiny. Because a DAC 10 allows multiple systems to transparently share storage units, and applies categorical restrictions to accessing the storage unit, even certain types of impersonation attempts (a means of invasion) can be detected and actively inhibited. The communications channels allows restructuring of the client-server model into a private anonymous-server network model. This model is based on the principle that "client" systems are essentially incomplete systems that cannot independently access or process the necessary information, and thus need the support of the network to be complete. In addition, "server" systems are really just a collection of functions that clients can use to give them the semblance of being complete.

Since networks are used by clients to gain access to remote information or to gain the added processing power of systems on the network, it can be said that the network makes the client a complete system. Here the network implies any system made up of co-operating "clients" and "servers", and, for the sake of clarity, the "client" of interest is considered a user of the network. A complete system is one that is capable of performing the fill set of task that it claims to provide. Since computer systems and programs share the same relationship as networks and clients—that is, a computer system make the program a complete system, references to networks and clients shall include the implication of computers and programs. The basis of the client-network/program-computer relationship is the client-server model of networking. This model is an open system model in which a client accesses whatever external systems it requires in order to fulfill its tasks. As such, a client must be able to locate and determine how to access servers or other clients. Once such a target is located, the two communicate to determine each other's capabilities and needs, and work to fulfill them. While completing the client's tasks, the network becomes, in essence, the client, and operates as dictated by the client. Unfortunately, the participants on the network do not always consider their systems as mere extensions of the client.

Network Remodelling

This invention proposes a method by which to modify the basis of networking for increased security. The client-server model is seen as the "Achilles' heel" of networking because it requires that the network process clients' requests in its own environment, allowing the client to forge requests that can exploit weaknesses in the network. To modify the basis of networking, an a-priori series of standard operating procedures (SOPs) have been created that segments the network into functional components, thus converting the network itself into a function-oriented network. Function-oriented networks can sustain a modification of the client-server model so that its suits an "information sharing only" model of networking. The information sharing model affords the network with the means to complete clients such that they can operate as if independent of the network, and thus make the functioning of the network independent of the client's actions. The method involves a novel communication channel that consists of "completion agents" applied to the client's and the network's environment and secure checkpoints through which "agents" access the network or the client, on behalf of the client or the network.

The Security Checkpoint

The secure "checkpoint" is the defining characteristic of this new communication channel, and is composed of a DAC 10 with its multiple access ports and rules that govern the ports' usage of the DAC 10. Information arriving via networks is often fragmented and the network infrastructure has limited processing capabilities and consequently current networks compel each participant to process all information it receives, even if the information is unwanted, unnecessary or dangerous. The checkpoint makes it possible for the "trusted zone" to select which information it will process, and when it will be processed. Moreover, the checkpoint is directional for both the information it conducts and for its source of control, and control of the checkpoint need not rest with any of the participants that actually use the checkpoint. The function of a checkpoint is implied by the function of the owner(s) (agents of the network) which have access to it. The checkpoint offers each destination port's system (each of which is a trusted zone) a means of classifying incoming information as originating from a "distrusted zone", and assigning it the minimal level of trust. Although almost any traffic can be routed to the checkpoint, the trusted zone alone predetermines the types of information that it requires from that checkpoint. Thus, it alone determines what will be allowed to leave the checkpoint for further processing. With these features, a network built using checkpoints can predetermine which of the participants can interact and which of the participants are in control of the communication channel. In general, the network provides the checkpoint, and thus it is in control of the communication channel.

The Network Completion Agents

Security at the checkpoint is enhanced by the support provided on both sides by owners (agents of the network) on the network side and agents on the client side. As each distrusted zone (or client therein) attempts to join the network, the network completes its end of each communication channel by asserting "owners", who are agents designed to meet the client's need but on the network's terms. Owners assure proper use of the checkpoints by ensuring that only information that is relevant to the owner's function will be delivered to the network, or will be delivered to the distrusted zone. By definition, an "owner" is an integral entity of the trusted zone, designed to service the function of its trusted zone target. Owners are comprised of software/firmware, a processing unit, interfaces to communicate with its target, as well as links to at least one checkpoint. Their task is to deliver "ready information" (information transformed to conform to the destination's expectations) to its final destination, and may include completion of the transformation of incoming information, if the distrusted zone cannot complete the transformation securely.

The Client Completion Agents

As each distrusted zone (or client therein) attempts to join the network, the network completes the distrusted zone's end of each communication channel by deploying completion "agents" in the distrusted zone. For the remainder of this description, "agent" will mean an agent in the distrusted zone, while "owner" will mean an agent in the trusted zone. These agents are complementary to owners and each agent represents (is a proxy for) the trusted zone in the native environment of the distrusted zone. Agents assure proper use of checkpoints by being the only elements of the distrusted zone that have legal access to any particular checkpoint. An "agent" then, by definition, is an independent entity of the trusted zone, that is designed to service and become an integral part of the distrusted zone, while fulfilling functions in the distrusted zone for its owner. Agents are comprised of software/firmware, a processing unit, interfaces required to communicate with systems in the distrusted zone as well as links to at least one checkpoint. Aside from lending their services to the distrusted zone, their task for the trusted zone can be twofold:

1. To procure information, relevant to their owners' function, from the distrusted zone, and to deliver only ready information to the checkpoints for the trusted zone.
2. To procure information, relevant to their owners' function, from the checkpoints and to deliver only ready information to distrusted zone.

Thus, an agent's function is implied by the function of the checkpoints to which it has access, and not by the activity of the agent itself.

The Function-Oriented Network

The secure communication channels are designed to provide:

1. A client-completion agent that provides the distrusted zone with the processing power and facilities it needs to access and process the information that it requires from the network, or that it will deliver to the network.
2. An agent of the trusted zone that offloads from the network and onto the distrusted zone, the danger of processing information for the distrusted zone while ensuring that only tolerable information will be delivered to the network.
3. A secure checkpoint at which ready information is presented to the participants while insulating the participant's private systems and information from the effects of danger in each zone.
4. Owner systems that oversee the proactive sharing of a network's resources that belong to predefined function-oriented segments of the network.
5. Directional and access control at every communication channel to enable a fully mapped network environment wherein the reach of every client can be predetermined and restricted.

These elements can be applied to make communication on today's private networks electronically secure with no apparent difference in overall effect to its users. Before a network can properly integrate these secure communications channels, the structure of the network must be changed from a client-server service-oriented network to an information sharing function-oriented network. The function-oriented network is also a structural network—that is, one that must be planned and laid out according to the purpose of the network and the functions that each element contributes to that purpose.

Messages and Access Rules

Typically, the network is analyzed and subdivided into functional groups based on their task(s) and their contribution to the overall purpose of the system. Each functional group qualifies as a trusted zone of the network and is segregated from other functional groups by secure communication channels; thus each functional group is a distrusted zone with respect to the information that each other group processes. The information being processed by these functional groups must then be sub-classified into access categories of "private", "public", and "control" contents (henceforth, "messages"). All messages within a functional group are thus private with respect to other functional groups. Access to, and use of, these messages are what the secure checkpoints are designed to control. The agents and owners are created to securely process these messages, and the communication channels are created to assert and maintain segregation between the message categories, and to segregate agents from owners and functional groups from each other. Each owner services a functional group and is responsible for the availability and processing of specific messages for the network. Each agent services a single client in the distrusted zone and services specific messages for the client on the network's behalf. To ensure secure access and processing of the messages, an a-priory set of rules have been devised to govern the treatment and processing of messages by agents and owners. The following protocol defines the treatment to be applied, by owners in a functional group, to messages of a functional group in order to ensure secure communication:

1. Private messages may only be accessed by elements of that functional group of the trusted zone and must never be made available to the distrusted zone; thus private messages themselves must never be delivered to a checkpoint.
2. Private messages of a trusted zone must never be stored in agent-readable storage units of any kind. This will ensure that private messages are never available to a distrusted zone.
3. All incoming messages must be appropriately secured (by some means of data transmission security) and are treated as private by virtue of their arrival at a checkpoint; that is, once a message is delivered to a checkpoint, it become unavailable to the delivering port of the communication channel.
4. Private messages are processed only by elements of the trusted zone. Owners may access private messages in order to delivery ready information to a security checkpoint.
5. Control messages are specific to a functional group, and may affect the processing being performed on messages specific to that functional group. Control messages can only be issued by owners and interpreted only by its target. The target of a control message is implicitly defined by the checkpoint to which it is delivered.
6. The types of control messages issued to agents should be limited and cannot instruct agents regarding the use of checkpoints; agents are created with inherent knowledge of their function.
7. Control messages may be solicited from the distrusted zone (for example, from another trusted zone element accessible only via the distrusted zone) by the trusted zone but only such solicited control messages will be interpreted by the trusted zone. Unsolicited control messages originating in the distrusted zone must never be processed by the trusted zone.
8. Public messages are those that may be accessed by elements in both the distrusted zone and the trusted zone. Nevertheless, the accessibility of any public message must be made on a per-user basis and be made available only to the given user by way of the client-completion agent.
9. Public messages are made available to clients by way of agents but the distrusted zone must never be allowed to modify public messages.
10. The network must be able to determine the authenticity of all messages at any time; thus the distrusted zone must be prevented from manipulating information owned by a trusted zone.

Securing Communications using DACS, Owners and Agents

DACS are the core of the component of the secure communication channel. As such, DACS determine both the directionality and the accessibility of messages contained within the checkpoint. Because DACS are controlled by DAC 10, each participant that may access a checkpoint may do so with distinctly different access permissions; thus the directionality of the communication is relative to the "zone" of interest. The network must therefore obey the rules that apply to the use of DACS with any particular access permissions. A bidirectional communication channel is one to which the zone can access the DACS with rw or m permission; that is, that zone can send messages to the checkpoint and can remove messages from the checkpoint.

Figure 33:
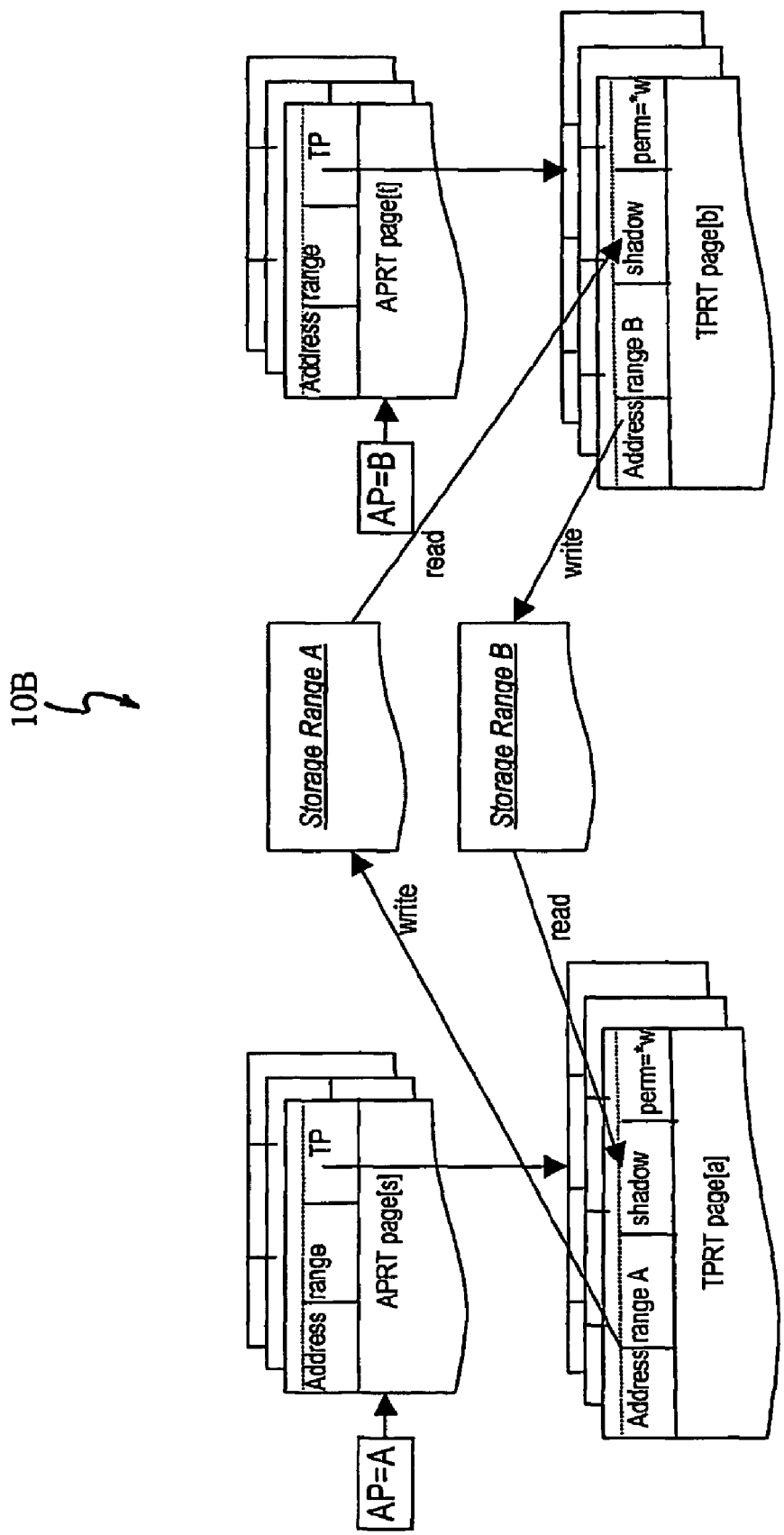
FIG. 33 is a diagram illustrating the use of DAC-controlled storage units ("DACS") to define private bidirectional checkpoints with asynchronous duplexing access capability, where the DACS are based on RAM oriented DACs.

FIG. 33 is a diagram illustrating the use of DACS to define private bidirectional checkpoints with asynchronous duplexing access capability, where the DACS are based on RAM oriented DACs 10B. Referring to FIG. 33, an owner program A (AP=A) and agent program B (AP=B) each define a TP-attachment to be used as a secure checkpoint through which they can share messages and communicate. The checkpoint is composed of two shadowed write-only memory ranges (storage range A and B), one of which each may write to present data to the other, and read to receive data sent by the other. Since no other access port AP has access to the checkpoint, communication between the programs is private.

FIG. 33 shows one way in which transparently shared storage can be easily implemented on a DAC 10B with secure data access. Each of the two access ports AP declare a different TP-attachment with the *w access permission. The shadow for the TP-attachment of one access port's attachment is the TP-attachment of the other access port's attachment. This arrangement allows the AP-attachment to use the same target storage identifier TID with read instructions even though the permission explicitly disallows a read. DAC 10B will displace the reads to access the shadow, which is the TP-attachment owned by the other. This concept can be extended further to include shared resource distribution in a "one to many" fashion thus negating the need to replicate shared information to each participant program.

As shown in FIG. 33, a quasi-bidirectional communication channel can be achieved for zones which have either the *r or *w permission to the DACS. The zone will succeed in sending messages toward the checkpoint but confirmation of the messages sent cannot be achieved by retrieving the messages form the checkpoint. Unidirectional communication channels may only be accessed by the zone in question in either input or output mode thus the zone may only be assigned either the r or w permission. In addition, DACS used as communication channels should not be primary storage devices. This is precautionary to prevent exposure of user-specific messages to an unintended user.

The junction between any two zones is forged by the presence of the checkpoint to which both zones have been given access. In actual network terms, this implies that any pair of computers that have no mutually shared DACS are essentially inaccessible to each other, as they have no means by which to communicate or share messages. For computers, the implication applies to programs, and since the OS is just another program, programs can be isolated from even the OS. This gives information-sharing networks the ability to quarantine elements of the network by simply removing the checkpoints between them, removing the messages from the checkpoints, or by deactivating the owners in a trusted zone. Furthermore, intrusion attempts can be detected by noting inappropriate use of the checkpoints—for example, messages which do not match the function of the checkpoint or attempts to direct messages at or read messages from r, *r or w, *w checkpoints respectively.

Owners are processing agents within a trusted zone that manage the secure sharing of particular resources that the network provides for its clients. Owners use the checkpoints as portals through which they serve resources to clients and as portals through which to collect messages that need to be posted as ready information to its resource destination. Ideally, an owner serves resources proactively to client-specific checkpoints—that is, as the client connects to the network. Each owner furnishes the client with the agents it requires and gives the agents access to all the resources that the user will require and that the network has pre-assigned to the user. Additional resources may be made available to the user after connection, but only at the behest of the network's administration and not at the request of the user. Finally, since agents may not access private messages even if they belong to the user, owners may process such private messages for the user and forward only the processed result to the agents. Owners thus protect the network by making it unnecessary to expose private messages to risks that may or may not exist in the distrusted zone.

Agents are provided to clients in the distrusted zone to temporarily remove the deficits that cause the clients to need the network. Completed as such, a client can proceed to operate as if it were a self-contained, independent entity. The definition of the agent suggests the extent to which the network must augment the client. Clients that require increased processing power are provided with the added processing power of the agents. A client that requires the ability to access information that is not native to the client is provided with the means that the agent uses to access that information. A client that requires additional information that it may gain from the network is provided with that information by virtue of the agent's access to information at checkpoints. A client that is required to produce information for the network is provide with agents that has the ability to prepare that information for entry to the checkpoints. Agents provide protection to the network is several ways. By completing the client and making it self-contained:

1. The network keeps each client beyond the reach of all other clients.
2. The network ensures that uncooperative users of the client will not succeed in discovering anything outside of their own environment.
3. The network assures that the risk of processing user information is contained within the user's environment, and that information the client delivers to the network is in a risk state that is known and expected by the network. This keeps the risks out of the network's environment where it may have had side effects on the network or its other systems.

Thus the secure communication channels allows the participant to share information while isolating the risks involved with such sharing at its point of origin. FIG. 34 demonstrates the manner in which agents and owners cooperate to securely provide access to a common resource shared between many clients.

FIG. 34 illustrates how to use DACs 10B to define communication channels for the secure sharing of a common resource. Owner A (AP=A) services common resource A (storage range A), while allowing concurrent sharing of the resource between clients completed by agent B and agent C (AP=B and AP=C) in quasi-bidirectional, asynchronous, duplexing mode. A transfer port TP in each of agent B and agent C defines a shadowed write-only memory range (storage range B and storage range C) to which each may write to represent messages to resource A, and read to retrieve messages from resource A. Owner A defines two sharing resources, each accessing the same resource A, as shadowed read-only memory ranges and assigns resource A to be the shadow of both agents' checkpoint input ports. Owner A can also read the checkpoint input ports of agents B and C and assign resource A as their shadows.

The checkpoint provides multiple input ports from agents to the owner, allows agents to share the same output port while binding the common resource to each agent's input so that the owner cannot misaddress nor cross-link the agents. Depending on implementation, resource A may be the true resource A or it may be a virtual representation of resource A. Nevertheless, agents do not directly manipulate the common resource, they present related information, from the client to the owner, in the same format as it found by reading from the resource. The owner melds the information from the two agents and the resource in order to update common resource A. By virtue of the activities of agents and owners, the communication channel vouches that the information delivered to each participant is the authentic information sent by the other participant.

Example: Using DACS to Protect and Provide Restricted Access to Sensitive Data

The following is a example of the use of DACS, in this case using a combination of RAM oriented DACs 10B and SCSI oriented DACs 10A, as elements of the described secure communication channels in a hybrid network 100 that protects a standard network from intrusions via the internet and less secure internal workstations.

FIG. 35(A) shows the utilization of SCSI oriented DACs 10A to partition and protect stored data on a standard network that has Internet access by using its unique ability to provide locally controlled (and remotely inaccessible) mapping of data pathways. The proposed layout represents a fault tolerant system with standard internet front-end designed to circumvent "Denial of Service" (DoS) attacks. Agent systems are standard Internet servers dedicated for public access by Internet clients to web and e-mail services etc. Supervisor systems provide local server-like functions in the management and dissemination of shared data to client systems in its zone and can be used for local configuration of the workstations and other servers in its zone. "Internal Intrusion Detection Systems" or IIDS systems IDx consolidate access violation logs while monitoring all storage devices for evidence of tampering. Custodian C are independently responsible for routine maintenance of the storage systems. System Masters SM connect to a DAC 10A via owner access ports AP and can use their attachment point to span across interconnected DACs 10A. They are a central location from which set-up and configuration of the network storage can occur. Hybrid network 100 is arranged as four functional segments, and the segments are each partitioned according to the similarity of access to stored information. Stored data can be shared transparently within and across segments without the need for agents or clients to be aware of the sharing mechanism. Supervisors are also unaware of other segments.

FIG. 35(A) shows hybrid network 100 with built in fault-tolerance and load-balancing of agent systems and three segments each with a different operational security rating (0 to 3 in ascending order), requiring a corresponding degree of physical security. The represented network is similar to that of a standard organization in which employees require Internet access and clients interact with the organization over the Internet. For this purpose, DACS are labeled as $S_x Y^z$ where:

x=a number identifying the DACx to which it is attached

Y=its logical identification number for the DACS on that DACx $Y^z$=its functional designation where z can be any of:
   $^o$=primary source or destination (according to *r or *w, see Table I)
   $^s$=shadow of primary unit
   nothing=not shadowed The Security Configuration The standard network has been segmented into zones based on the level of security clearance allowed to the members of a zone. The zones are then separated and protected by DACs 10A and use the available DACS in secure communication channels to support the information-sharing-only, function-oriented networking throughout. For the sake of simplicity, the security configuration for Level 1 and Level 2 is assumed to be identical except for the security classification of the information to which each level has access. Each computer is equipped with a RAM oriented DAC 10B and their OS have been modified to use checkpoints, owners and agents to implement resource and information sharing between the OS and applications (as illustrated in FIGS. 33 and 34). Despite the use of the modified network principles within the computers, hybrid network 100 itself uses SCSI oriented DACS for establishing the secure communication channels between each Level, and for simplicity's sake, Level 0 is considered the distrusted zone. The distrusted zone is the extent of the local network that is sacrificed for the completion of Internet clients.

Figure 35:
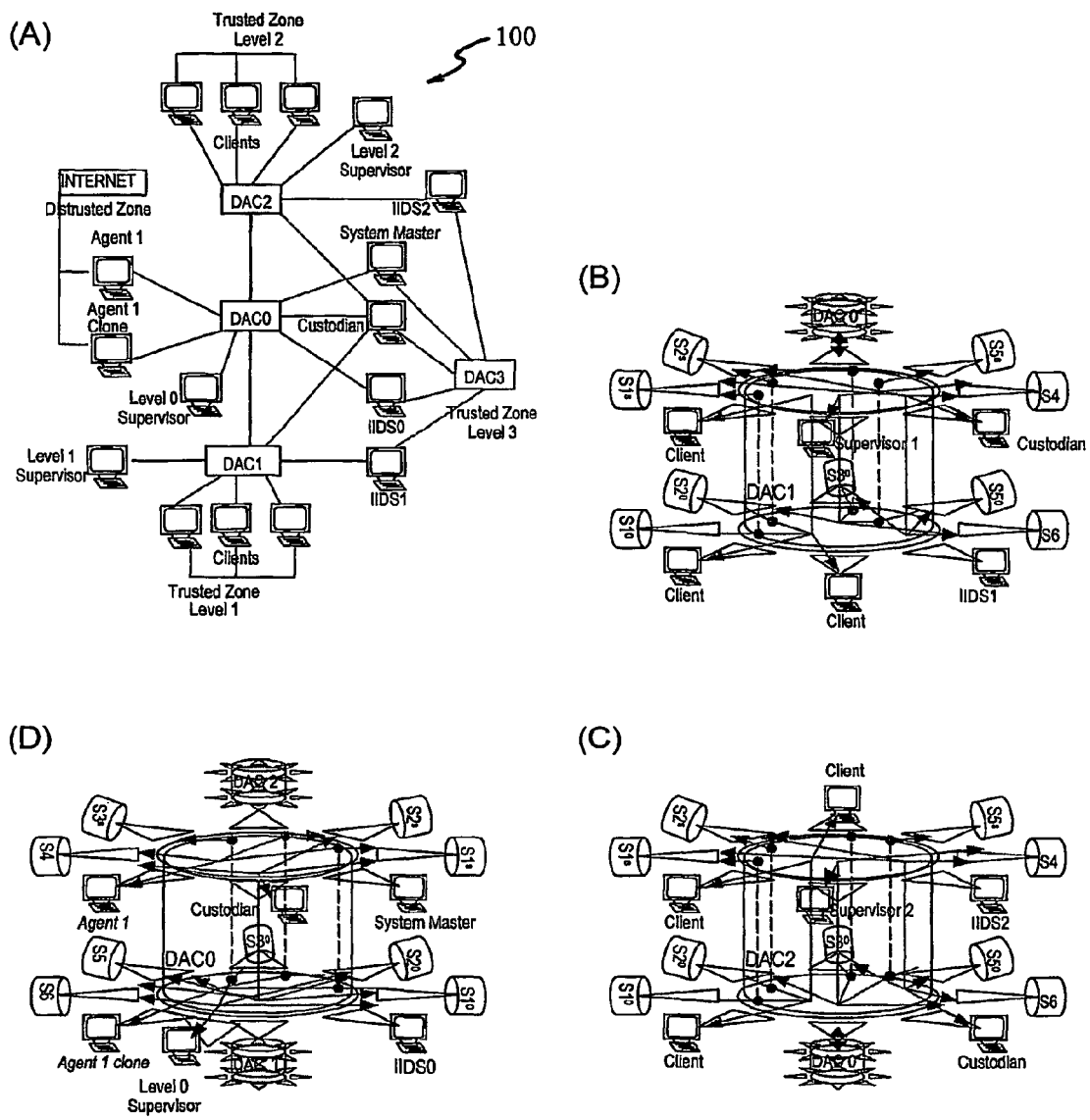
FIG. 35(A) is a schematic diagram showing a hybrid network using DACS to maintain segment integrity and distinction.

FIGS. 35(B), (C), and (D) show the physically mapped data paths that are established within DAC1, DAC0 and DAC2 respectively, to generate the environment that allows secure Internet connectivity. The DACs 10A are shown as the central cylinder with the radiating spokes at both the top and bottom. Terminal units (depicted as cylinders at the end of spokes) represent storage devices, and designate those spokes as transfer ports TP. AP-attachments (depicted in FIG. 35 as a computer figure) at the end of a spoke designates that spoke as an access port AP. Data flow follows the direction of the arrow at the spokes while the tails of arrows (at arrow junctions or at spokes) indicate data sources. Bi-directional channels are traceable by arrowheads on both ends with tails joined at a junction. Junction terminal pads join shadowed paths indicated by a dotted line. The shadow paths conduct traffic either to or from access ports AP and terminate only at transfer ports TP since transfer ports TP do not interact with each other. Note the shared utilization of resources without the need for AP-attachments to know of or about each other.

In FIG. 35(D), DAC0 has 9 attached storage units ($S_0 1^o$-$S_0 3^o$, $S_0 1^s$, $S_0 3^s$, $S_0 4$-$S_0 6$) and at least 8 access ports. These DACS support secure communication channels that allow the lowest security zone, the "web-services functional group" (Level 0), to securely interface the trusted zone with the distrusted zone (the Internet). This zone, though having the lowest security clearance and lowest physical security coverage, has the tightest security settings due to having the highest risk exposure. The inhabitants of this Level are:

1. A Master Webserver (Level 0 Supervisor), logically assigned to security Level 0 but physically protected and classified as an owner in the web-services functional group. It attaches to a secondary port of DAC0 using the following DACS and security settings:

TABLE VII

| DACS | Access level | Purpose |
| --- | --- | --- |
| $S_0 1^o$ | modify (rw) | OS, logs, registry, public applications, outbound public messages checkpoint |

TABLE VII-continued

| DACS | Access level | Purpose |
|---|---|---|
| $S_02^0$ | modify (rw) | Storage for web-pages, management of distrusted zone agents |
| $S_03^0$ | read-only (r) | Agent software, secure inbound inter-zone communication checkpoint |
| $S_03^s$ | shadow (w) | Traps intrusion events, secure outbound inter-zone communication checkpoint |
| $S_06$ | modify (rw) | Page-file storage |

This server is a member of the trusted zone, processes messages relevant to website servicing and management, and is subservient to the System Master SM, which is the master on DAC0. This server updates the system logs with the approved fragments collected from agent systems in the distrusted zone. Modifications to the system settings for all agent web-servers may be adjusted from this console or from the console of the System Master SM. This server has no local or private storage units, and systems in any other Level with write permission to checkpoints via $S^03^0$ may post requests for web related services. Requests approved by the IIDS and properly authenticated by the System Master SM will be relayed to the appropriate Agent systems indirectly via this server.

2. Web agents (Agent1 & Agent1-clone) are web-servers, logically and physically located in Level 0 security zone and arranged in a cluster for backup/load balancing. Although equipped with RAM communication channels for added robustness, all are considered agents in the distrusted zone. Referring to FIG. 35(D), each attaches to a secondary port on DAC0 using the following DACS and security settings:

TABLE VIII

| DACS | Access level | Purpose |
|---|---|---|
| $S_01^0$ | read-only (*r) | OS, logs, registry, public applications, outbound public messages |
| $S_01^s$ | shadow (w) | Traps intrusion attempts and incoming messages |
| $S_02^0$ | read-only (*r) | Source for web-pages and temporary source for Agent software |
| $S_02^s$ | shadow (w) | Traps intrusion attempts |
| One of $S_04$-$S_05$ | modify (rw) | Storage for page-file (if necessary) |

Shadowing of the primary DACS asserts the privacy requirement to all incoming messages as specified in the above description of the secure communications channel. In a like manner, attempts to modify existing files will leave an un-modifiable record of the event, thus ensuring that logs and other intrusions forensics are inaccessible for external modification. No local or private storage units are present on these agents. Some software agents (functions) on these servers have owners in the different Levels who handle specific operations regarding private messages that cannot be directly fulfilled by these agents. Such operations are requested as messages formatted and tagged and redirected to the respective secure checkpoint for further processing.

Referring now to FIG. 35(B), DAC1 has 9 attached storage units ($S_11^0$-$S_13^0$, $S_15^0$, $S_11^s$-$S_13^s$ (a partition on $S_12^5$), $S_15^s$, $S_14$, $S_16$) and at least 7 access ports. These DACS support secure communication channels that allow this lower security clearance system of the trusted zone, the "support services functional group" (Level 1), to interact securely with the higher security clearance elements of the trusted zone. Inhabitants of this Level may include:

1. Workstations in Level 1 may, for example, be inhabited by support staff in a organization, who may not be, or need not be very security minded, and their need for direct access to critical information or systems can be limited without compromising productivity. The workstations attached to DAC1 via secondary access ports using the following DACS and security settings:

TABLE IX

| DACS | Access level | Purpose |
|---|---|---|
| $S_11^0$ | read-only (*r) | OS, logs, registry, applications |
| $S_11^s$ | shadow (w) | Traps intrusion attempts and private checkpoint for outbound messages |
| $S_12^0$ | read-only (*r) | Source for non-sensitive static data shared by these members |
| $S_12^s$ | shadow (w) | Traps intrusion attempts |

The workstations also participate in a standard network arrangement to support legacy software and to demonstrate the security features conveyed by the DAC 10A.

All workstations have local storage units controlled in the standard manner for networks.
2. Local segment Supervisor of Level 1 interfaces with the workstations and functions as their standard network server. It controls access to zone resources and act as a local proxy for the rest of the network. This Supervisor attaches to the DAC1 via a secondary access ports using the following DACS and security settings:

TABLE X

| DACS | Access level | Purpose |
| --- | --- | --- |
| $S_1 2^0$ | modify(rw) | Common data shared by Level 1 members |
| $S_1 3^0$ | read-only (*r) | OS, logs, registry, applications |
| $S_1 3^s (S_1 2^s)$ | shadow (w) | Traps intrusion attempts |
| $S_1 5^0$ | read-only (*r) | Secure inter-zone communication checkpoint for inbound messages |
| $S_1 5^s$ | shadow (w) | Secure inter-zone communication checkpoint for outbound messages |
| $S_1 4$ | modify(rw) | Restricted Data/Work space for zone supervisor |
| $S_1 6$ | modify (rw) | Page-file storage (if necessary) |

Referring now to FIG. 35(C), DAC2 has 9 attached storage units ($S_2 1^0$-$S_2 3^0$, $S_2 5^0$, $S_2 1^s$-$S_2 3^s$ (a partition on $S_2 2^s$), $S_2 5^s$, $S_2 4$, $S_2 6$) and at least 7 access ports. These DACS support secure communications channels that this allow higher security clearance system of the trusted zone, the "executive services functional group" (Level 2), to interact with lower and higher security clearance systems of the trusted zone. Inhabitants of this level may include:
1. Several workstations in Level 2 security zone. Level 2 is inhabited by administrative members who oversee work done by Level 1, and who manipulate or generate some sensitive information. The workstations attached to DAC2 via secondary access ports using the following DACS and security settings:

TABLE XI

| DACS | Access level | Purpose |
| --- | --- | --- |
| $S_2 1^0$ | read-only (*r) | OS, logs, registry, applications |
| $S_2 1^s$ | shadow (w) | Traps intrusion attempts and private outbound messages |
| $S_2 2^0$ | read-only (*r) | Source for sensitive, static data shared by all members of this zone |
| $S_2 2^s$ | shadow (w) | Traps intrusion attempts |

10A. All workstations have local storage units controlled in the standard manner for networks.
2. Local segment Supervisor of Level 2, interfacing with the workstations to function as standard network server. It controls zone access resources and acts as a local proxy for the rest of the network. This Supervisor attaches to the DAC2 via secondary access ports using the following DACS and security settings:

These workstations also participate in a standard network arrangement to support legacy software and to demonstrate the security features conveyed by the DAC

TABLE XII

| DACS | Access level | Purpose |
| --- | --- | --- |
| $S2^0$ | modify | Common data shared b(members of the zone |
| $S_x 3^0$ | read-only (*r) | OS, logs, registry, applications |
| $S_x 3^s (S_x 2s)$ | shadow (w) | Traps intrusion attempts |
| $S_x 5^0$ | read-only (*r) | Secure inter-zone communication checkpoint for inbound messages |
| $S_x 5^s$ | shadow (w) | Secure inter-zone communication checkpoint for outbound messages |
| $S_x 4$ | modify(rw) | Restricted Data/Work space for these zone supervisors |
| $S_x 6$ | modify (rw) | Page-file storage |

No local storage medium is present on these servers and control or reconfiguration of these servers can only be done from the console of the System Master SM. Otherwise, the servers and their zones of control can operate independently.

DAC3 has 9 attached storage units ($S_0 1^0$-$S_0 3^0$, $S_0 1^s$, $S_0 3^s$, $S_0 4$-$S_0 6$) and at least 6 access ports. These DACS support secure communications channels that allow the highest security clearance systems of the trusted zone, the "administrative services functional group" (Level 3), to interact with, and oversee the operations of all other elements of the trusted zone. This Level is populated by:

1. A Custodian workstation that is attached to secondary ports on all DACs. Agent software on these workstation serve to maintain the intrusion traps and collect intrusion evidence and anomalies from all systems for later analysis. The Custodian C attaches to DAC3 from which its OS resides and its access to the DACS on this device are as follows:

TABLE XIII

| DACS | Access level | Purpose |
| --- | --- | --- |
| $S1^0$ | read-only (*r) | OS, logs, registry, applications |
| $S1^s$ | shadow (w) | Traps intrusion attempts, Page-file storage, target for maintenance agent functions |
| $S2^s$ | modify(rw) | target for maintenance agent functions |
| $S3^s$ | modify(rw) | Secure communications channel for intra-Level 3 messages, and target for maintenance agent functions |
| S4 | modify (rw) | Repository for IIDS logs, intrusion events, anomalies collected by maintenance agent functions |
| S5 | modify (rw) | target for maintenance agent functions |

The Custodian C also attaches to DAC0 with the following settings:

TABLE XIV

| DACS | Access level | Purpose |
| --- | --- | --- |
| $S1^0$ | modify (rw) | target for maintenance agent functions |
| $S1^s$ | modify(rw) | target for maintenance agent functions |
| $S2^0$ | modify(rw) | target for maintenance agent functions |
| $S2^s$ | modify(rw) | target for maintenance agent functions |
| S4-S6 | modify(rw) | target for maintenance agent functions |

The Custodian C also connects to DAC1 and DAC2 with the following settings:

TABLE XV

| DACS | Access level | Purpose |
| --- | --- | --- |
| $S5^0, S3^0$ | modify (rw) | target for maintenance agent functions |
| $S1^s, S2^s$ | modify(rw) | target for maintenance agent functions |
| S4,S6 | modify(rw) | target for maintenance agent functions |

2. Three (3) IIDS units, one for each of DAC0, DAC1, and DAC2. All three units share in logging all events occurring onto DAC3. The IIDS units present themselves as normal environments to investigate all files on all shadow storage units and all files on any non-shadowed units. The high degree of protection of the IIDS units allow them to activate any virus, trojan, scripts or other agents of intruders to discover their intent and tag them for removal without succumbing to their effects. IIDS logs are available to all units on DAC3 and are used by the Custodian C and System Master SM to locate approved files for continued processing, or tagged files for removal to quarantine. The master repository of intrusion forensics and the OS for the IIDS units are unavailable to the System Master SM and are only accessible in read-only mode for all systems except the Custodian C. The data access and communication channels of the entire IRDS are mapped in FIG. 36.

FIG. 36 shows the connection paths available to the IIDS. systems. The IIDS uses the connections to monitor storage devices on the DACs 10A and record tampering evidence. Systems of Custodian C monitor the IIDS logs to remove the evidence once it is recorded, and to effect repairs to any system or user files that have been affected.

3. A System Master Server is assigned to Security Level 3 with access to all other DACs 10A via DAC0. FIG. 37 shows how the System Master SM spans the DACs 10A to gain control of the entire network. The access port connections for the IIDS and Custodian C are also shown. The arrangement shown in FIG. 37 demonstrates the interconnectivity achievable by linking any access port AP of one DAC 10A with any transfer port TP of another DAC 10A. DAC0, the central DAC is programmed so that the AP to which the System Master SM is attached has access to various DACS attached to the interconnected DACs. In this manner, the System Master SM can "remotely" configure or control the behavior of any attached systems, but not necessarily control all the attached systems. In this setup, the System Master SM is denied access to the web-page storage DACS as well as DACS that would enable control of the IIDS units. This arrangement is robust so that even if the System Master SM is compromised, it will still be possible to track any changes made to the system. The IIDS OS and central logs are made inaccessible to the System Master SM, allowing forensics even in the event of a compromise of physical premises.

Network Configuration

FIG. 38 is a schematic diagram illustrating the manner in which DACs 10 can be interconnected into a hybrid network 100, and illustrating the controlled flow of traffic that the secure communication channels make possible on the hybrid network 100. Squares represent sample members of hybrid network 100 and ovals delineate the Levels within hybrid network 100. Not all members are shown in each Level, but their communication paths within their Level mirror those of the depicted samples. The arrows represent the paths possible for data flow between agents and owners, and the arrow direction indicates the direction of network traffic along the paths. Solid arrows represent communications requiring full co-operation between both parties. Data flow through these paths will cease when either party detects a breach in security. Dashed lines represent mandatory data flow paths that stay open except during a system crash or a manual disconnect. These paths are hidden to all users and are protected by the boot-driver from all accesses, even the OS. They carry logs and control information that aid in detection of intrusions and facilitate real-time responses. Both parties on dashed paths will respond only to a specific and limited set of requests, none of which have meaning in solid paths and thus will not "travel" in solid paths. Bidirectional arrows indicate that either source may post messages to, and receive messages from the other. Unidirectional arrows indicate that the path may only be used by the source to post messages to the destination. In the case of dashed unidirectional paths, the destination is invisible to the source and has direct access (without agent-owner interaction) to specific information stores on the source. All zones can be physically enforced, while zone 3 uses physical security for access control as well. FIG. 38 shows the manner in which DACs 10 can be interconnected and used as a secure network infrastructure by using specific TP-attachments as secure communication channels.

The only precautions taken by the presented hybrid network 100 is to set the operating system to deny system shutdown by any users or process on the master web-server and its agents. Except for the given DAC settings, this hybrid network 100 uses no other commercially available defense mechanism. The web-server agents are the only systems with a standard direct network connection to the internet. The Custodian C and the Master Webserver are under physical protection.

Distrusted Zone Attacks—Network Defends

Referring to FIG. 35(A), assuming that an attacker can access an agent web-server (via the Internet or locally) with valid access to any allowed user login (possibly even root user/Administrator) and password (gained by any means available to him/her), the following is a table of possible attack thrusts, defensive responses and attack results:

controls access to that storage, thus all OS permissions can be overridden by DAC 10A. RAM based communication channels and DACs 10B help the OS and applications resist intrusion attempts and quarantine damaged or misbehaving programs. In addition, agents have "effectively" read-only access to storage for the web-pages so access to or modification of web pages can be prevented by the DAC even if the OS permissions should allow it. At the same time, the Master Webserver can easily update the OS and web-pages which are the same as those used by its agents. The page-file system storage could be a point of vulnerability but it is transparently maintained by other systems, through DAC 10A, that neutralize any foreign object placed there. Web-based applications that would be required to interact with critical information such as e-commerce databases etc. are serviced by agent software that would post the required operations to the security checkpoints. These requests are validated and authenticated by IIDS0 and a System Master SM before being processed in the trusted zone with only the results of the operations being posted back to the responsible agent. In this manner, no critical information is ever returned to the agent systems. Compromising agent software in memory would invoke the failsafe feature of the communication channel since the application would lose its link to the internal systems. "Tricking" agents into requesting such changes will also fail since only requests that conform to the a-priori rules, established by the trusted zone, will be processed (requests, by these agents, to modify web-pages are not serviced).

In the configuration in FIG. 38, the IIDS systems IDx log and scan for intrusion attempts and initiate processes that alerts security personnel and quarantines the affected com-

TABLE XVI

| Attack | Defense & Result |
| --- | --- |
| Attacker logs on to agent server | No challenge, log-on event is recorded on shadow $S_0 1^s$ |
| Attacker tries permission escalation*. | Attempt echoed to $S_0 1^s$, attempt unsuccessful. |
| Attacker tries to gain modify access permission to a web-page folder* | Attempt logged to $S_0 1^s$ an echoed to $S_0 2^s$, but unsuccessful. |
| Attacker tries to modify web-page file. | Modification echoed to $S_0 2^s$, attempt unsuccessful |
| Attacker tries to install tools on agent server | Tool echoed to $S_0 1^s$, $S_0 2^s$ or successfully written to page-file drive but tool is inaccessible due to removal by IIDS and Custodian C. RAM DACS detect and quarantine memory based attack tools. |
| Attacker tries to disable Security measures with malicious agents | Attempt unsuccessful, DAC is "invisible" to attached systems, IIDS agents protect each other, messages will not be processed without IIDS approval, Custodian C maintains agent page-file storage regardless of IIDS functionality. |
| Attacker scans for attached systems for indirect assault | Attacker finds only similarly protected backup and clone servers |

*necessary only if not logged on as root/administrator on permission required

Since Webserver agents are considered elements of the distrusted zone, they are given no access to any critical systems. DAC0 keeps them unique and effectively isolated from other internal systems. The transparent access feature of DACS ensures that there is no method available by which an intruder can detect or directly target any critical systems such as Custodian C or the Master Webserver. The shadow storage units, Custodians C and IIDSs, none of which can be detected or bypassed, covertly captures and actively filters all activity being performed by these agents, thus it is unnecessary to directly challenge an attacker at any time. Since all operating system modifications must be done through the OS storage unit, and the unit is "effectively" read-only, agents cannot modify the OS nor any related file permission. DAC 10A puter's. The IIDS systems IDx exert their effects on the Custodian C which then aids the System Master SM to effect quarantine procedures. The System Master SM is a centralized location for configuring and managing the computers attached to hybrid network 100. It may also route communication traffic between the Levels and computers within the network when necessary. Both the System Master SM and the IIDS systems IDx observe the same rules for traffic flow but only the System Master SM actually routes traffic. Client systems Clx and Internet Agents Ag both are as described in the preceding paragraphs.

The importance of these physical configurations are that they enable each computer in hybrid network 100 to have a reliable means of verifying the source of any request and to be able to rely on that source determination by way of the path by which the response was delivered. System Master SM serves as that central authority to which all computers can go to validate the source of any posted message before they process the message. Despite what has been said above regarding the System Master SM, DAC 10 is the primary enforcer of the mode and directional flow of traffic. No path exists if DAC 10A determines that a computer must not access a particular channel for the purposes of sending or receiving messages. So, even if System Master SM is able to send and receive on a channel, it cannot force that channel open for the target or source.

As will be apparent to those skilled in the art in the light of the foregoing disclosure, many alterations and modifications are possible in the practice of this invention without departing from the scope thereof. Accordingly, the scope of the invention is to be construed in accordance with the substance defined by the following claims.

What is claimed is:

1. A device for controlling communications among or within computers, computer systems, or computer networks by establishing separate physical communication paths for physicallysecure access to resources, said device having an owner, comprising:
   (a) a plurality of access ports (AP) to which processing systems such as computer programs, computers, computer systems or computer networks attach to gain a set or subset of said separate physical communication paths for the purpose of making said physically-secure access to a set or subset of said resources to which said device controls access, each of said attached processing systems using only its own resources and, by virtue of its attachment to said AP, the resources of said device to perform said access, said plurality of APs comprising:
      (i) a primary AP to which one of said processing systems attaches to become a capable owner of all of said resources to which said device controls access, the one of said processing systems attached to said primary AP becoming a system master on highly secure networks enabled by said device;
      (ii) a plurality of secondary APs to which other of said processing systems attach to gain restricted access to a set or subset of said resources to which said device controls access, said processing systems attached to said secondary APs becoming either "client" or "server" on highly secure non-standard networks enabled by said device;
   (b) a plurality of transfer ports (TP) to which said resources attach to become accessible to said processing systems attached to said APs and through which access to said attached resources is controlled and restricted by said device;
   (c) a separate physical communication path between each said AP and each said TP of said device, wherein said separate physical communication path provides an exclusive and private communication path between each said AP and each said TP, and by virtue of which said device, when inserted into a pre-existing physical bus between said processing system at said AP and said resource at said TP and providing said separate physical communication path between said AP and said TP, becomes a physical extension and integral part of said pre-existing physical bus;
   (d) an access control interface associated with said primary AP through which the owner of said device sets access permissions and restrictions for each of said separate physical communication paths to predetermine the availability of said separate physical communication paths from any of said APs and the permissions allowed on each of said available separate physical communication paths; and
   (e) a physical or electronic hardware switch connected to each of said separate physical communication paths and controllable by said access control interface for allowing or denying access with respect to each separate physical communication path, so as to provide a physically-secure exclusive communication path between each AP and each TP with predetermined access permissions and restrictions, said physical or electronic hardware switch when not activated by said access control interface preventing said AP from detecting and accessing said resource by not enabling said separate physical communication path between said AP and said TP so that said separate physical communication path cannot become said physical extension or integral part of said pre-existing physical bus of said processing system.

2. A device as claimed in claim 1 wherein said computer resource is a storage unit having a Small Computer System Interface (SCSI) bus.

3. A device as claimed in claim 1 wherein said computer resource is random access memory (RAM).

4. A method of controlling communications among or within processing systems such as computers, computer systems, or computer networks, comprising:
   (a) inserting into the bus paths of a plurality of said processing systems a device to enable the establishment of separate physical communication paths for physically-secure access to resources by said processing systems, said device comprising a plurality of access ports (AP) and a plurality of transfer ports (TP) and a separate physical communication path between each said AP and each said TP of said device, wherein said separate physical communication path provides an exclusive and private communication path between each said AP and each said TP, and wherein said device, when inserted into a pre-existing physical bus between a processing system at said AP and a resource at said TP and providing said separate physical communication path between said AP and said TP, becomes a physical extension and integral part of said pre-existing physical bus;
   (b) attaching a plurality of said processing systems to a respective plurality of APs of said device to gain a set or subset of said device's separate physical communication paths for the purpose of making said physically-secure access to a set or subset of said resources to which said device controls access, each of said attached processing systems using only its own resources and, by virtue of its attachment to said AP, the resources of said device to perform said access, said attaching step comprising:
      (i) attaching one of said processing systems to a primary AP of said device to become a capable owner of all of said resources to which said device controls access and become a system master on highly secure networks enabled by said device; and
      (ii) attaching other of said processing systems to one or more of a plurality of secondary APs of said device to gain restricted access to a set or subset of said resources to which said device controls access;
   (c) attaching said resources to a plurality of TPs of said device to become accessible to said processing systems attached to said APs and such that access to said attached resources is controlled and restricted by said device; and
   (d) setting access permissions and restrictions for each of said separate physical communication paths through an access control interface of said device associated with said primary AP, to predetermine the availability of said separate physical communication paths from any of said APs and the permissions allowed on each of said available separate physical communication paths, wherein said access control interface controls a physical or electronic hardware switch connected to each of said separate physical communication paths for allowing or denying access with respect to each separate physical communication path, so as to provide a physically-secure exclusive communication path between each AP and each TP with predetermined access permissions and restrictions, said physical or electronic hardware switch when not activated by said access control interface preventing said AP from detecting and accessing said resource by not enabling said separate physical communication path between said AP and said TP so that said separate physical communication path cannot become said physical extension or integral part of said pre-existing physical bus of said processing system.

5. A method as claimed in claim 4, wherein said processing systems attached to said APs and said resources attached to said TPs formed a client-server network prior to insertion of said device into the bus paths between them and, after insertion of said device into said bus paths, form a secure hybrid network supporting client-server-like functionality on top of a physically-secure network enabled by said device.

6. A method as claimed in claim 4, wherein said processing systems attached to said APs and said resources attached to said TPs formed a client-server network prior to insertion of said device into the bus paths between them and, after insertion of said device into said bus paths, the client-server relationships have been replaced with information-sharing-only functionality on a physically-secure network enabled by said device.

7. A network comprising:
   (a) a device inserted into the bus paths of a plurality of processing systems such as computers, computer systems, or computer networks, and controlling communications among or within said processing systems by enabling the establishment of separate physical communication paths for physically-secure access to resources, said device comprising a plurality of access ports (AP) and a plurality of transfer ports (TP) and a separate physical communication path between each said AP and each said TP of said device, wherein each separate physical communication path provides an exclusive and private communication path between each said AP and each said TP;
   (b) processing systems such as computer programs, computers, computer systems or computer networks attached to a plurality of APs of said device to gain a set or subset of said separate physical communication paths for the purpose of making said physically-secure access to a set or subset of said resources to which said device controls access, each of said attached processing systems using only its own resources and, by virtue of its attachment to said AP, the resources of said device to perform said access, wherein:
      (i) one of said processing systems is attached to a primary AP of said device to become a capable owner of all of said resources to which said device controls access and become a system master on highly secure networks enabled by said device; and
      (ii) other of said processing systems are attached to one or more of a plurality of secondary APs of said device to gain restricted access to a set or subset of said resources to which said device controls access;
   (c) said resources attached to a plurality of TPs of said device to become accessible to said processing systems attached to said APs and such that access to said attached resources is controlled and restricted by said device;
   (d) a separate physical communication path between each said AP and each said TP of said device, wherein said separate physical communication path provides an exclusive and private communication path between each said AP and each said TP, and by virtue of which said device, when inserted into a pre-existing physical bus between said processing system at said AP and said resource at said TP and providing said separate physical communication path between said AP and said TP, becomes a physical extension and integral part of said pre-existing physical bus;
   (e) an access control interface associated with said primary AP through which the owner of said device sets access permissions and restrictions for each of said separate physical communication paths to predetermine the availability of said separate physical communication paths from any of said APs and the permissions allowed on each of said available separate physical communication paths; and
   (f) a physical or electronic hardware switch connected to each of said separate physical communication paths and controllable by said access control interface for allowing or denying access with respect to each separate physical communication path, so as to provide a physically-secure exclusive communication path between each AP and each TP with predetermined access permissions and restrictions, said physical or electronic hardware switch when not activated by said access control interface preventing said AP from detecting and accessing said resource by not enabling said separate physical communication path between said AP and said TP so that said separate physical communication path cannot become said physical extension or integral part of said pre-existing physical bus of said processing system.

8. A network as claimed in claim 7, wherein said processing systems attached to said APs and said resources attached to said TPs form a secure hybrid network supporting client-server-like functionality on top of a physically-secure network enabled by said device.

9. A network as claimed in claim 7, wherein said processing systems attached to said APs and said resources attached to said TPs provide information-sharing-only functionality on a physically-secure network enabled by said device.

10. A network comprising:
   (a) an interconnected plurality of devices inserted into the bus paths of a plurality of processing systems such as computers, computer systems, or computer networks, and controlling communications among or within said processing systems by enabling the establishment of separate physical communication paths for physically-secure access to resources, each device of the plurality of devices comprising a plurality of access ports (AP) and a plurality of transfer ports (TP) and a separate physical communication path between each said AP and each said TP of each device, wherein each separate physical communication path provides an exclusive and private communication path between each said AP and each said TP, and wherein said plurality of devices are interconnected via a plurality of interconnections between TPs of any one of said plurality of devices to APs of any other of said plurality of devices, said plurality of interconnections enabling processing systems attached to an AP of one of said interconnected devices to gain a set or subset of said separate physical communication paths that may be formed within said one of said interconnected devices and within said other of said interconnected devices by virtue of said plurality of interconnections between said interconnected devices;
   (b) processing systems such as computer programs, computers, computer systems or computer networks attached to a plurality of APs of said interconnected devices to gain a set or subset of said separate physical communication paths for the purpose of making said physically-secure access to a set or subset of said resources to which said interconnected devices control access, each of said attached processing systems using only its own resources and, by virtue of its attachment to said AP and said interconnections, the resources of said interconnected devices to perform said access, wherein:

(i) at least one of said processing systems is attached to a primary AP of at least one of said interconnected devices to become a capable owner of all of said resources to which at least one of said interconnected devices controls access and become a system master on highly secure networks or sub-networks enabled by said device; and (ii) other of said processing systems are attached to one or more of a plurality of secondary APs of said interconnected devices to gain restricted access to a set or subset of said resources to which said interconnected devices control access;

(c) said resources attached to a plurality of TPs of said interconnected devices to become accessible to said processing systems attached to said APs and such that access to said attached resources is controlled and restricted by said interconnected devices, and said attached resources at any of said interconnected devices can be accessed by a processing system attached to any of said interconnected devices to which said interconnections exist;

(d) a separate physical communication path between each said AP and each said TP of said interconnected devices, wherein said separate physical communication path may include segments formed by interconnections which exist between said interconnected devices, and wherein said separate physical communication path provides an exclusive and private communication path between each said AP and each said TP, and by virtue of which said interconnected devices, when inserted into a pre-existing physical bus between said processing system at said AP and said resource at said TP and providing said separate physical communication path between said AP and said TP, becomes a physical extension and integral part of said pre-existing physical bus;

(e) an access control interface associated with each said primary AP of each of said interconnected devices through which each owner of each of said interconnected devices sets access permissions and restrictions for each of said separate physical communication paths or segments to predetermine the availability of said separate physical communication paths from any of said APs and the permissions allowed on each of said available separate physical communication paths; and (f) a physical or electronic hardware switch connected to each of said separate physical communication paths or segments and controllable by said access control interface for allowing or denying access with respect to each separate physical communication path or segment, so as to provide a physically-secure exclusive communication path between each AP and each TP with predetermined access permissions and restrictions, said physical or electronic hardware switch when not activated by said access control interface preventing said AP from detecting and accessing said resource by not enabling said separate physical communication path or segment between said AP and said TP so that said separate physical communication path cannot become said physical extension or integral part of said pre-existing physical bus of said processing system.

11. A network as claimed in claim 10, wherein said processing systems attached to said APs and said resources attached to said TPs form a secure hybrid network supporting client-server-like functionality on top of a physically-secure network enabled by said interconnected devices.

12. A network as claimed in claim 10, wherein said processing systems attached to said APs and said resources attached to said TPs provide information-sharing-only functionality on a physically-secure network enabled by said interconnected devices.

* * * * *